US012240502B2

(12) United States Patent
Kume et al.

(10) Patent No.: US 12,240,502 B2
(45) Date of Patent: Mar. 4, 2025

(54) PRESENTATION CONTROL DEVICE, PRESENTATION CONTROL PROGRAM, AND DRIVING CONTROL DEVICE

(71) Applicant: DENSO CORPORATION, Kariya (JP)

(72) Inventors: Takuya Kume, Kariya (JP); Asako Nagata, Kariya (JP); Takeshi Yamamoto, Kariya (JP); Shizuka Yokoyama, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 250 days.

(21) Appl. No.: 17/859,233

(22) Filed: Jul. 7, 2022

(65) Prior Publication Data

US 2022/0340166 A1     Oct. 27, 2022

Related U.S. Application Data

(63) Continuation of application No. PCT/JP2020/048192, filed on Dec. 23, 2020.

(30) Foreign Application Priority Data

Jan. 10, 2020  (JP) ................................ 2020-003092
Sep. 28, 2020  (JP) ................................ 2020-162515
Dec. 10, 2020  (JP) ................................ 2020-205149

(51) Int. Cl.
*B60W 60/00*     (2020.01)
*B60W 30/12*     (2020.01)
(Continued)

(52) U.S. Cl.
CPC .......... *B60W 60/005* (2020.02); *B60W 30/12* (2013.01); *B60W 30/18163* (2013.01);
(Continued)

(58) Field of Classification Search
CPC ............... B60W 60/005; B60W 30/12; B60W 30/18163; B60W 50/082; B60W 50/14;
(Continued)

(56) References Cited

U.S. PATENT DOCUMENTS

2015/0015386 A1*  1/2015  Langenhan ........... B60W 30/00
                                                             340/438
2016/0121907 A1    5/2016  Otake
(Continued)

FOREIGN PATENT DOCUMENTS

JP          4572238 B2    11/2010
JP       2015102893 A     6/2015
(Continued)

*Primary Examiner* — Michael J Zanelli
(74) *Attorney, Agent, or Firm* — Harness, Dickey & Pierce, P.L.C.

(57) ABSTRACT

An HCU is to be used in a vehicle including an autonomous driving operation, and includes a function of a presentation control device that controls presentation of information to a driver of the vehicle. The presentation control device determines interruption of a second task other than driving permitted to the driver in an autonomous traveling period where the vehicle travels by the autonomous driving operation. Based on the interruption determination of the second task, the HCU changes a provision method of content provided in association with the second task in the autonomous traveling period.

18 Claims, 50 Drawing Sheets

(51) Int. Cl.
  *B60W 30/18* (2012.01)
  *B60W 50/08* (2020.01)
  *B60W 50/14* (2020.01)
  *G06F 3/14* (2006.01)
  *G08G 1/01* (2006.01)
  *G08G 1/16* (2006.01)

(52) U.S. Cl.
  CPC .......... *B60W 50/082* (2013.01); *B60W 50/14* (2013.01); *G06F 3/1423* (2013.01); *G08G 1/0133* (2013.01); *G08G 1/16* (2013.01); *B60W 2050/146* (2013.01); *B60W 2540/215* (2020.02); *B60W 2552/05* (2020.02); *B60W 2552/10* (2020.02); *B60W 2554/406* (2020.02); *B60W 2555/60* (2020.02)

(58) Field of Classification Search
  CPC ..... B60W 2050/146; B60W 2540/215; B60W 2552/05; B60W 2552/10; B60W 2554/406; B60W 2555/60; G06F 3/1423; G08G 1/0133; G08G 1/16; G08G 1/096708; G08G 1/096783; G08G 1/096791; G08G 1/0962; G08G 1/163; G08G 1/167; B60K 2360/186; B60K 2360/197; B60K 35/29; B60K 2360/164; B60K 2360/175; B60K 2360/195; B60K 35/28; B60K 35/00; G09G 2354/00; G09G 2380/10
  See application file for complete search history.

(56) References Cited

U.S. PATENT DOCUMENTS

| | | | |
|---|---|---|---|
| 2018/0024627 A1* | 1/2018 | McNew | B60K 35/10 345/156 |
| 2019/0039627 A1* | 2/2019 | Yamamoto | B60W 50/082 |
| 2020/0180642 A1* | 6/2020 | Takashiro | G05D 1/0061 |
| 2020/0231158 A1* | 7/2020 | Okuyama | B60W 30/18163 |
| 2020/0283027 A1* | 9/2020 | Okuyama | B60W 50/082 |
| 2020/0339147 A1 | 10/2020 | Hayakawa et al. | |

FOREIGN PATENT DOCUMENTS

| | | |
|---|---|---|
| JP | 2016090274 A | 5/2016 |
| JP | 2019001350 A | 1/2019 |
| JP | 201974813 A | 5/2019 |
| JP | 2019119262 A | 7/2019 |
| JP | 2019185496 A * | 10/2019 |

\* cited by examiner

FIG. 11

NOTIFICATION SETTING TABLE USED FOR SETTING OF NOTIFICATION TIMING AND NOTIFICATION INTENSITY

| PRECEDING VEHICLE | REAR SIDE VEHICLE | DRIVER STATE | TIMINGS P1 TO P3 | NOTIFICATION INTENSITY |
|---|---|---|---|---|
| NOT PRESENT | NOT PRESENT | CONCENTRATE ON DRIVING | LATE | WEAK |
| | | CONCENTRATE ON SECOND TASK | | |
| NOT PRESENT | PRESENT | CONCENTRATE ON DRIVING | NORMAL (REFERENCE) | NORMAL (REFERENCE) |
| PRESENT | NOT PRESENT | | | |
| PRESENT | PRESENT | | | |
| NOT PRESENT | PRESENT | CONCENTRATE ON SECOND TASK | EARLY | STRONG |
| PRESENT | NOT PRESENT | | | |
| PRESENT | PRESENT | | | |

FIG. 12

TIMING CONTROL EXAMPLE

| TIMING SETTING | LC ATTEMPT (P1) | LC FAILURE POSSIBILITY DETERMINATION (P2) | LC FAILURE DETERMINATION (P3) |
|---|---|---|---|
| LATE | 2 km LEFT | 1.5 km LEFT | 1 km LEFT |
| NORMAL (REFERENCE) | | NORMAL − 500 m | |
| EARLY | | NORMAL + 500 m | |

FIG. 29
LC STATUS (AUTOMATIC LC FAILURE)
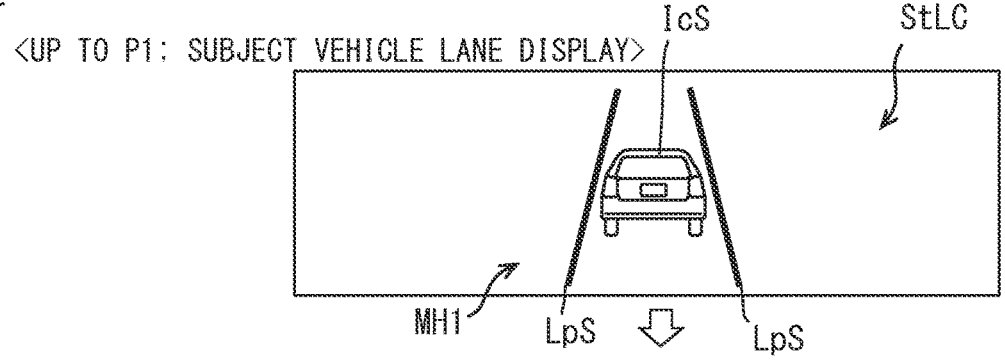
<UP TO P1: SUBJECT VEHICLE LANE DISPLAY>
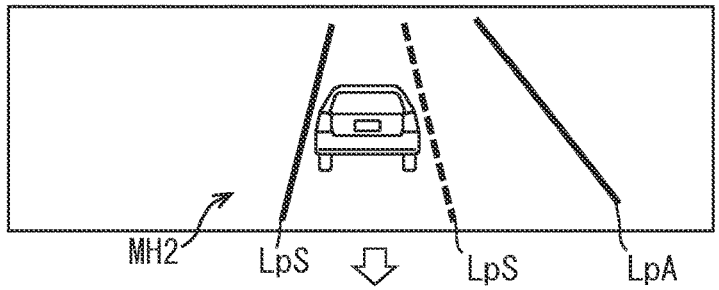
<P1 TO P4: LC-SIDE LANE ADDITIONAL DISPLAY>
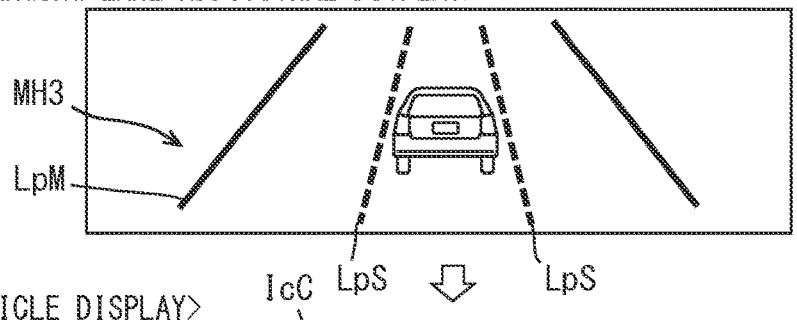
<P4 TO P6: MERGING LANE ADDITIONAL DISPLAY>
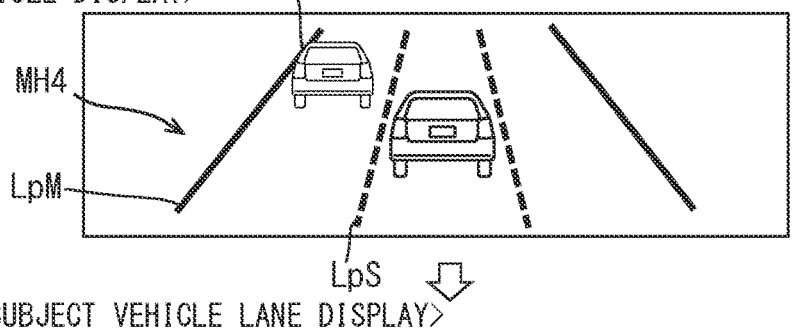
<MERGING VEHICLE DISPLAY>
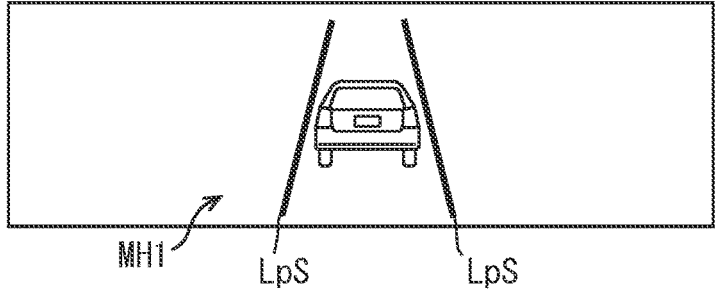
<P6 ONWARD: SUBJECT VEHICLE LANE DISPLAY>

PRESENTATION CONTROL DEVICE, PRESENTATION CONTROL PROGRAM, AND DRIVING CONTROL DEVICE

CROSS REFERENCE TO RELATED APPLICATION

The present application is a continuation application of International Patent Application No. PCT/JP2020/048192 filed on Dec. 23, 2020, which designated the U.S. and claims the benefit of priority from Japanese Patent Applications No. 2020-003092 filed on Jan. 10, 2020, No. 2020-162515 filed on Sep. 28, 2020, and No. 2020-205149 filed on Dec. 10, 2020. The entire disclosures of all of the above applications are incorporated herein by reference.

TECHNICAL FIELD

The disclosure according to this description relates to a presentation control device, a presentation control program, and a driving control device that control presentation of information to a driver of a vehicle.

BACKGROUND

In recent years, an autonomous driving operation is used for a vehicle.

SUMMARY

According to an aspect of the present disclosure, a presentation control device for a vehicle includes an autonomous driving operation and configured to control presentation of information to a driver of the vehicle.

BRIEF DESCRIPTION OF THE DRAWINGS

The above and other objects, features and advantages of the present disclosure will become more apparent from the following detailed description made with reference to the accompanying drawings. In the drawings:

FIG. 11 is a view illustrating an example of a notification setting table.

FIG. 12 is a view illustrating an example of a start point of each notification that becomes a target of timing control.

FIG. 29 is a view illustrating an example of an LC status display transition in a case of failure autonomous LC.

DETAILED DESCRIPTION

Figure 1:
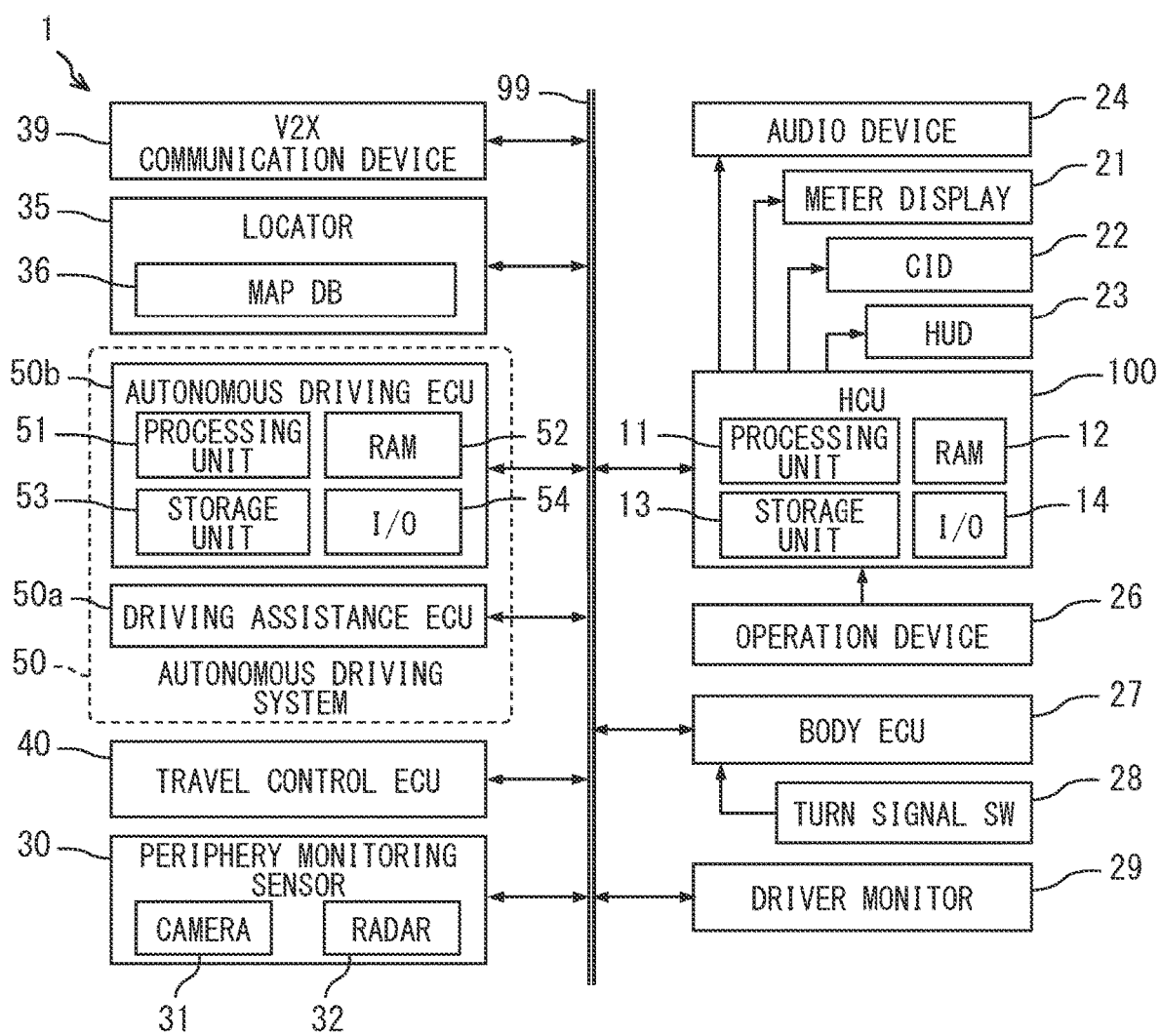
FIG. 1 is a view illustrating an overall image of an in-vehicle network including an HCU according to an embodiment of the present disclosure.

Hereinafter, examples of the present disclosure will be described.

According to an example of the present disclosure, a sound volume control device reduces and brings, into a mute state, an output sound volume of a sound output device from a set sound volume set by a user when a vehicle approaches a guide point on a guide route set in a navigation device.

In an autonomous traveling period in which a vehicle travels by an autonomous driving operation, there is a possibility of permitting the driver to perform a specific act other than driving, the specific act being called a second task, for example. Such specific act by the driver needs to be interrupted when the vehicle approaches a section where autonomous traveling is not permitted. Hence, provision of content that has been provided in association with the specific act may be also stopped by a means such as muting, for example.

However, it is difficult for a driver performing a specific act to recognize the current state where the driving changeover from the autonomous driving operation is required. Hence, it may become difficult to convince the driver that the provision of the content is forcibly stopped by the determination on the vehicle side. As a result, there has been a concern of lowering of convenience, for example, the driver is likely to feel uncomfortable about the interruption of the specific act.

According to an example of the present disclosure, a presentation control device for a vehicle includes an autonomous driving operation and configured to control presentation of information to a driver of the vehicle. The presentation control device comprises an interruption determination unit configured to determine interruption of a specific act other than driving permitted to the driver in an autonomous traveling period in which the vehicle travels by the autonomous driving operation. The presentation control device further comprises a provision control unit configured to change, based on an interruption determination of the specific act, a provision method of content provided in association with the specific act in the autonomous traveling period.

Furthermore, according to an example of the present disclosure, a presentation control program for a vehicle includes an autonomous driving operation and configured to control presentation of information to a driver of the vehicle. The presentation control program is configured to cause at least one processing unit to execute processing including determining interruption of a specific act other than driving permitted to the driver in an autonomous traveling period in which the vehicle travels by the autonomous driving operation, and changing, based on an interruption determination of the specific act, a provision method of content provided in association with the specific act in the autonomous traveling period.

According to these examples, when interruption of a specific act is determined in the autonomous traveling period, a provision method of content provided in association with the specific act is changed. Hence, from the change in the content provision method, the driver can recognize the current state in which the driving changeover from the autonomous driving operation is required. According to the above, it becomes easy to convince the driver that the specific act is interrupted by the determination on the vehicle side. Therefore, it becomes possible to enhance the driver convenience related to driving changeover.

One example is a presentation control device that is to be used in a vehicle including an autonomous driving operation and configured to control presentation of information to a driver of the vehicle, the presentation control device including: an interruption determination unit configured to determine interruption of a specific act other than driving permitted to the driver in an autonomous traveling period in which the vehicle travels by the autonomous driving operation; and a provision control unit configured to present, based on an interruption determination of the specific act, an option of selecting an interruption method of content provided in association with the specific act in the autonomous traveling period.

One example is a presentation control program that is to be used in a vehicle including an autonomous driving operation and configured to control presentation of information to a driver of the vehicle, the presentation control program configured to cause at least one processing unit to execute processing including: determining interruption of a specific act other than driving permitted to the driver in an autonomous traveling period in which the vehicle travels by the autonomous driving operation; and presenting, based on an interruption determination of the specific act, an option of selecting an interruption method of content provided in association with the specific act in the autonomous traveling period.

According to these examples, when interruption of a specific act is determined in the autonomous traveling period, an option of selecting an interruption method of content provided in association with the specific act is presented. Hence, the driver can recognize the current state in which the driving changeover from the autonomous driving operation is required through the work of selecting the interruption method based on the option. According to the above, it becomes easy to convince the driver that the specific act is interrupted by the determination on the vehicle side. Therefore, it becomes possible to enhance the driver convenience related to driving changeover.

One example is a presentation control device that is to be used in a vehicle including an autonomous driving operation and configured to control presentation of information to a driver of the vehicle, the presentation control device including a monitoring responsibility grasping unit configured to grasp presence or absence of periphery monitoring responsibility by the driver in an autonomous traveling period in which the vehicle travels by the autonomous driving operation, and a provision control unit configured to perform, when a change in presence or absence of the periphery monitoring responsibility is scheduled, a monitoring advance notification to give an advance notification of a change in presence or absence of the periphery monitoring responsibility having been scheduled, and a periphery monitoring notification configured to notify that presence or absence of the periphery monitoring responsibility has changed.

One example is a presentation control program that is to be used in a vehicle including an autonomous driving operation and configured to control presentation of information to a driver of the vehicle, the presentation control program configured to cause at least one processing unit to execute processing including grasping presence or absence of periphery monitoring responsibility by the driver in an autonomous traveling period in which the vehicle travels by the autonomous driving operation, when a change in presence or absence of the periphery monitoring responsibility is scheduled, performing a monitoring advance notification to give an advance notification of a change in presence or absence of the periphery monitoring responsibility having been scheduled, and further performing a periphery monitoring notification configured to notify that presence or absence of the periphery monitoring responsibility has changed.

According to these examples, in addition to the periphery monitoring notification for notifying that the presence or absence of the periphery monitoring responsibility has changed, a monitoring advance notification for giving an advance notification of a change in presence or absence of the periphery monitoring responsibility having been scheduled is performed. Hence, even if the driver performs a specific act other than driving in the autonomous traveling period in which the driver does not have the periphery monitoring responsibility, it is possible to cause the driver to recognize early that there is a request for a driving changeover from the autonomous driving operation. Therefore, it becomes possible to enhance the driver convenience related to driving changeover.

One example is a presentation control device that is to be used in a vehicle including an autonomous driving operation and configured to control presentation of information to a driver of the vehicle, the presentation control device including a recommended lane selection unit that selects, from among a plurality of lanes, a recommended lane for traveling in which unmonitored autonomous traveling without periphery monitoring responsibility by the driver is estimated to continue for a long time or a long distance by the autonomous driving operation, and a lane proposal unit that proposes, when the unmonitored autonomous traveling is performed, traveling in the recommended lane for traveling to the driver.

One example is a presentation control program that is to be used in a vehicle including an autonomous driving operation and configured to control presentation of information to a driver of the vehicle, the presentation control program configured to cause at least one processing unit to execute processing including selecting, from among a plurality of lanes, a recommended lane for traveling in which unmonitored autonomous traveling without periphery monitoring responsibility by the driver is estimated to continue for a long time or a long distance by the autonomous driving operation, and when the unmonitored autonomous traveling is performed, proposing traveling in the recommended lane for traveling to the driver.

In these examples, the driver is proposed to travel in a recommended lane for traveling in which unmonitored autonomous traveling without periphery monitoring responsibility is estimated to continue for a long time or a long distance. By following such proposal, the driver can reduce the frequency of driving changeover. Therefore, it becomes possible to enhance the driver convenience related to driving changeover.

One example is a driving control device that is to be used in a vehicle and configured to implement an autonomous driving operation configured to replace at least a part of a driving task of a driver, the driving control device including: a travel environment determination unit configured to determine whether the vehicle travels in a preset autonomous driving possible area and whether the vehicle travels in a traffic jam; and an autonomy level determination unit configured to enable, when the vehicle travels in the autonomous driving possible area or in a traffic jam, performance of unmonitored autonomous traveling without periphery monitoring responsibility by the driver, in which the autonomy level determination unit permits the unmonitored autonomous traveling in a merging section, and disables the unmonitored autonomous traveling in a passing lane when the vehicle travels in the autonomous driving possible area, and permits the unmonitored autonomous traveling in a passing lane when the vehicle travels in a traffic jam.

In this example, the unmonitored autonomous traveling in a passing lane is disabled when the vehicle travels in an autonomous driving possible area. However, the unmonitored autonomous traveling in a passing lane is permitted when the vehicle travels in a traffic jam. Therefore, when in a traffic jam, autonomous traveling in a state of being free from the periphery monitoring responsibility can be continued even in a passing lane in addition to a merging lane. Therefore, reduction in frequency of driving changeover makes it possible to enhance the driver convenience related to driving changeover.

A plurality of embodiments of the present disclosure will be described below with reference to the drawings. The same reference numerals are given to corresponding components in each embodiment, and redundant description may be omitted. When only a part of the configuration is described in each embodiment, the configuration of the other embodiments described above can be applied to other parts of the configuration. It is possible to combine not only configurations explicitly described in the description of each embodiment but also to partially combine configurations of a plurality of embodiments even if not explicitly described unless the combination is particularly hindered. Combinations of configurations described in a plurality of embodiments and modifications that are not explicitly described shall also be disclosed by the following description.

First Embodiment

Figure 2:
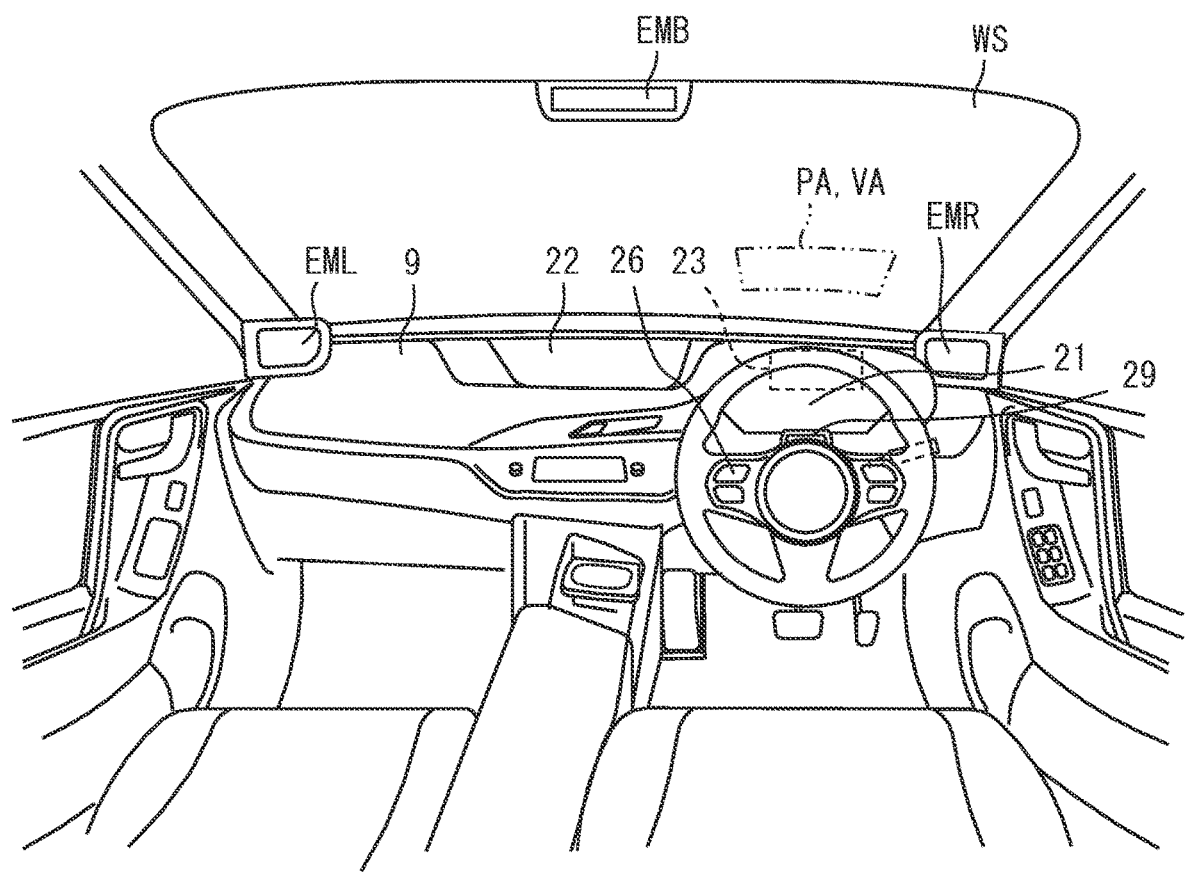
FIG. 2 is a view illustrating an example of a layout of an interface around a driver's seat.
Figure 3:
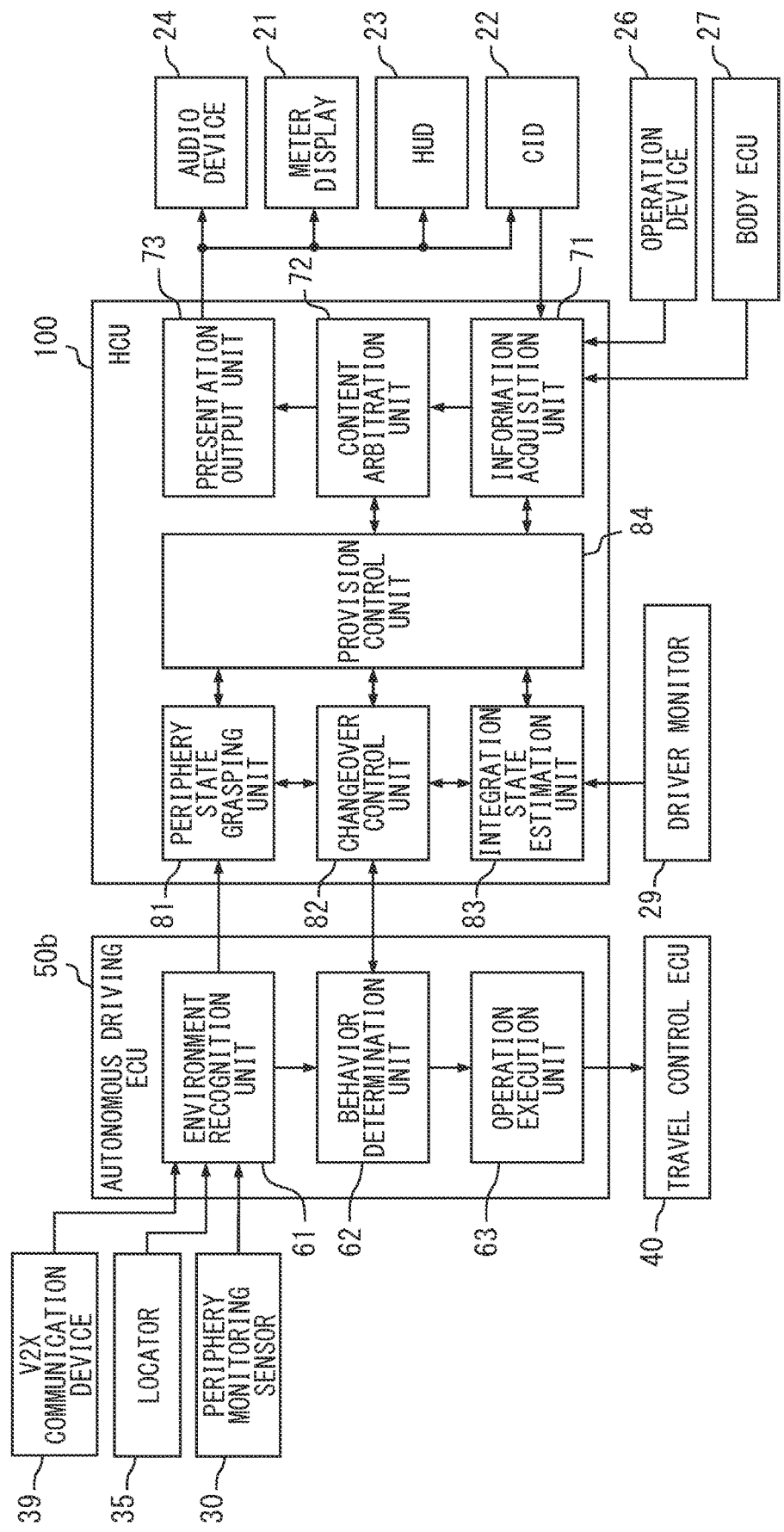
FIG. 3 is a view illustrating an example of a function unit constructed in the HCU together with a related configuration.

The function of a presentation control device according to an embodiment of the present disclosure is implemented by a human machine interface control unit (HCU) 100 illustrated in FIG. 1. The HCU 100 is an in-vehicle electronic control unit (ECU). As illustrated in FIGS. 1 to 3, the HCU 100, together with a plurality of display devices, an audio device 24, constitutes an operation device 26, and the like, a human machine interface (HMI) system used in a vehicle A. The HMI system includes an input interface function of accepting an operation by an occupant (for example, a driver) of the vehicle A and an output interface function of presenting information to the driver.

The HCU 100 is communicably connected to a communication bus 99 of an in-vehicle network 1 mounted on the vehicle A. The HCU 100 is one of a plurality of nodes provided in the in-vehicle network 1. The communication bus 99 is connected to a body ECU 27, a driver monitor 29, a periphery monitoring sensor 30, a locator 35, a V2X communication device 39, a travel control ECU 40, a driving assistance ECU 50a, an autonomous driving ECU 50b, and the like. These nodes connected to the communication bus 99 of the in-vehicle network 1 can communicate with one another.

The body ECU 27 is an electronic control device mainly including a microcontroller. The body ECU 27 has at least a function of controlling operation of a lighting device mounted on the vehicle A. The body ECU 27 is electrically connected to a turn signal switch 28. The turn signal switch 28 is a lever-shaped operation unit provided in a steering column unit. The body ECU 27 starts blinking of one of right and left turn signals corresponding to an operation direction based on detection of a user operation input to the turn signal switch 28. In addition, the body ECU 27 provides operation information on the user operation input to the turn signal switch 28 to 100 or the like through the communication bus 99.

The driver monitor 29 has a configuration including a near-infrared light source, a near-infrared camera, and a control unit that controls them. The driver monitor 29 is installed, for example, on the upper surface of the steering column unit, the upper surface of an instrument panel 9, or the like in a posture in which the near-infrared camera faces a headrest portion of the driver's seat. The driver monitor 29 photographs, with the near-infrared camera, the head of the driver irradiated with near-infrared light by the near-infrared light source. An image captured by the near-infrared camera is subjected to image analysis by the control unit. The control unit extracts information such as the position of the eye point and the line-of-sight direction of the driver from the captured image, and provides the extracted driver state information to the HCU 100 and the like via the communication bus 99.

The periphery monitoring sensor 30 is an autonomous sensor that monitors the peripheral environment of the vehicle A. The periphery monitoring sensor 30 can detect a moving object and a stationary object defined in advance from a detection range around a subject vehicle. The periphery monitoring sensor 30 can detect at least a front vehicle, a rear vehicle, front and rear side vehicles, and the like that travel around the subject vehicle. The periphery monitoring sensor 30 provides detection information on an object around the vehicle to the driving assistance ECU 50a, the autonomous driving ECU 50b, and the like through the communication bus 99.

The periphery monitoring sensor 30 includes, for example, a camera unit 31 and a millimeter wave radar 32. The camera unit 31 may have a configuration including a monocular camera or may have a configuration including a compound-eye camera. The camera unit 31 is mounted on the vehicle A so as to be able to photograph a front range, a side range, a rear range, and the like of the vehicle A. The camera unit 31 outputs, as detection information, at least one of imaging data in which the surroundings of the vehicle are imaged and an analysis result of the imaging data. The millimeter wave radar 32 irradiates the surroundings of the subject vehicle with millimeter waves or quasi-millimeter waves. The millimeter wave radar 32 outputs detection information generated by processing of receiving reflected waves reflected by a moving object, a stationary object, or the like. The periphery monitoring sensor 30 may further include a detection configuration such as a rider and a sonar.

The locator 35 has a configuration including a global navigation satellite system (GNSS) receiver and an inertial sensor. The locator 35 combines a positioning signal received by the GNSS receiver, a measurement result of the inertial sensor, vehicle speed information output to the communication bus 99, and the like to sequentially position the subject vehicle position, the traveling direction, and the like of the vehicle A. The locator 35 sequentially outputs position information and direction information of the vehicle A based on the positioning result to the communication bus 99 as locator information.

The locator 35 further includes a map database 36. The map database 36 has a configuration mainly including a large-capacity storage medium storing a large number of pieces of three-dimensional map data and two-dimensional map data. The three-dimensional map data is so-called high-precision map data, and includes information necessary for advanced driving assistance and autonomous driving, such as three-dimensional shape information of roads and detailed information on each lane. The locator 35 reads map data around the current position from the map database 36, and provides the map data together with locator information to the driving assistance ECU 50a, the autonomous driving ECU 50b, and the like. Instead of the locator 35, a user terminal such as a smartphone, a navigation device, or the like may provide the position information, the direction information, the map data, and the like to the driving assistance ECU 50a and the autonomous driving ECU 50b.

A vehicle to everything (V2X) communication device 39 is a communication unit mounted on the vehicle A. The V2X communication device 39 transmits and receives, by wireless communication, information to and from an in-vehicle communication device mounted on another vehicle and a roadside machine installed by the roadside. The V2X communication device 39 can receive position information, speed information, and the like of other vehicles traveling around the subject vehicle by vehicle-to-vehicle communication or road-to-vehicle communication. In addition, the V2X communication device 39 receives information indicating the control situation of autonomous driving of other vehicles, such as whether the autonomous driving operation is operating in other vehicles traveling around the subject vehicle. The V2X communication device 39 provides the received information on other surrounding vehicles to the autonomous driving ECU 50b, the HCU 100, and the like.

The travel control ECU 40 is an electronic control device mainly including a microcontroller. The travel control ECU 40 generates and sequentially outputs, to the communication bus 99, vehicle speed information indicating a current traveling speed of the vehicle A based on a detection signal of a wheel speed sensor provided in a hub portion of each wheel. In addition, the travel control ECU 40 has at least functions of a brake control ECU and a drive control ECU. Based on any one of an operation command based on the driving operation by the driver, a control command of the driving assistance ECU 50*a*, and a control command of the autonomous driving ECU 50*b*, the travel control ECU 40 continuously performs control of the braking force generated in each wheel and output control of the in-vehicle power source.

The driving assistance ECU 50*a* and the autonomous driving ECU 50*b* are mounted on the vehicle A as in-vehicle ECUs constituting an autonomous driving system 50. The driving assistance ECU 50*a* and the autonomous driving ECU 50*b* are used in the vehicle A and implement an autonomous driving operation configured to replace at least part of a driving task (Dynamic Driving Task, DDT) of the driver. Due to the mounting of the autonomous driving system 50 including the driving assistance ECU 50*a* and the autonomous driving ECU 50*b*, the vehicle A becomes an autonomous driving vehicle including the autonomous driving operation.

The driving assistance ECU 50*a* is an in-vehicle ECU that implements a driving assistance function of assisting the driving operation of the driver. The driving assistance ECU 50*a* enables advanced driving assistance of about Level 2 or partial autonomous travel control at an autonomous driving level defined by the Society of Automotive Engineers. The driving assistance ECU 50*a* is a computer mainly including a control circuit including a processing unit, a RAM, a storage unit, an input/output interface, and bus connecting them. The driving assistance ECU 50*a* includes a plurality of function units that implement advanced driving assistance by execution of a program by the processing unit. Specifically, the driving assistance ECU 50*a* includes an adaptive cruise control (ACC) function unit, a lane tracing assist (LTA) function unit, and a lane change assist (LCA) function unit.

The autonomous driving ECU 50*b* is an in-vehicle ECU that implements an autonomous driving operation configured to replace a driver's driving operation. The autonomous driving ECU 50*b* enables Level 3 autonomous traveling or higher (referred to as Lv3 in the drawings) in which the system becomes a control subject only in a preset limited operational design domain (ODD). The operational design domain (ODD) is an autonomous driving possible area at the autonomous driving level 3. The autonomous driving ECU 50*b* may be capable of implementing an autonomous driving operation of Level 4 or higher.

Here, details of the autonomous driving level will be further described. The autonomous driving level in the following description is based on the definition of SAE J3016. For the definition of the autonomous driving level, a concept of fallback is used in addition to the concepts of the driving task (DDT) and the operational design domain (ODD) described above. In each autonomous driving level, a range of a driving task replaced by the autonomous driving operation is defined. The higher the autonomous driving level becomes, the wider the range of the driving task replaced by the autonomous driving operation becomes. Specifically, in the driving task, an item of the "sustained lateral and longitudinal vehicle motion control" and the item of "Object and Event Detection and Response" (OEDR) are supplementarily defined. The OEDR is sometimes described as "periphery monitoring" for descriptive purposes in the following description.

In the autonomous driving level 0, the driving is not automated, and the driving task and the fallback are performed by the driver. At the autonomous driving level 1, driver assistance is performed, and the sustained driving control of the vehicle is performed by both the driver and the system. In contrast, at the autonomous driving levels 4 and 5, the driving task and the fallback are all implemented by the system.

In the autonomous driving functions of the autonomous driving levels 2 and 3 implemented by the autonomous driving system 50, the sustained driving control of the vehicle is performed by the system. At the autonomous driving level 2, periphery monitoring (OEDR) and fallback become the responsibility of the driver. At the autonomous driving level 2, autonomous travel requiring the driver to hold the steering wheel is referred to as "hands-on travel" (In FIG. 4, described as H-on). On the other hand, autonomous travel not requiring the driver to hold the steering wheel is referred to as "hands-off travel" (In FIG. 4, described as H-off). In any of the hands-on travel and the hands-off travel, monitored autonomous traveling in which the driver has a periphery monitoring responsibility is performed at the autonomous driving level 2.

At the autonomous driving level 3, the system is responsible for periphery monitoring, and the driver needs to take a preliminary measure for fallback. Unmonitored autonomous traveling in which the driver does not have a periphery monitoring responsibility is performed at the autonomous driving level 3. Autonomous traveling without periphery monitoring responsibility at the autonomous driving level 3 is referred to as "eyes-off travel".

The autonomous driving ECU 50*b* is a computer mainly including a control circuit including a processing unit 51, a RAM 52, a storage unit 53, an input/output interface 54, and bus connecting them. The autonomous driving ECU 50*b* has a higher arithmetic capability than the driving assistance ECU 50*a* has, and can perform at least travel control corresponding to ACC, LTA, and LCA. The autonomous driving ECU 50*b* includes an environment recognition unit 61, a behavior determination unit 62, and an operation execution unit 63 as a plurality of function units that implement autonomous traveling of the vehicle A by execution of a program (driving control program) by the processing unit 51.

The environment recognition unit 61 recognizes the travel environment of the vehicle A based on locator information and map data acquired from the locator 35, detection information acquired from the periphery monitoring sensor 30, information on other vehicles acquired from the V2X communication device 39, and the like. Specifically, the environment recognition unit 61 grasps the position of the subject vehicle lane on which the subject vehicle travels among the plurality of lanes, the lane shape of the subject vehicle lane, and the relative position, the relative speed, the autonomous driving control situation, and the like of other vehicles around the subject vehicle.

In addition, the environment recognition unit 61 grasps, based on the map data, the presence outside the operational design domain (hereinafter, limited domain) where autonomous driving at Level 3 is not permitted. As an example, the environment recognition unit 61 grasps, as an outside of the limited domain, a region where high-precision map data (three-dimensional map data) for autonomous driving does not exist. As described above, the high-precision map data is map data higher in precision than map data (corresponding to two-dimensional map data) for navigation used for route guidance. As another example, the environment recognition unit 61 grasps, as an outside of the limited domain, a travel section requiring periphery monitoring by the driver, such as a merging section CfS described later.

The behavior determination unit 62 generates a scheduled travel line on which the vehicle A travels based on the recognition result of the travel environment by the environment recognition unit 61. When the environment recognition unit 61 grasps the presence outside the limited domain, the behavior determination unit 62 generates a scheduled travel line for traveling while avoiding the outside of the limited domain. For example, the behavior determination unit 62 can autonomously perform a lane change (hereinafter, autonomous LC) toward a lane that is not outside the limited domain as an avoidance behavior to avoid the outside of the limited domain. The operation execution unit 63 executes acceleration/deceleration control, steering control, and the like of the vehicle A in accordance with the scheduled travel line generated by the behavior determination unit 62 in cooperation with the travel control ECU 40. The autonomous LC is travel control in which the driver does not have periphery monitoring responsibility, and becomes specific travel control excluding lane keeping control that causes the vehicle A to travel along the lane on which the vehicle A is traveling.

Next, details of each of the plurality of display devices, the audio device 24, the operation device 26, and the HCU 100 included in the HMI system will be sequentially described.

The plurality of display devices include a meter display 21, a center display (CID) 22, and head-up display (hereinafter, HUD) 23. The plurality of display devices may further include displays EMB, EML, and EMR of an electronic mirror system. The meter display 21, the CID 22, and the HUD 23 present information through driver's visual perception.

The meter display 21 and the CID 22 are configured to mainly include, for example, a liquid crystal display, an organic light emitting diode (OLED) display, or the like. The meter display 21 and the CID 22 display various images on the display screen based on a control signal and video data acquired from the HCU 100. The meter display 21 is installed in front of the driver's seat, for example. The CID 22 is installed above a center cluster, for example. The CID 22 has a touchscreen function, and detects a touch operation and a swipe operation on a display screen, for example, by the driver or the like.

Based on the control signal and the video data acquired from the HCU 100, the HUD 23 projects light of an image formed in front of the driver onto a projection area PA defined on a windshield WS or the like. Light of the image reflected to the vehicle interior side by the windshield WS is perceived by the driver seated on the driver's seat. Thus, the HUD 23 displays a virtual image in a space in front of the projection area PA. The driver visually recognizes the virtual image in an angle of view VA displayed by the HUD 23, the virtual image being superimposed on a foreground of the vehicle A.

The audio device 24 includes a plurality of speakers installed in the vehicle interior in an arrangement surrounding the driver. The audio device 24 causes the speaker to reproduce a notification sound, a voice message, or the like in the vehicle interior based on a control signal and audio data acquired from the HCU 100. The audio device 24 presents information through the driver's auditory perception.

The operation device 26 is an input unit that accepts a user operation by the driver or the like. For example, a user operation or the like related to operation and stop of the autonomous driving operation is input to the operation device 26. The operation device 26 includes a steering switch provided on a spoke portion of the steering wheel, an operation lever provided on a steering column portion, and a voice input device that recognizes utterance content of the driver.

The HCU 100 is an electronic control device that integrally controls display by the meter display 21, the CID 22, and the HUD 23 in the HMI system. The HCU 100 is a computer mainly including a control circuit including a processing unit 11, a RAM 12, a storage unit 13, an input/output interface 14, and bus connecting them.

The processing unit 11 is hardware for arithmetic processing coupled with the RAM 12. The processing unit 11 is configured to include at least one arithmetic core such as a central processing unit (CPU) and a graphics processing unit (GPU). The processing unit 11 may further be configured to include a field-programmable gate array (FPGA), a neural network processing unit (NPU), and an IP core having another dedicated function. The RAM 12 may have a configuration including a video RAM for generating video data. The processing unit 11 executes various processing for implementing the presentation control method of the present disclosure by accessing the RAM 12. The storage unit 13 has a configuration including a nonvolatile storage medium. The storage unit 13 stores various programs (such as a presentation control program) to be executed by the processing unit 11.

The HCU 100 includes a plurality of function units that, by the processing unit 11 executing a presentation control program stored in the storage unit 13, integrally controls presentation of information to the driver using each display device and the audio device 24. Specifically, function units such as an information acquisition unit 71, a content arbitration unit 72, and a presentation output unit 73 are constructed in the HCU 100.

The information acquisition unit 71 acquires, from the communication bus 99, vehicle information indicating the state of the vehicle A. The vehicle information includes, for example, vehicle speed information, and status information indicating the state of the autonomous driving operation. The information acquisition unit 71 acquires operation information indicating the content of the user operation from the CID 22, the operation device 26, the body ECU 27, and the like. The information acquisition unit 71 acquires content data necessary for display of moving image content CTV (see FIG. 14 and the like) described later. The content data is provided to the information acquisition unit 71 by a television tuner mounted on the vehicle A, an external medium electrically connected to the HCU 100, and a user terminal such as a smartphone paired with the HCU 100.

The content arbitration unit 72 performs selection and arbitration of content to be displayed on each display device. The content arbitration unit 72 comprehensively determines the priority of each content based on the acquisition information acquired by the information acquisition unit 71. The content arbitration unit 72 selects the content determined to have a high priority as the content to be displayed. In addition, the content arbitration unit 72 can sequentially change, according to the priority, the display size and the display layout of each piece of content to be displayed on each display device. As an example, the content arbitration unit 72 increases the display size of the content having a higher priority. As another example, the content arbitration unit 72 positions the content having a higher priority on a closer side to the viewer of each display area.

Based on the acquisition information of the information acquisition unit 71 and the selection result of the content arbitration unit 72, the presentation output unit 73 generates a control signal and video data to be provided to each display device and a control signal and audio data to be provided to the audio device 24. The presentation output unit 73 sequentially outputs the generated control signal, video data, audio data, and the like to each presentation device.

The autonomous driving ECU 50*b* and the HCU 100 described above enable the driver to perform an act other than driving. More specifically, in the autonomous traveling period during which the vehicle A autonomously travels by the autonomous driving operation at Level 3 by the autonomous driving ECU 50*b*, the driver can be permitted to perform a specific act (hereinafter, second task) that is defined in advance, the specific act other than driving. The driver in this case is a person (passenger) who takes over the driving control right from the autonomous driving system 50 when going out of the limited domain or in an emergency. The driver can be legally permitted to perform the second task until a performance request of the driving operation by the autonomous driving system 50, that is, a request for a driving changeover (take over request) occurs.

The second task can be called a secondary activity, an other activity, or the like. The second task shall not prevent the driver from responding to a takeover request for driving operation from the autonomous driving system 50. As an example, acts such as viewing of content such as a moving image (hereinafter, refer to moving image content CTV, FIG. 10), operation on a smartphone or the like, and eating are assumed as the second task.

Here, the driving changeover from the autonomous driving system 50 to the driver includes handover, in which the control right is systematically handed over to the driver by determination of the system side, and override, in which the driver acquires the control right by his/her own determination in a highly urgent situation. Driving changeover that causes the driver to interrupt the second task being performed and causes the autonomous driving system 50 to take over the driving operation to the driver corresponds to handover.

As one of the scenes in which handover can occur, a scene (see FIG. 4) is assumed, in which the vehicle approaches the merging section CfS while traveling on a limited-access road or a controlled-access highway. The merging section CfS is a connection section connected to a merging lane ML in a travel lane DL of a main vehicular lane, and is a section from a merging start point P5 to a merging end point P6. The merging section CfS is set only in the travel lane DL, which is a merged lane connected to the merging lane ML, among the plurality of lanes of the main vehicular lane, and is not set in a passing lane PL. That is, the passing lane PL is within the limited domain. If the merging lane ML is a road connected to the passing lane PL of the main vehicular lane, the merging section CfS is set to the passing lane PL. The merging section CfS is in contact with a lane reduction point where the merging lane ML disappears in the traveling direction, an end point of a climbing lane, and the like. However, the merging lane ML may be a lane that does not disappear in the traveling direction and branches again from the travel lane DL.

The limited-access road and the controlled-access highway are set to a limited domain in principle. Three-dimensional map data is also prepared in advance for such limited-access road and controlled-access highway. Therefore, autonomous travel at Level 3 is possible. On the other hand, the merging section CfS is locally outside the limited domain, and other vehicles are assumed to merge from the merging lane ML to the travel lane DL, so that traveling by the autonomous driving operation is restricted.

Figure 5:
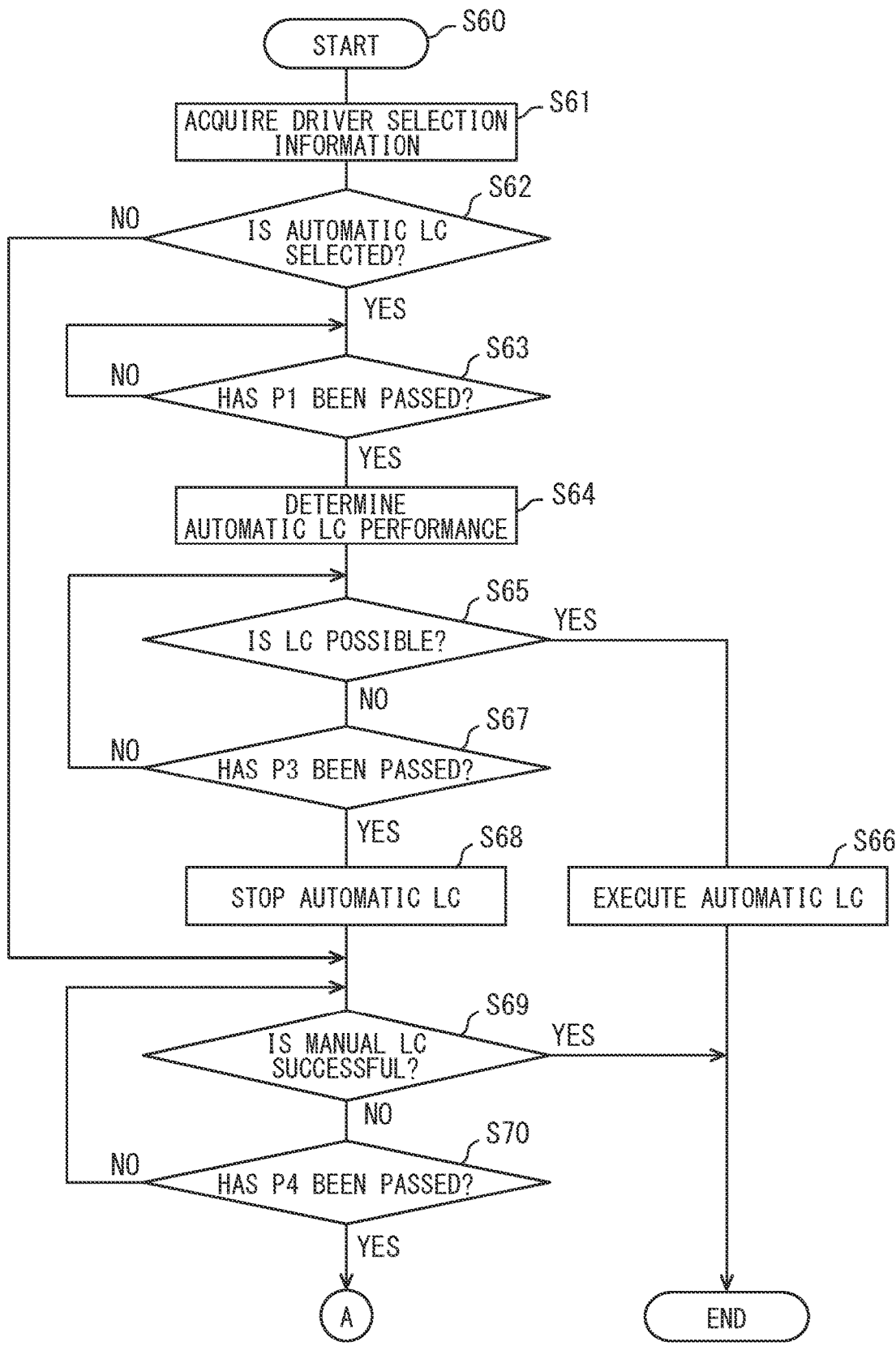
FIG. 5 is a flowchart illustrating, together with FIG. 6, a detail of autonomy level control processing performed by an autonomous driving ECU when a merging section existing in a traveling direction is grasped.
Figure 6:
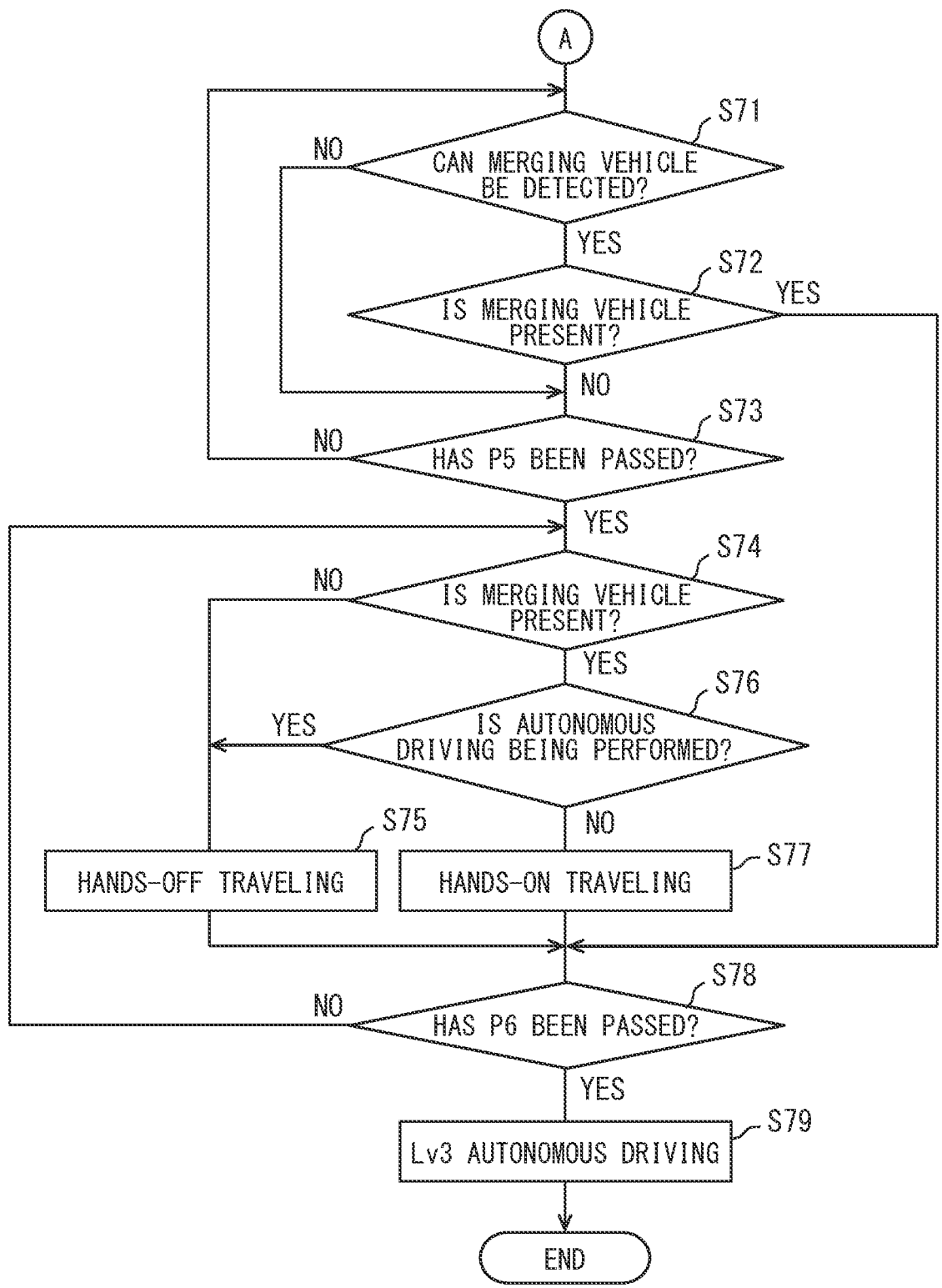
FIG. 6 is a flowchart illustrating a detail of the autonomy level control processing together with FIG. 5.

When the vehicle A traveling in the travel lane DL approaches the merging section CfS, the autonomous driving ECU 50*b* grasps the presence of the merging section CfS based on the map data and the like. Based on the grasping of the merging section CfS existing in the traveling direction (S60), the autonomous driving ECU 50*b* starts the autonomy level control processing illustrated in FIGS. 5 and 6. Based on FIGS. 5 and 6, details of the autonomy level control processing will be described below with reference to FIGS. 3 and 4.

Figure 9:
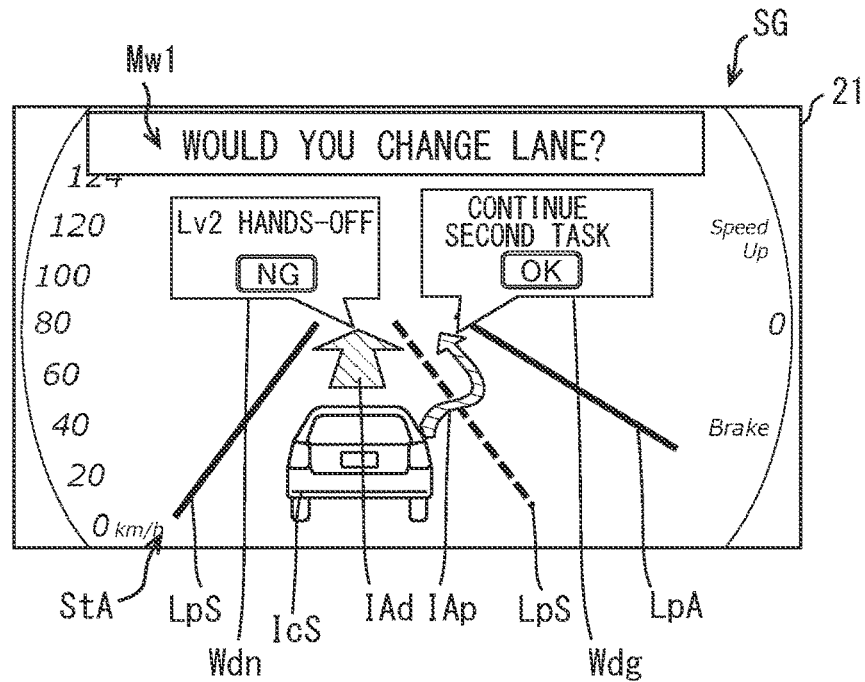
FIG. 9 is a view illustrating an example of the selection screen.

Based on grasping of the merging section CfS, the autonomous driving ECU 50*b* starts acquisition of driver's selection information (S61). The driver's selection information is operation information based on the selection of the driver who has determined whether to perform the autonomous LC from the travel lane DL to the passing lane PL. In cooperation with the HCU 100, the autonomous driving ECU 50*b* inquires of the driver whether to perform the autonomous LC. At this time, by screen display of the meter display 21 or the like, the autonomous driving ECU 50*b* notifies the driver of a difference between the autonomous driving control at Level 2 in a case where traveling in the travel lane DL is continued and the autonomous driving control at Level 3 in a case where the lane is changed to the passing lane PL. As an example, the HCU 100 displays a selection screen SG (see FIG. 9) on the screen of the meter display 21. The autonomous driving ECU 50*b* acquires, from the HCU 100, driver selection information grasped by the HCU 100.

The autonomous driving ECU 50*b* determines whether performance of the autonomous LC has been selected by the driver based on the driver selection information (S62). When determining that the driver has selected not to perform the autonomous LC (S62: NO), the autonomous driving ECU 50*b* transitions to a state of waiting for a lane change (hereinafter, manual LC) to the passing lane PL by the driver (S69). On the other hand, when determining that the driver has selected to perform the autonomous LC (S62: YES), the autonomous driving ECU 50*b* waits for the vehicle A to arrive at a predetermined point (hereinafter, LC start point P1) before the merging section CfS (S63: YES), and then determines performance of the autonomous LC (S64). This starts an attempt of the autonomous LC to the passing lane PL.

The autonomous driving ECU 50*b* determines whether the lane change is possible based on the situation in the passing lane PL (S65). When determining that the lane change is possible (S65: YES), the autonomous driving ECU 50*b* executes the autonomous LC (S66). Such autonomous LC is avoidance travel control for avoiding entry into the merging section CfS, and is an avoidance behavior for avoiding interruption of the second task. When the autonomous LC succeeds, the autonomous driving ECU 50*b* continues the autonomous traveling at Level 3 in the passing lane PL.

On the other hand, when determining that the vehicle A passes through a predetermined confirmation point P3 (S67: YES) with lane change to the passing lane PL being not possible (S65: NO), the autonomous driving ECU 50*b* stops the autonomous LC (S68). In this case, the autonomous driving ECU 50b determines whether the manual LC to the passing lane PL by the driver has succeeded (S69). Even in a case where the autonomous LC has failed, when the manual LC by the driver has succeeded, the autonomous driving ECU 50b continues the autonomous traveling at Level 3 in the passing lane PL.

On the other hand, when the vehicle A passes through a predetermined point (hereinafter, TOR point P4) before the merging section CfS without being able to move to the passing lane PL (S70: YES), the autonomous driving ECU 50b requests the driver to take over the driving operation in cooperation with the HCU 100. Here, the autonomous driving ECU 50b performs the autonomous LC at a timing when a driving changeover time necessary for driving changeover from the autonomous driving operation to the driver can be secured before entry into the merging section CfS. That is, the autonomous LC is desirably completed at least before the driving changeover time of arrival timing at the merging start point P5.

Here, the TOR point P4 is a position closer to the merging start point P5 than the LC start point P1. The LC start point P1 and the TOR point P4, as well as a halfway point P2 and the confirmation point P3 that are set between them, are set with reference to the merging start point P5. As described later, the position of each of the points P1 to P4 with respect to the merging start point P5 may be appropriately changed according to the vehicle state of the subject vehicle, the driver state, and the other vehicle state around the subject vehicle by timing control by the autonomous driving ECU 50b and the HCU 100.

As an example, the LC start point P1 is set at a position 1 km left to the merging start point P5 or a position about 30 seconds before arriving at the merging start point P5. The TOR point P4 is set at a position 500 m left to the merging start point P5 or a position about 15 seconds before arriving at the merging start point P5. Note that the section from the TOR point P4 to the merging start point P5 becomes a merging preparation section CpS positioned before the merging section.

When determining passage through the TOR point P4, that is, entry into the merging preparation section CpS, the autonomous driving ECU 50b determines (S71) whether it is a traveling scene in which a merging vehicle Ac traveling in the merging lane ML can be detected. For example, in a case where there is no wall or the like between the travel lane DL and the merging lane ML, the autonomous driving ECU 50b determines that the merging vehicle Ac can be detected by the periphery monitoring sensor 30. Also in a case where information on other vehicles traveling in the merging lane ML is sequentially transmitted to the V2X communication device 39 of the subject vehicle by road-to-vehicle communication, the autonomous driving ECU 50b determines that the merging vehicle Ac can be detected.

When the merging vehicle Ac can be detected (S71: YES), the autonomous driving ECU 50b continuously determines the presence or absence of the merging vehicle Ac while traveling in the merging preparation section CpS (S72). When grasping the presence of the merging vehicle Ac during performance of eyes-off travel (S72: YES), the autonomous driving ECU 50b switches from the Level 3 autonomous driving to the Level 2 autonomous driving (hands-on travel) (S77).

When passing through the merging start point P5 without detecting the merging vehicle Ac (S73: YES), the autonomous driving ECU 50b also grasps the presence or absence of the merging vehicle Ac traveling in the merging lane ML also in the merging section CfS (S74). In the merging section CfS, the autonomous driving ECU 50b determines the autonomous driving level according to the presence or absence of the merging vehicle Ac, which is a parallel traveling vehicle traveling in the merging lane ML and is about to merge into the travel lane DL. When determining that the merging vehicle Ac traveling in the merging lane ML has not been detected and the merging vehicle Ac that is merging does not exist (S74: NO), the autonomous driving ECU 50b switches from the Level 3 autonomous driving to the Level 2 autonomous driving (hands-off travel) (S75). As a result, the driver is responsible for periphery monitoring of the subject vehicle as a driving act (driving task) in the period in which the subject vehicle travels in the merging section CfS. Note that the Level 2 autonomous driving may be performed by the autonomous driving ECU 50b or may be performed by the driving assistance ECU 50a.

Upon grasping the presence of the merging vehicle Ac traveling in the merging lane ML (S74: YES), the autonomous driving ECU 50b further grasps the control situation of the autonomous driving of the merging vehicle Ac based on the information acquired by the vehicle-to-vehicle communication or the road-to-vehicle communication (S76). When the merging vehicle Ac is traveling by the autonomous driving operation (S76: YES), the autonomous driving ECU 50b determines to continue the hands-off travel without requesting the driver to hold the steering wheel (S75).

On the other hand, in a case of not being possible to determine that the merging vehicle Ac is traveling by the autonomous driving operation (S76: NO), the autonomous driving ECU 50b requests the driver to hold the steering wheel. Due to this, the autonomous driving ECU 50b switches the control from the hands-off travel to the hands-on travel in the Level 2 autonomous driving (S77). The processing of switching between the hands-off travel and the hands-on travel is also included in the determination of the autonomous driving level.

The autonomous driving ECU 50b continues detection of the merging vehicle Ac until passing through the merging end point P6. Then, when the vehicle A leaves the merging section CfS at the merging end point P6 (S78: YES), the autonomous driving ECU 50b determines resumption of the Level 3 autonomous driving based on the driver's approval (S79). Similarly to P1 to P3, a resuming point where the Level 3 autonomous traveling and the resumption of the second task are permitted may be appropriately changed by timing control by the autonomous driving ECU 50b and the HCU 100.

When the driver does not respond to the takeover request for the driving operation from the system, the autonomous driving system 50 performs warning to the driver in cooperation with the HCU 100 in the merging section CfS. Specifically, a notification for making a periphery confirmation request (hereinafter, periphery monitoring request notification Nt21), a notification for making a hands-on request (hereinafter, hands-on request notification Nt22), and the like are performed as warning to the driver. In this case, the autonomous driving system 50 continues the Level 2 autonomous driving or transitions to emergency evacuation by the operation of a minimal risk maneuver (MRM). When transitioning to the MRM, a notification for notifying the driver of the transition to the MRM (hereinafter, MRM transition notification Nt23) is performed.

In the approach scene to the merging section CfS described above, the HCU 100 performs presentation control of interrupting the second task of the driver and causing the driver to smoothly respond to driving changeover. An interruption section TXS for interrupting the second task includes a predetermined section before the merging section CfS in addition to the merging section CfS (see FIG. 4). As an example, the merging preparation section CpS from the TOR point P4 to the merging start point P5 is set as the interruption section TXS together with the merging section CfS. The plurality of such function units that perform the handover process before the interruption section TXS are constructed in the HCU 100. Specifically, based on the presentation control program, the HCU 100 further includes function units such as a periphery state grasping unit 81, a changeover control unit 82, an integration state estimation unit 83, and a provision control unit 84.

The periphery state grasping unit 81 grasps the state of another vehicle traveling around the vehicle A based on result information on the environment recognition acquired from the environment recognition unit 61 of the autonomous driving ECU 50b. Specifically, the periphery state grasping unit 81 grasps detection results of other vehicles around the subject vehicle such as the preceding vehicle and the rear side vehicle before the autonomous LC is started. In addition, the periphery state grasping unit 81 grasps a detection result of the merging vehicle Ac traveling in the merging lane ML in the period of traveling in the merging section CfS.

In cooperation with the behavior determination unit 62 of the autonomous driving ECU 50b, the changeover control unit 82 controls transfer of the control right related to the driving operation between the autonomous driving system 50 and the driver. The changeover control unit 82 grasps input of an activation operation by the driver in the limited domain where the Level 3 autonomous driving is possible, and starts the operation of the Level 3 autonomous driving by the autonomous driving ECU 50b.

In addition, in a case where there is a possibility of entry to the outside of the limited domain such as the merging section CfS, for example, the changeover control unit 82 acquires a changeover request from the behavior determination unit 62 and systematically switches from the autonomous driving to the manual driving. Upon acquiring the changeover request from the behavior determination unit 62 in the autonomous traveling period in which the second task is permitted, the changeover control unit 82 determines interruption of the second task permitted to the driver based on the changeover request.

The changeover control unit 82 grasps the presence of the merging section CfS in the traveling direction based on the acquired information from the behavior determination unit 62. The changeover control unit 82 acquires, from the behavior determination unit 62, information such as the section length of the merging section CfS and the remaining distance to the interruption section TXS. Based on such information, the changeover control unit 82 directly or indirectly grasps the passage through each of the points P1 to P6. In cooperation with the behavior determination unit 62, the changeover control unit 82 adjusts each position (notification timing) with respect to the merging start point P5 and the merging end point P6. Based on the setting of each of the points P1 to P6, the changeover control unit 82 grasps the schedule in which the autonomous driving level transitions in the autonomous traveling period in which the vehicle A travels by the autonomous driving operation. Based on such information, the changeover control unit 82 can further grasp the current situation, a future change schedule, and the like as to whether the driver is responsible for periphery monitoring, whether the driver is responsible for holding the steering wheel, and the like.

The integration state estimation unit 83 acquires driver state information from the driver monitor 29. In addition, the integration state estimation unit 83 acquires information related to the state of the driver output to communication bus 99. The integration state estimation unit 83 determines the type of the second task performed by the driver at least in the autonomous traveling period. Specifically, the integration state estimation unit 83 selects the second task currently being performed by the driver from among a plurality of types of second tasks assumed in advance.

For example, viewing of content such as a movie and an audio book, viewing of television, use of a smartphone or the like, and other acts (such as eating) are assumed as the second task. With reference to reproduction information of content by the presentation output unit 73, operation information transmitted from the smartphone or the like, the integration state estimation unit 83 selects the second task being performed. Using a determiner (determination logic) generated by, for example, machine learning or the like, the integration state estimation unit 83 may be able to estimate the second task to be performed by the driver.

The integration state estimation unit 83 estimates a direction and a degree of driver's awareness based on the driver information acquired from the driver monitor 29. Specifically, the integration state estimation unit 83 distinguishes whether the driver's awareness is directed to driving or directed to the second task. In a case where the driver has never visually recognized the front within a predetermined time (for example, 60 seconds, appropriately changeable), the integration state estimation unit 83 determines that the driver's awareness is directed to the second task. On the other hand, in a case where the driver has visually recognized the front even once within the predetermined time, the integration state estimation unit 83 determines that the driver's awareness is directed to the driving.

The integration state estimation unit 83 may be capable of grasping the feature of the person who sits on the driver's seat as a driver. Such personal feature data is not limited to data acquired in real time by the driver monitor 29, and may be data stored in the storage unit 13 or data provided from the user terminal. The integration state estimation unit 83 may be able to grasp, in a binary or multistage manner, whether the driver is in a state of being able to take over driving, that is, the driver's Readiness state.

Figure 7:
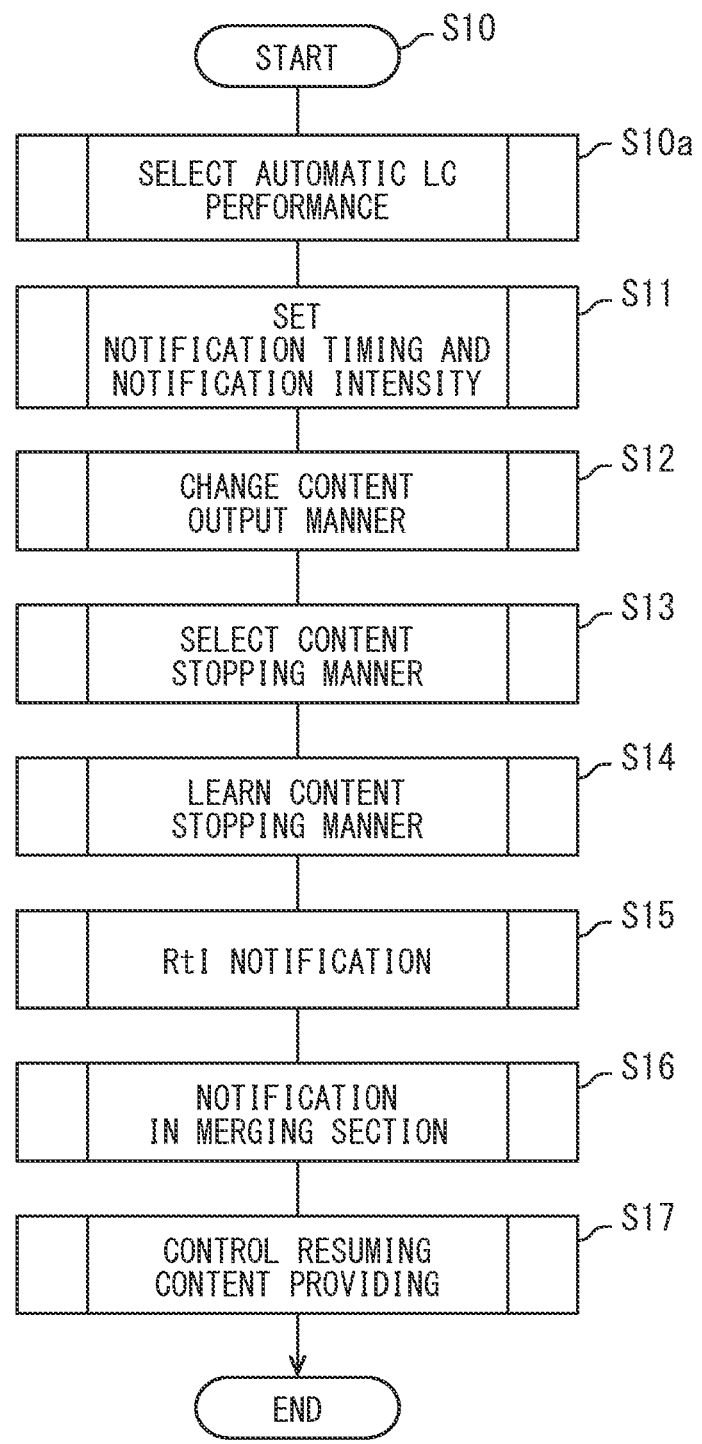
FIG. 7 is a flowchart illustrating main processing of presentation control processing for implementing interruption of a second task.

In cooperation with the content arbitration unit 72, the provision control unit 84 controls the provision method of content provided in association with the second task in the autonomous traveling period in which performance of the second task is permitted. Specifically, when the changeover control unit 82 determines interruption of the second task, the provision control unit 84 starts presentation control processing (see main processing in FIG. 7) together with the periphery state grasping unit 81, the changeover control unit 82, and the integration state estimation unit 83 based on the interruption determination (S10).

The provision control unit 84 continuously performs a plurality of driver notifications in association with the autonomous LC performed by the autonomous driving ECU 50b as an avoidance behavior. Specifically, the provision control unit 84 performs presentation of the selection screen SG (see FIG. 9), an LC attempt notification Nt11 (see FIG. 14), an LC failure possibility notification Nt12 (see FIGS. 15 and 16), an LC execution notification Nt15 (see FIG. 17), and an LC failure notification Nt13 (see FIG. 19). When the autonomous LC as an avoidance behavior fails, the provision control unit 84 performs a request notification (hereinafter, RtI notification Nt14, see FIGS. 23 to 25) requesting the driver to change over the driving.

The provision control unit 84 causes the driver to select whether to perform the autonomous LC as an avoidance behavior (S10a). When performance of the autonomous LC is selected by the driver, the provision control unit 84 sets the notification start timing and the notification intensity for at least a part of each of the notifications (S11). The provision control unit 84 changes the output manner of content prior to interruption of the second task by the driver, in other words, interruption of provision of content by the HMI system (S12). In addition, the provision control unit 84 presents an option of selecting the stopping manner of content after changing the output manner of the content (S13). Based on the determination result by the integration state estimation unit 83, the provision control unit 84 presents an option corresponding to the type of the second task being performed by the driver.

Furthermore, the provision control unit 84 grasps the user operation of the driver who selects the option and learns the stopping manner of content preferred by the individual driver for each type of the second task (S14). Then, when the changeover control unit 82 grasps entry of the vehicle A into the interruption section TXS, the provision control unit 84 sequentially performs a request to intervene (RtI) notification (S15) and a notification in merging section (S16). At this time, the provision control unit 84 grasps the interruption timing at which the driver completes the second task in cooperation with the integration state estimation unit 83. Thereafter, when the vehicle A leaves the merging section CfS (interruption section TXS), the provision control unit 84 performs control to resume the interrupted provision of content (S17).

Details of sub-processing performed in each step of the above presentation control processing will be further described with reference to FIGS. 1 to 7, based on FIGS. 8 to 28, together with details of information presentation by each display device or the like. Note that in the following example, the moving image content CTV is displayed on the CID 22 as content related to the second task.

Figure 8:
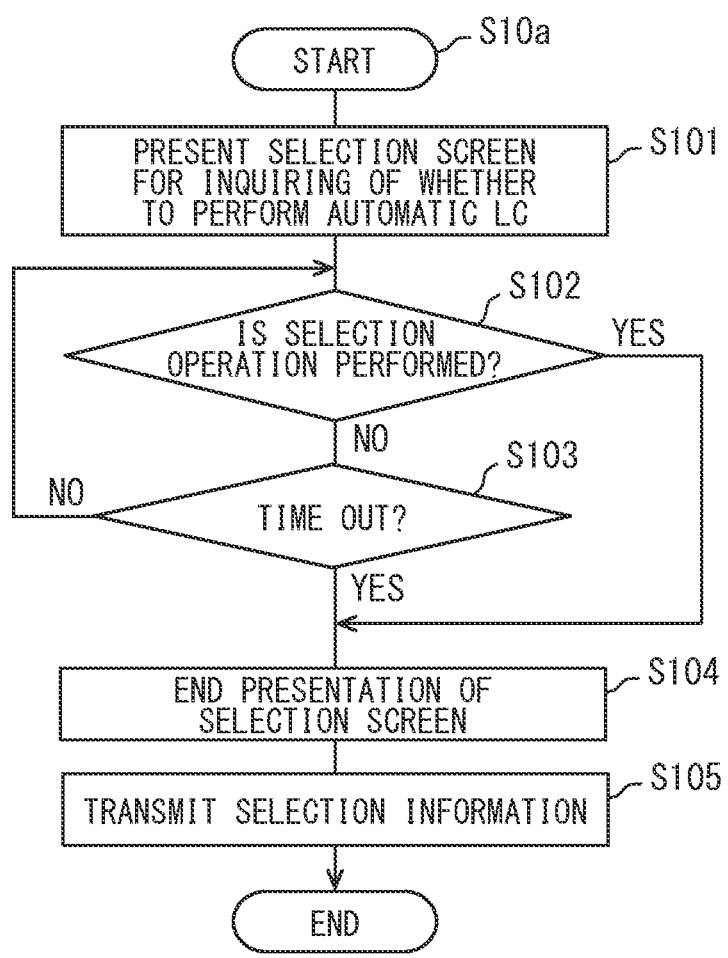
FIG. 8 is a flowchart illustrating sub-processing of presenting a selection screen.

In the sub-processing (S10a) of causing the driver to select whether to perform the autonomous LC illustrated in FIG. 8, the selection screen SG (see FIG. 9) is presented to the driver in S101, and the processing proceeds to S102. The selection screen SG is displayed on the meter display 21. The selection screen SG notifies the driver that whether to continue the second task changes depending on whether to perform the autonomous LC.

The selection screen SG includes display objects such as an inquiry window Mw1, a subject vehicle status StA, an LC avoidance window Wdn, and an LC performance window Wdg. The inquiry window Mw1 is displayed at a position facing the upper edge of the display screen of the meter display 21. In the inquiry window Mw1, a message for inquiring whether the driver desires to perform the autonomous LC, for example, "Would you perform autonomous lane change?" is described.

The subject vehicle status StA includes a subject vehicle icon IcS, a subject vehicle lane icon LpS, and an adjacent lane icon LpA that are substantially identical to those in an LC status StLC (see FIG. 14 and the like) described later. In addition, the subject vehicle status StA further includes an LC avoidance arrow IAd and an LC performance arrow IAp. The LC avoidance arrow IAd has a shape indicating the traveling direction, and is displayed above the subject vehicle icon IcS. The LC performance arrow IAp has a curved shape indicating the traveling locus of the autonomous LC, and is displayed on the upper side of the subject vehicle icon IcS.

The LC avoidance window Wdn is displayed above the LC avoidance arrow IAd. When combined with the LC avoidance arrow IAd, the LC avoidance window Wdn notifies that the driving transitions from the Level 3 autonomous driving to the Level 2 autonomous driving in a case of continuing traveling in the current travel lane DL without performing the autonomous LC. The LC avoidance window Wdn includes an NG button (NG icon) for canceling the performance of the autonomous LC.

The LC performance window Wdg is displayed above the LC performance arrow IAp. When combined with the LC performance arrow IAp, the LC performance window Wdg notifies that the Level 3 autonomous driving is not canceled and the second task can be continued in a case of performing the autonomous LC and changing the lane to the adjacent passing lane PL. By the display juxtaposed to the LC avoidance window Wdn, the LC performance window Wdg notifies the driver of a difference between travel control by the autonomous driving operation when the autonomous LC is not performed and travel control by the autonomous driving operation when the autonomous LC is performed. The LC performance window Wdg includes an OK button (OK icon) for approving the autonomous LC.

As described above, by each of the windows Wdn and Wdg, the selection screen SG clearly indicates, to the driver, that the restriction on traveling (lowering of the autonomous driving level) by the autonomous driving operation is relaxed by the autonomous LC moving from the travel lane DL on which the vehicle A is traveling to the passing lane PL. By selecting one of the two windows Wdn and Wdg by operating the operation device 26, the driver instructs performing and not performing the autonomous LC.

In S102, presence or absence of a selection operation by the driver in accordance with the selection screen SG is determined. When it is determined in S102 that the selection operation has been input, the process proceeds to S104. On the other hand, when it is determined in S102 that there is no input of the selection operation, the process proceeds to S103. In S103, based on the elapsed time from the start of display of the selection screen SG, it is determined whether a time secured in advance for an inquiry to the driver has timed out. By the determination in S103, input of a selection operation by the driver is waited until the selection screen SG times out.

When the selection operation by the driver exists or when the time for the selection operation has timed out, presentation of the selection screen SG ends in S104, and the process proceeds to S105. In S105, an input result of the selection operation is transmitted to the behavior determination unit 62 as the driver's selection information. When the selection screen SG has timed out with the selection operation by the driver not being input, the behavior determination unit 62 determines to perform the autonomous LC.

Figure 10:
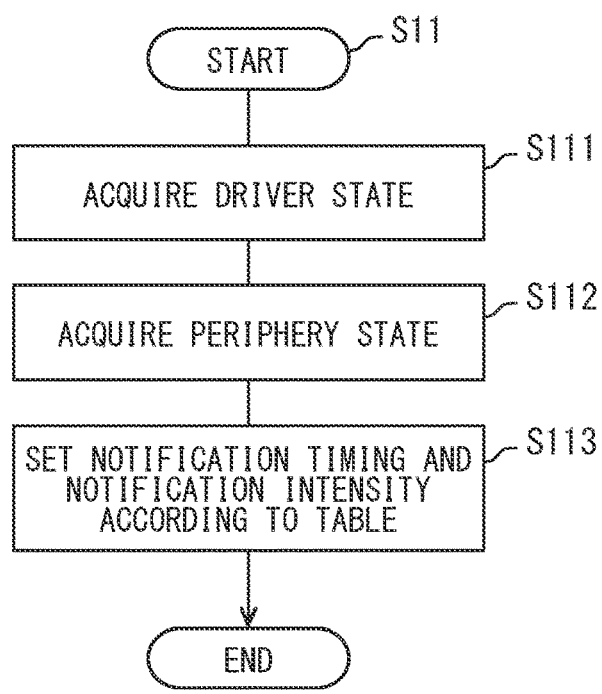
FIG. 10 is a flowchart illustrating sub-processing of setting a notification timing and a notification intensity.

In the sub-processing (S11) of setting the notification timing and the notification intensity illustrated in FIG. 10, the driver state estimated by the integration state estimation unit 83 is acquired in S111, and the processing proceeds to S112. In S111, the direction of the driver's awareness is at least grasped as the driver state. In S112, the state of other vehicles around the subject vehicle grasped by the periphery state grasping unit 81 is acquired, and the process proceeds to S113. In S112, presence or absence of a preceding vehicle and a rear side vehicle is at least grasped as a periphery state of the subject vehicle.

In S113, based on the driver state grasped in S111 and the periphery state grasped in S112, the start timing and the notification intensity of the LC attempt notification Nt11, the LC failure possibility notification Nt12, and the LC failure notification Nt13 are set, and the process returns to S12 of the main processing. In S113, the state regarding the direction of the driver's awareness, the presence or absence of a preceding vehicle, and the presence or absence of a rear side vehicle is applied to a notification setting table (see FIG. 11), and each notification timing and notification intensity are set in accordance with this notification setting table.

According to the notification setting table illustrated in FIG. 11, in a case where the driver's awareness is directed toward driving, the notification timing and the notification intensity are each set to "normal" even if a preceding vehicle or a rear side vehicle exists. On the other hand, when neither the preceding vehicle nor the rear side vehicle exists, the notification timing is set to "late" compared to usual, regardless of the direction of the driver's awareness. In this case, the notification intensity is also set to "weak" compared to usual. On the other hand, in a case where at least one of the preceding vehicle and the rear side vehicle exists and the driver's awareness is directed to the second task, the notification timing is set to "early" compared to usual. In this case, the notification intensity is also set to "strong" compared to usual.

The notification timing is set as in the example of the timing control illustrated in FIG. 12. When the notification timing is set to "normal", the LC start point P1 at which the LC attempt notification Nt11 is started, the LC start point P1 at which an attempt of the autonomous LC is started, is set 2 km left to the merging start point P5. The halfway point P2 where the LC failure possibility notification Nt12 is started is set 1.5 km left to the merging start point P5. The confirmation point P3 at which the LC failure notification Nt13 is started is set 1 km left to the merging start point P5.

On the other hand, in a case where the notification timing is set to be "late" compared to usual, each of the points P1 to P3 where each notification is started is set at a position closer to the merging start point P5 by about 500 m than each distance at the normal time as a reference. On the other hand, in a case where the notification timing is set to "early" compared to usual, each of the points P1 to P3 where each notification is started is set at a position farther from the merging start point P5 by about 500 m than each distance at the normal time as a reference. The points P1 to P3 and adjustment allowance can be appropriately adjusted in accordance with the traveling speed of the vehicle A, for example. It may also be adjusted not on a distance basis but on a time basis.

Figure 13:
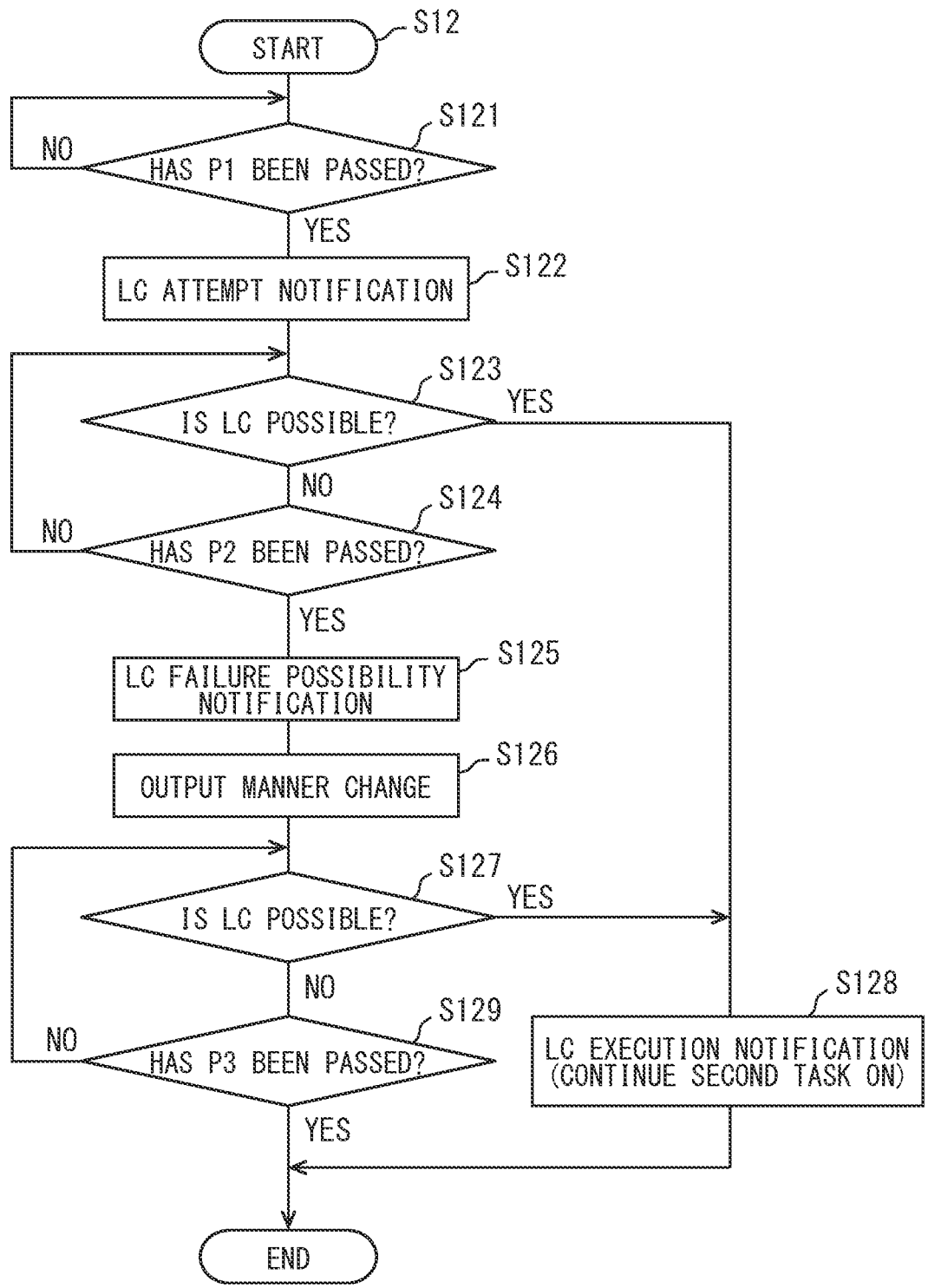
FIG. 13 is a flowchart illustrating sub-processing of changing an output manner of content.

In the sub-processing (S12) of changing the output manner of content illustrated in FIG. 13, it is determined in S121 whether the vehicle A has passed through the LC start point P1. In S121, arrival of the vehicle A at the start point P1 is waited. When it is determined in S121 that the vehicle A has passed through the LC start point P1, the process proceeds to S122. In S122, the LC attempt notification Nt11 is started in synchronization with the start of the attempt of the autonomous LC by the autonomous driving system 50, and the process proceeds to S123.

Figure 14:
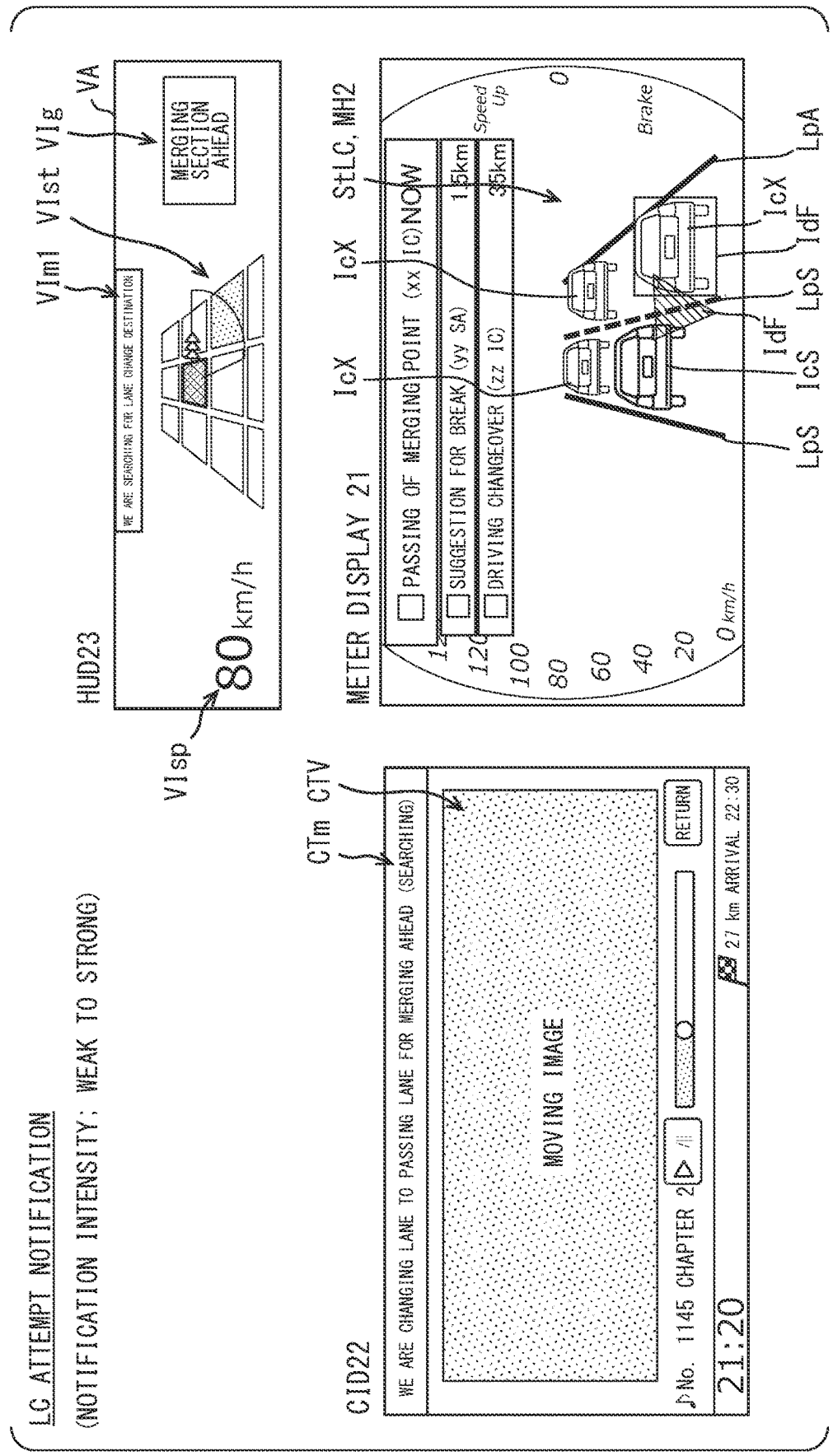
FIG. 14 is a view illustrating an example of an LC attempt notification.

In the LC attempt notification Nt11 or the like illustrated in FIG. 14, information presentation in which the meter display 21, the CID 22, and the HUD 23 are cooperated is performed. In the LC attempt notification Nt11, the meter display 21 displays the LC status StLC indicating the state of the autonomous LC. The LC status StLC includes the subject vehicle icon IcS, the subject vehicle lane icon LpS, the adjacent lane icon LpA, an other vehicle icon IcX, a detection icon IdD, and a detection frame IdF.

The subject vehicle icon IcS is an image portion imitating the subject vehicle. The subject vehicle icon IcS is displayed substantially at the center of the LC status StLC. The subject vehicle lane icon LpS is a linear image portion displayed on both right and left sides of the subject vehicle icon IcS. The subject vehicle lane icon LpS indicates the subject vehicle lane on which the subject vehicle travels, by display sandwiching the subject vehicle icon IcS. The subject vehicle lane icon LpS displayed on the moving side (right side) in the autonomous LC with respect to the subject vehicle icon IcS is drawn in a broken line shape in the LC attempt notification Nt11. On the other hand, the subject vehicle lane icon LpS displayed on the opposite side (left side) to the moving direction in the autonomous LC with respect to the subject vehicle icon IcS is drawn in a solid line shape.

The adjacent lane icon LpA is an image portion in a solid line shape extending along the subject vehicle lane icon LpS. The adjacent lane icon LpA indicates the adjacent lane to become the movement destination in the autonomous LC together with one (right side) subject vehicle lane icon LpS drawn in a broken line shape. The other vehicle icon IcX is displayed based on the recognition result of the environment recognition unit 61, and indicates the presence of another actual vehicle traveling around the subject vehicle. When a preceding vehicle exists in the subject vehicle lane, the other vehicle icon IcX is displayed above the subject vehicle icon IcS. When a parallel traveling vehicle exists in the adjacent lane, the other vehicle icon IcX is displayed on the side of the subject vehicle icon IcS in an arrangement reflecting the positional relationship with the subject vehicle.

The detection icon IdD is displayed to be superimposed on a part of the subject vehicle icon IcS. The detection icon IdD indicates that detection of another vehicle has been performed for autonomous LC. When another vehicle that interferes the autonomous LC is detected, the detection frame IdF is displayed in a rectangular frame shape surrounding the other vehicle icon IcX corresponding to the other vehicle.

In the CID 22, the moving image content CTV related to the second task is displayed in the autonomous traveling period. The moving image content CTV is a movie, a television broadcast, or the like. When the LC attempt notification Nt11 is performed, an LC message window CTm is displayed in the CID 22 in addition to the moving image content CTV.

The LC message window CTm is displayed on the display screen of the CID 22 outside the display area of the moving image content CTV. As an example, the LC message window CTm is displayed at a position facing the upper edge of the display screen. In the LC message window CTm, a message indicating an operation state of the autonomous driving system 50 that attempts autonomous LC, such as "we are changing lane to passing lane for merging ahead (searching)", for example, is described.

In the LC attempt notification Nt11, the HUD 23 displays a periphery status VIst, a route notification window VIg, an upper edge message window VIm1, and the like in the angle of view VA together with a digital speedometer VIsp and the like. The periphery status VIst is displayed substantially at the center in the angle of view VA. The periphery status VIst indicates a status of the autonomous LC similarly to the LC status StLC of the meter display 21. Specifically, the periphery status VIst notifies that the movement space of the subject vehicle in the autonomous LC is being searched for, that there is another vehicle that interferes the autonomous LC, and the like.

The route notification window VIg is displayed on the side of the periphery status VIst and notifies information related to route guidance. In the route notification window VIg, a message such as "merging section ahead", for example, is described. The upper edge message window VIm1 is displayed at the upper edge center of the angle of view VA. Similarly to the LC message window CTm of the CID 22, a message indicating the operation state of the autonomous driving system 50 is described in the upper edge message window VIm1. A message such as "we are searching for lane change destination", for example, is displayed in the upper edge message window VIm1.

In S123 illustrated in FIG. 13, it is determined whether the autonomous LC is possible. When the autonomous LC is possible, the process proceeds to S128. On the other hand, when the autonomous LC is not possible, the process proceeds to S124. In S124, it is determined whether the vehicle A has passed through the halfway point P2. When it is determined in S124 that the vehicle A has not passed through the halfway point P2, the process returns to S123. On the other hand, when it is determined in S124 that the vehicle A has passed through the halfway point P2, the process proceeds to S125. In S125, the LC failure possibility notification Nt12 is started, and the process proceeds to S126. In S126, the output manner of the moving image content CTV or the like is changed, and the process proceeds to S127. Note that the timing of changing the provision method of the moving image content CTV or the like may be substantially identical to the start timing of the LC failure possibility notification Nt12.

Figure 15:
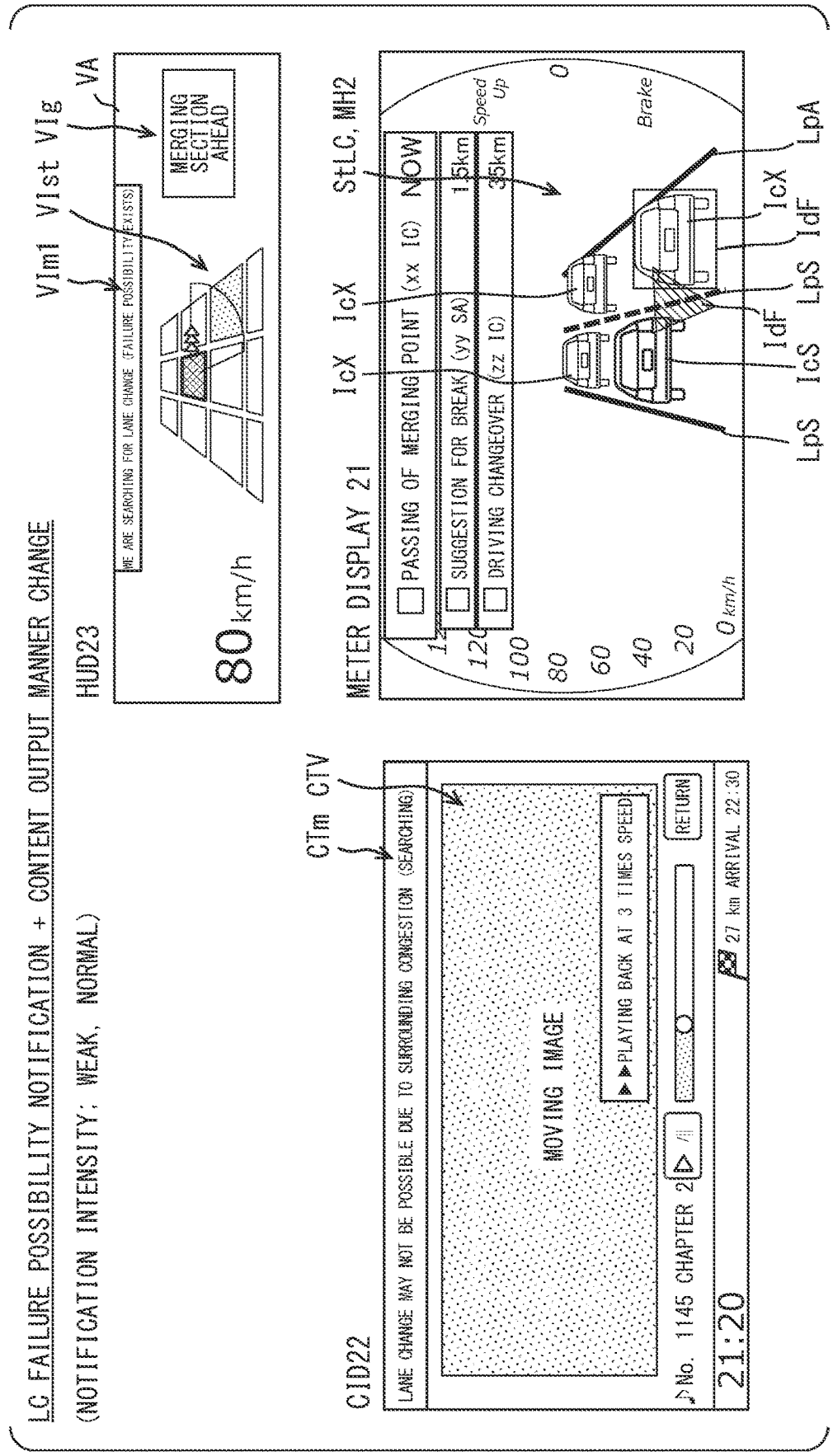
FIG. 15 is a view illustrating an example of an LC failure possibility notification and a change in the output manner of content in a case where the notification intensity is set to weak or normal.
Figure 16:
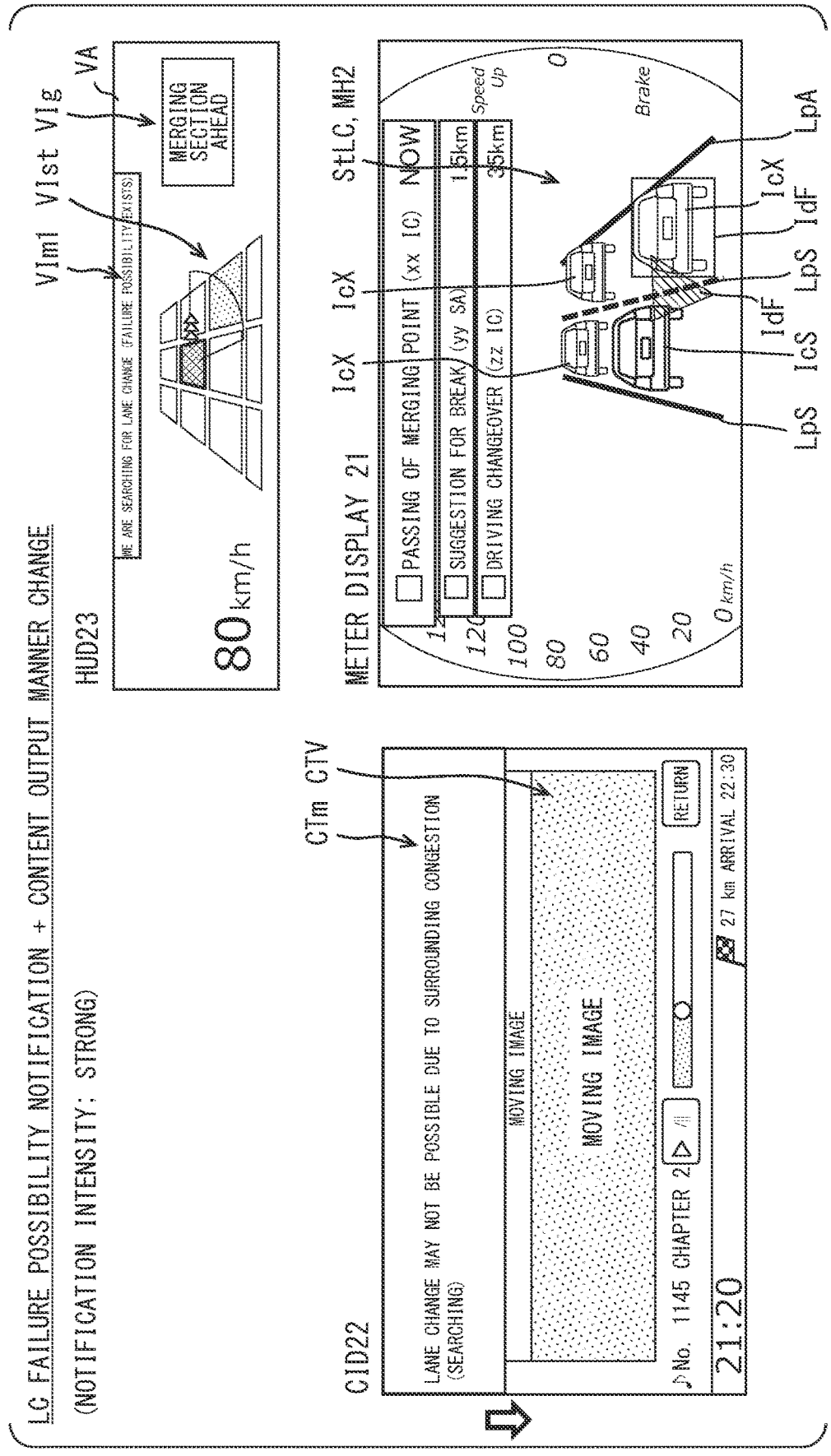
FIG. 16 is a view illustrating an example of an LC failure possibility notification and a change in the output manner of content in a case where the notification intensity is set to strong.

In the LC failure possibility notification Nt12 illustrated in FIGS. 15 and 16, display according to the notification intensity is performed. When the notification intensity is set to "weak" or "normal", the LC failure possibility notification Nt12 illustrated in FIG. 15 is performed. In this case, each background color of the LC message window CTm and the upper edge message window VIm1 is changed from, for example, green or the like to a color calling for attention such as yellow or amber. In addition, the display content of each of the LC message window CTm and the upper edge message window VIm1 is changed from the LC attempt notification Nt11.

Specifically, a message such as "lane change may not be possible due to surrounding congestion (searching)", for example, is described in the LC message window CTm. Similarly, a message such as "we are searching for lane change (failure possibility exists)", for example, is described in the upper edge message window VIm1. Each message of the LC message window CTm and the upper edge message window VIm1 notifies the driver that there is a possibility that the autonomous LC cannot be executed although the attempt of the autonomous LC is continued.

In addition, in the LC failure possibility notification Nt12, display of the moving image content CTV of the CID 22 is changed. In a case where the notification intensity is "weak" or "normal", the provision control unit 84 increases the reproduction speed of the moving image content CTV. As an example, the moving image content CTV is reproduced at triple speed. At this time, a message indicating a reproduction state such as "playing back at 3 times speed" is displayed to be superimposed on the moving image content CTV.

According to the change in the provision method as described above, since the content ahead of the moving image content CTV can be found early, the driver easily wraps up viewing of the moving image content CTV early. Upon finding the content continuing to be boring for a while based on reproduction at a specific-fold speed, a driver who views, for example, a soccer game or the like voluntarily interrupts viewing the moving image. On the other hand, upon finding the content becoming attractive, the driver voluntarily interrupts viewing the moving image in order to view it at a proper reproduction speed later.

On the other hand, when the notification intensity is set to "strong", the LC failure possibility notification Nt12 illustrated in FIG. 16 is performed. Even in this case, the LC message window CTm and the upper edge message window VIm1 are changed to display content different from that of the LC attempt notification Nt11, and notify the failure possibility of the autonomous LC. In addition, in the CID 22, the LC message window CTm is expanded downward. As a result, the display area of the moving image content CTV is reduced. The display area of the moving image content CTV may be reduced with the aspect ratio kept, or the upper side may be hidden by the LC message window CTm. According to such change in the provision method, it becomes difficult to view the moving image content CTV reduced at the lower corner, and thus the driver voluntarily interrupts viewing the moving image.

In S127 illustrated in FIG. 13, it is determined again whether autonomous LC is possible. When it is determined in S127 that the autonomous LC is not possible, the process proceeds to S129. In S129, it is determined whether the vehicle A has passed through the confirmation point P3. When it is determined in S129 that the vehicle A has not passed through the confirmation point P3, the process returns to S127. On the other hand, when it is determined in S129 that the vehicle A has passed through the confirmation point P3, the process returns to S13 of the main process.

Figure 17:
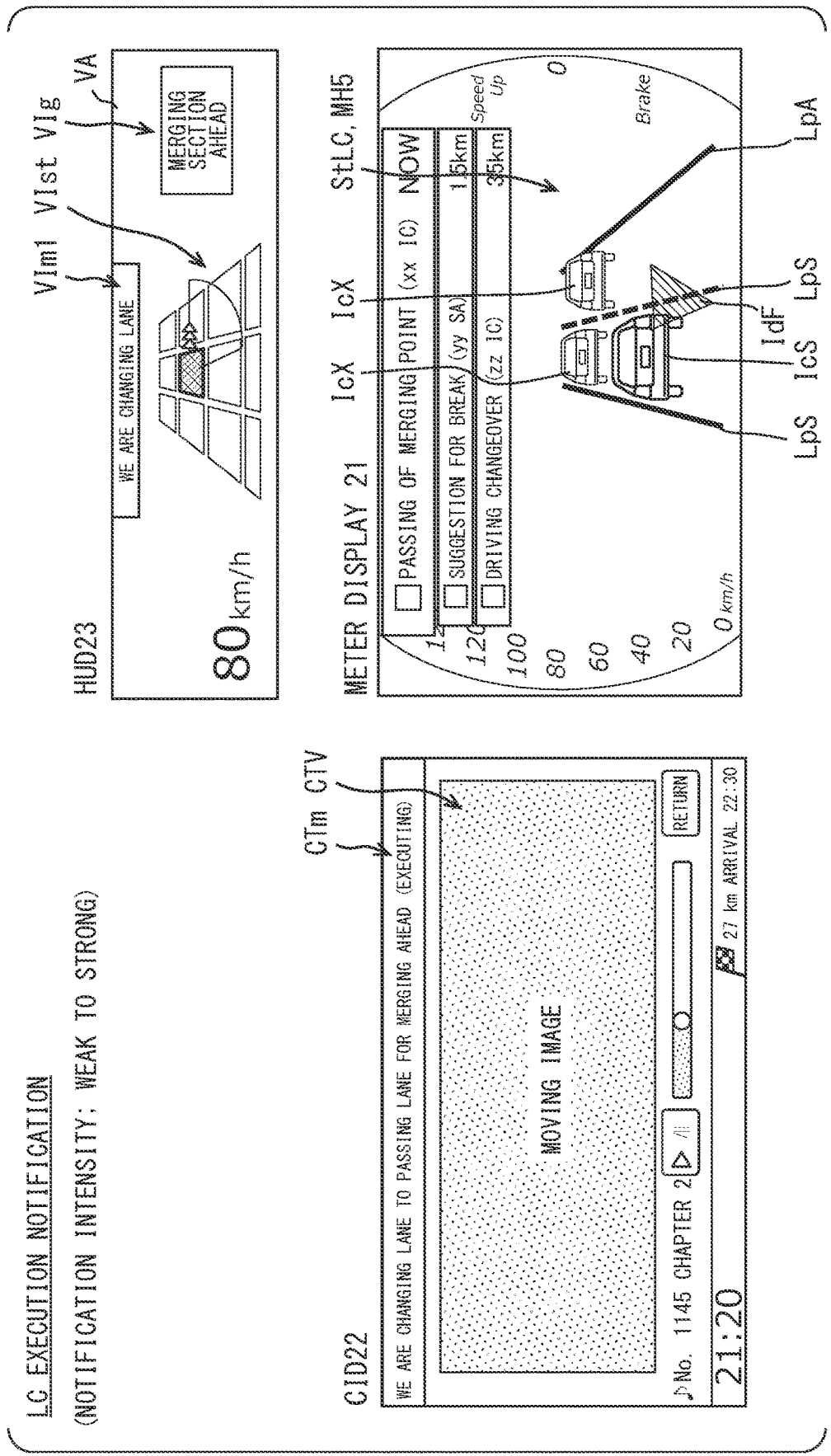
FIG. 17 is a view illustrating an example of an LC execution notification.

On the other hand, in S128 in a case where it is determined in S123 or S127 that the autonomous LC is possible, the LC execution notification Nt15 illustrated in FIG. 17 is started. In the LC execution notification Nt15, information presentation of identical content is performed regardless of the notification intensity. In the LC execution notification Nt15, the display content of each of the LC message window CTm and the upper edge message window VIm1 is changed from the LC attempt notification Nt11 and the LC failure possibility notification Nt12.

Specifically, a message such as "we are changing lane to passing lane for merging ahead (executing)", for example, is described in the LC message window CTm. Similarly, a message such as "we are changing lane", for example, is described in the upper edge message window VIm1. Each message of the LC message window CTm and the upper edge message window VIm1 notifies the driver that the autonomous LC has transitioned to the execution state. Each background color in the LC execution notification Nt15 is identical to that in the LC attempt notification Nt11.

In the LC execution notification Nt15, reproduction of the moving image content CTV is continued as usual. In addition, since there is no other vehicle that interferes with the autonomous LC, display of the other vehicle icon IcX and the detection frame IdF in the LC status StLC is ended. Similarly, the periphery status VIst also becomes a display indicating a state in which autonomous LC is possible.

Figure 18:
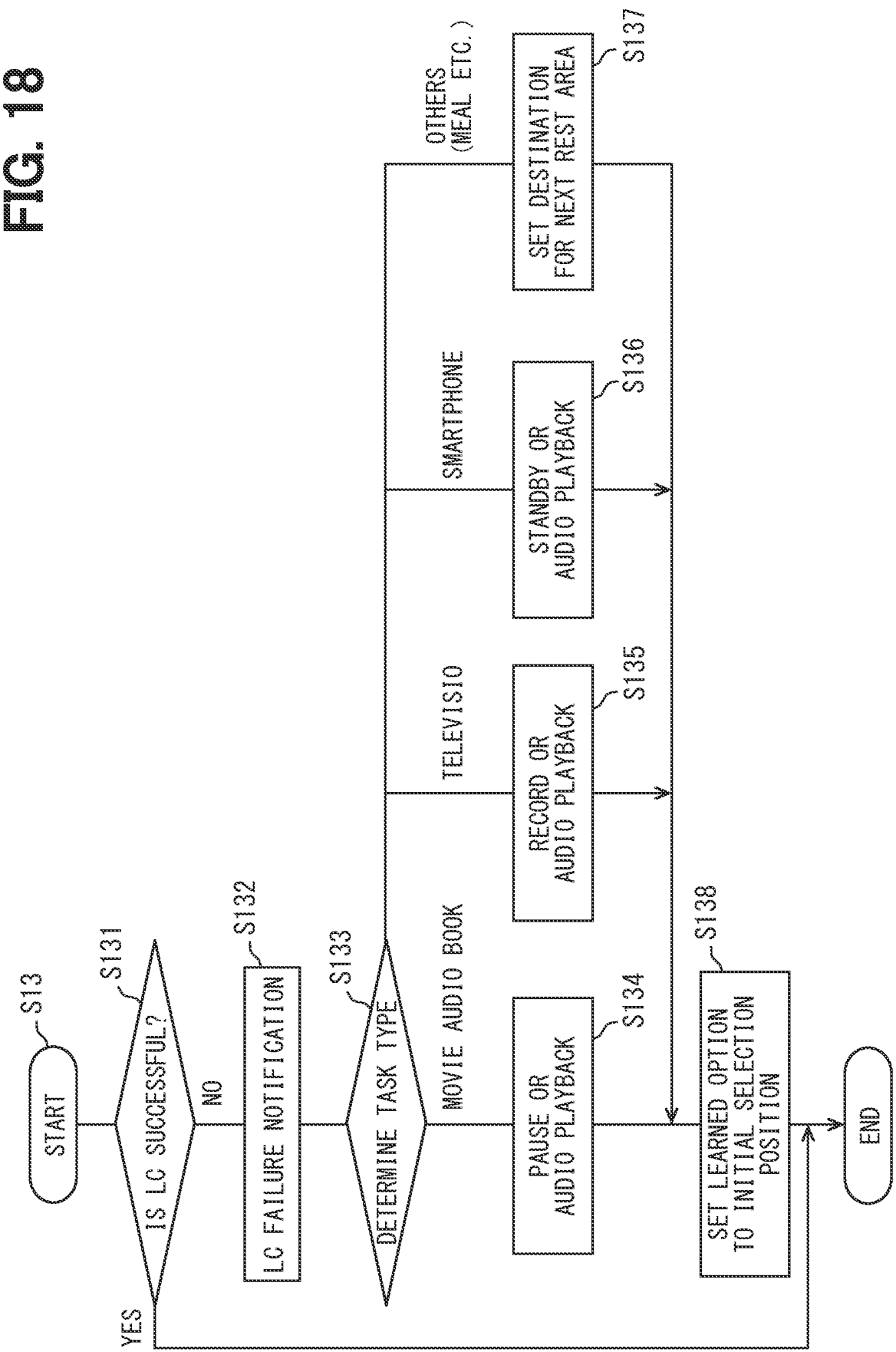
FIG. 18 is a flowchart illustrating sub-processing of selecting a content stopping manner.

In the sub-processing (S13) of selecting the stopping manner of content illustrated in FIG. 18, it is determined in S131 whether the autonomous LC has been successful. When it is determined in S131 that the autonomous LC has been successful, the process returns to S14 of the main processing. On the other hand, when it is determined in S131 that the autonomous LC has failed, the process proceeds to S132. In S132, the LC failure notification Nt13 is started, and the process proceeds to S133.

Figure 19:
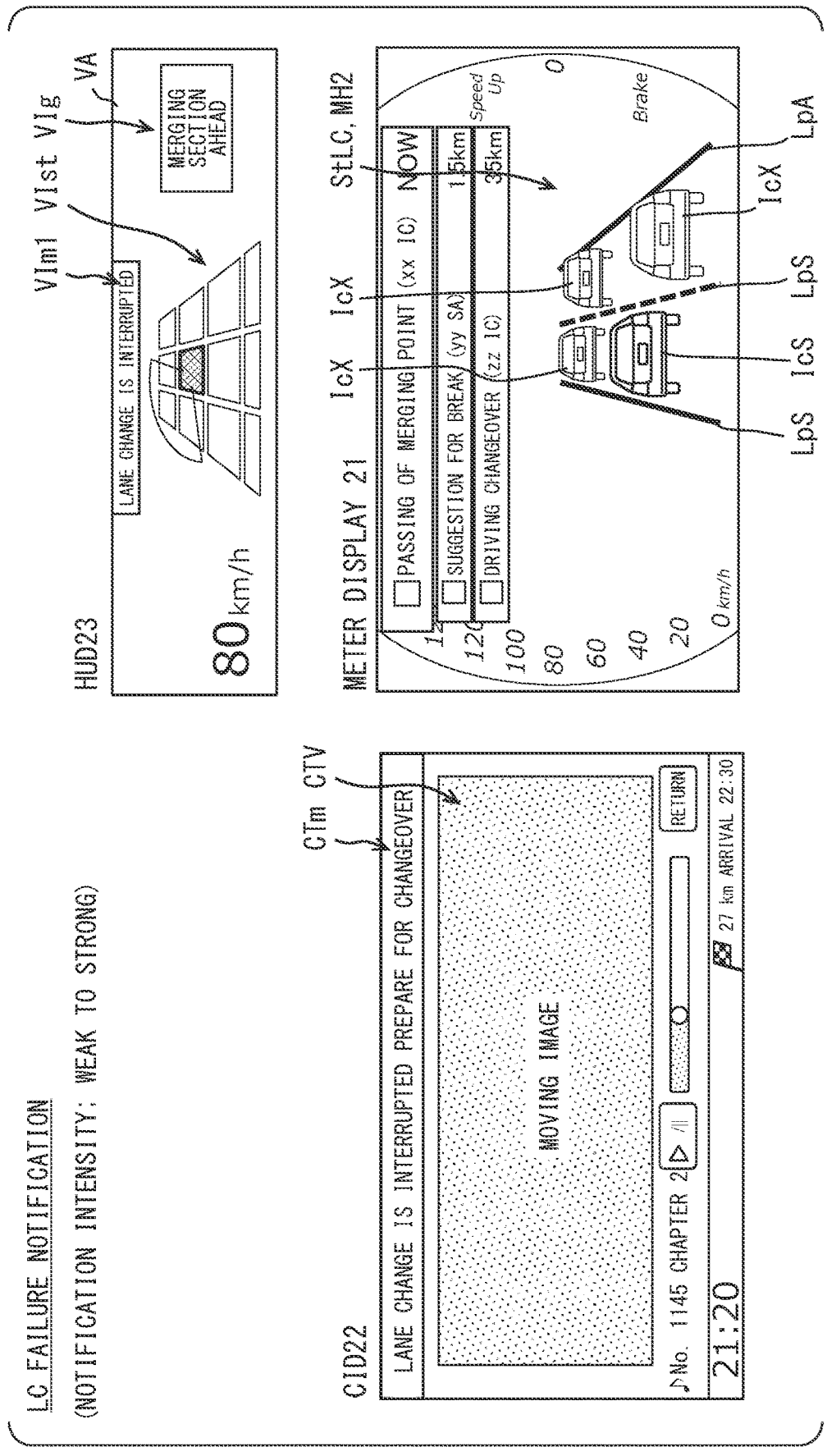
FIG. 19 is a view illustrating an example of an LC failure notification.

In the LC failure notification Nt13 illustrated in FIG. 19, the display content of each of the LC message window CTm and the upper edge message window VIm1 is further changed from the LC failure possibility notification Nt12. Specifically, in the LC message window CTm, a message such as "lane change is interrupted. Prepare for changeover", for example, is described. Similarly, a message such as "lane change is interrupted", for example, is displayed in the upper edge message window VIm1. Each message of the LC message window CTm and the upper edge message window VIm1 notifies the driver that the autonomous LC attempt has resulted in failure. Each background color in the LC failure notification Nt13 is identical to that in the LC failure possibility notification Nt12.

In S133 illustrated in FIG. 18, the type of the second task being performed by the driver is determined, and the process proceeds to any one of S134 to S137 based on the determination result. When it is determined in S133 that the moving image content CTV such as a movie and an audio book that is recorded in a medium is being viewed, the process proceeds to S134. When it is determined in S133 that television broadcast is being viewed, the process proceeds to S135. When it is determined in S133 that the smartphone or the like is being operated, the process proceeds to S136. When it is determined in S133 that another act is being carried out, the process proceeds to S137.

Figure 20:
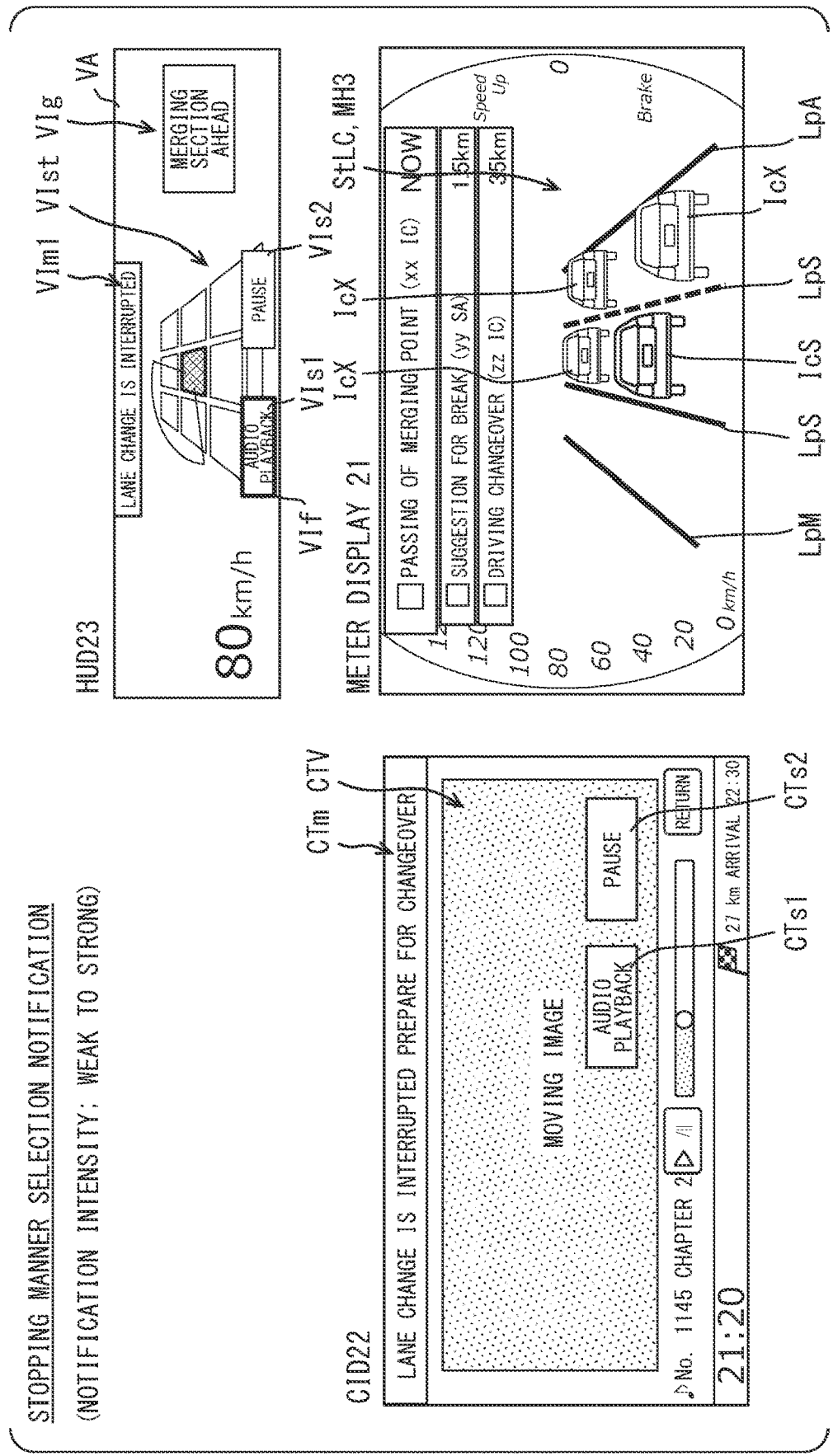
FIG. 20 is a view illustrating an example of a stopping manner selection notification.

In S134 to S137, a stopping manner selection notification Nt13a for presenting an option of a stopping manner of content is started. The stopping manner selection notification Nt13a is a notification included in the LC failure notification Nt13. As illustrated in FIG. 20, in the stopping manner selection notification Nt13a, selection buttons CTs1 and CTs2 and selection icons VIs1 and VIs2 for selecting the stopping manner of the moving image content CTV are displayed on the CID 22 and the HUD 23, respectively.

The selection buttons CTs1 and CTs2 are displayed on the display screen of the CID 22. As an example, the selection buttons CTs1 and CTs2 are displayed to be superimposed on the moving image content CTV. In each of the selection buttons CTs1 and CTs2, a character string that specifically designates an interruption method of content (second task) is described. Each of the selection buttons CTs1 and CTs2 is a touch icon configured to enable a touch operation by the user. By inputting a touch operation to the selection buttons CTs1 and CTs2, the driver can select the stopping manner of the content (second task) being provided. Note that in the stopping manner selection notification Nt13a in a case where the notification intensity is set to "strong", the LC message window CTm may remain in the enlarged state.

The selection icons VIs1 and VIs2 are displayed in the angle of view VA by the HUD 23. Display of the selection icons VIs1 and VIs2 allows the driver to select an interruption method of the second task while looking at the front. The selection icons VIs1 and VIs2 present substantially the identical options to those of the selection buttons CTs1 and CTs2. That is, a character string that specifically designates an interruption method of the content (second task) is also described in each of the selection icons VIs1 and VIs2. The selection icons VIs1 and VIs2 can be selected by a user operation on the operation device 26. A selection frame VIf is displayed in one of the selection icons VIs1 and VIs2 being selected. One selection icon VIs1 displaying the selection frame VIf is displayed in a state higher in noticeability (luminance) than the other selection icons VIs2. Input of a determination operation to the operation device 26 allows the driver to select the selection icon VIs1 on which the selection frame VIf is displayed.

As illustrated in FIGS. 18 and 20, options of the stopping manner presented in each of the selection buttons CTs1 and CTs2 and each of the selection icons VIs1 and VIs2 are set in S134 to S137 based on the result of the type determination in S133. As an example, in the stopping manner selection notification Nt13a based on S134, stopping manners of "audio playback" and "pause" are presented to the respective selection buttons CTs1 and CTs2 and the respective selection icon VIs1.

In the stopping manner selection notification Nt13a based on S135, stopping manners of "record" and "audio playback" are presented to the respective selection buttons CTs1 and CTs2 and the respective selection icons VIs1 and VIs2. Furthermore, in the stopping manner selection notification Nt13a based on S136, stopping manners of "standby" and "audio playback" are presented to the respective selection buttons CTs1 and CTs2 and the respective selection icons VIs1 and VIs2. Then, in the stopping manner selection notification Nt13a based on S137, the name of a rest area or the like available as a stop-off is described in each of the selection buttons CTs1 and CTs2 and each of the selection icons VIs1 and VIs2. In this case, the driver can set the next rest area as the destination by a selection operation.

Furthermore, in the LC status StLC presented in the stopping manner selection notification Nt13a, the display of the detection icon IdD and the detection frame IdF is ended with cancellation of the autonomous LC. In addition, a merging lane icon LpM is additionally displayed based on confirmation of entry of the subject vehicle into the merging section CfS. The merging lane icon LpM is an image portion in a solid line shape extending along the subject vehicle lane icon LpS. The merging lane icon LpM notifies the driver of the presence of the merging lane ML together with the subject vehicle lane icon LpS. Note that the display of the merging lane icon LpM may be started after passing through the TOR point P4. The periphery status VIst by the HUD 23 is also changed from an aspect indicating the waiting state of autonomous LC to an aspect indicating monitoring of the merging lane ML.

In S138, learning data in which selection by the driver has been learned is read from the storage unit 13. Then, one of the options to be presented to the driver is set as an initial setting, and the process returns to S14 of the main processing. Specifically, in S138, the selection frame VIf is displayed in one of the plurality of selection icons VIs1 and VIs2. In addition, in S138, one of the plurality of selection buttons CTs1 and CTs2 displayed on the display screen of the CID 22 is displayed in a state of being higher in visibility (display luminance) than the others.

The LC attempt notification Nt11, the LC failure possibility notification Nt12, the LC failure notification Nt13, and the stopping manner selection notification Nt13a described above can function as a monitoring advance notification for notifying a change in presence or absence of the periphery monitoring responsibility or an end advance notification of the second task. As an example, in the first embodiment, the LC failure notification Nt13 and the stopping manner selection notification Nt13a are monitoring advance notifications that give an advance notification of a change in presence or absence of a scheduled periphery monitoring responsibility, that is, a change from a state without the periphery monitoring responsibility to a state with it. On the other hand, at timing different from the LC failure notification Nt13 and the stopping manner selection notification Nt13a, the LC failure possibility notification Nt12 performed ahead of these notifications is set as the end advance notification of the second task.

Note that in the first embodiment, in a case where the moving image content CTV is viewed as the second task, meanwhile display of the moving image content CTV is interrupted, the processing of continuing audio output is performed in the LC failure possibility notification Nt12 as the end advance notification. The display interruption in this case includes speedup display of the moving image content CTV, hiding most of the moving image content CTV by other images, and the like.

Figure 21:
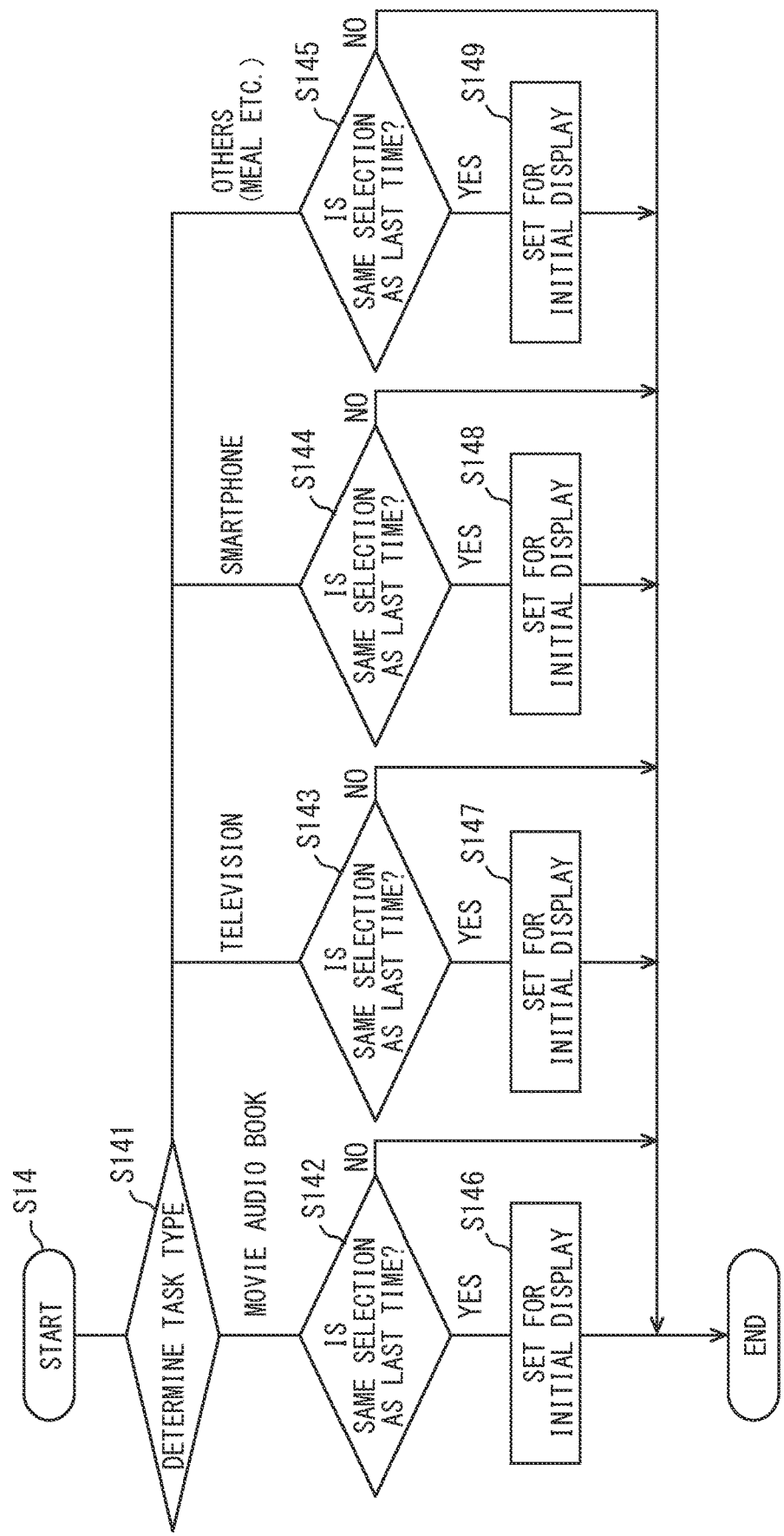
FIG. 21 is a flowchart illustrating sub-processing of learning a content stopping manner.

In the sub-processing (S14) of learning the stopping manner of the content illustrated in FIG. 21, the type of the second task being performed by the driver is determined in S141 similarly to S133 (see FIG. 18), and the process proceeds to any one of S142 to S145. In S142 to S145, it is determined whether the driver has selected the same stopping manner as that in the last interruption of the second task. When it is determined in S142 to S145 that the driver has made the same selection as the last time, the process proceeds to S146 to S149. In S146 to S149, the current and last selections are set to the initial display of respective second task, and the process returns to S15 of the main processing. The setting of the initial display in S146 to S149 is referred to in subsequent S138 (see FIG. 18). On the other hand, when it is determined in S142 to S145 that the driver has made a selection different from the last, the processing skips S146 to S149 and returns to S15 of the main processing.

Figure 22:
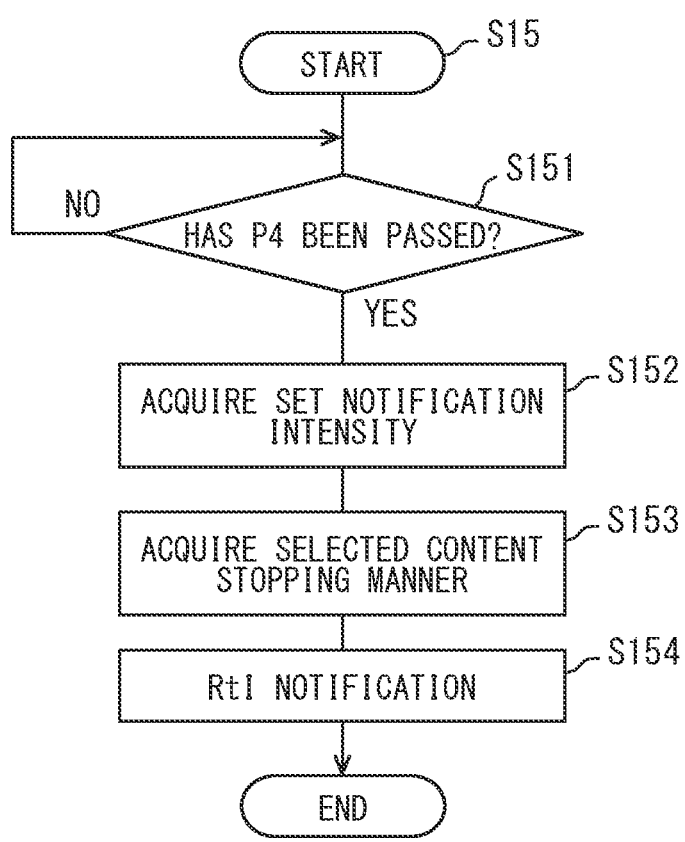
FIG. 22 is a flowchart illustrating sub-processing of performing an RtI notification.

In the sub-processing (S15) of performing the RtI notification Nt14 illustrated in FIG. 22, it is determined in S151 whether the vehicle A has passed through the TOR point P4. In S151, arrival of the vehicle A at the TOR point P4 is waited. The TOR point P4 is set at a position that becomes a predetermined time (for example, 15 seconds) before the merging start point P5 (merging section CfS) where the autonomous driving operation becomes at the functional limit. When it is determined in S151 that the vehicle A has passed through the TOR point P4, the process proceeds to S152.

In S152, the notification intensity set in S113 (see FIG. 9) is acquired, and the process proceeds to S153. In S153, the stopping manner of the content selected by the driver is acquired, and the process proceeds to S154. In S154, the RtI notification Nt14 corresponding to the notification intensity acquired in S153 is started while the content provision is interrupted by the stopping manner selected in S153, and the process returns to S16 of the main processing.

Figure 23:
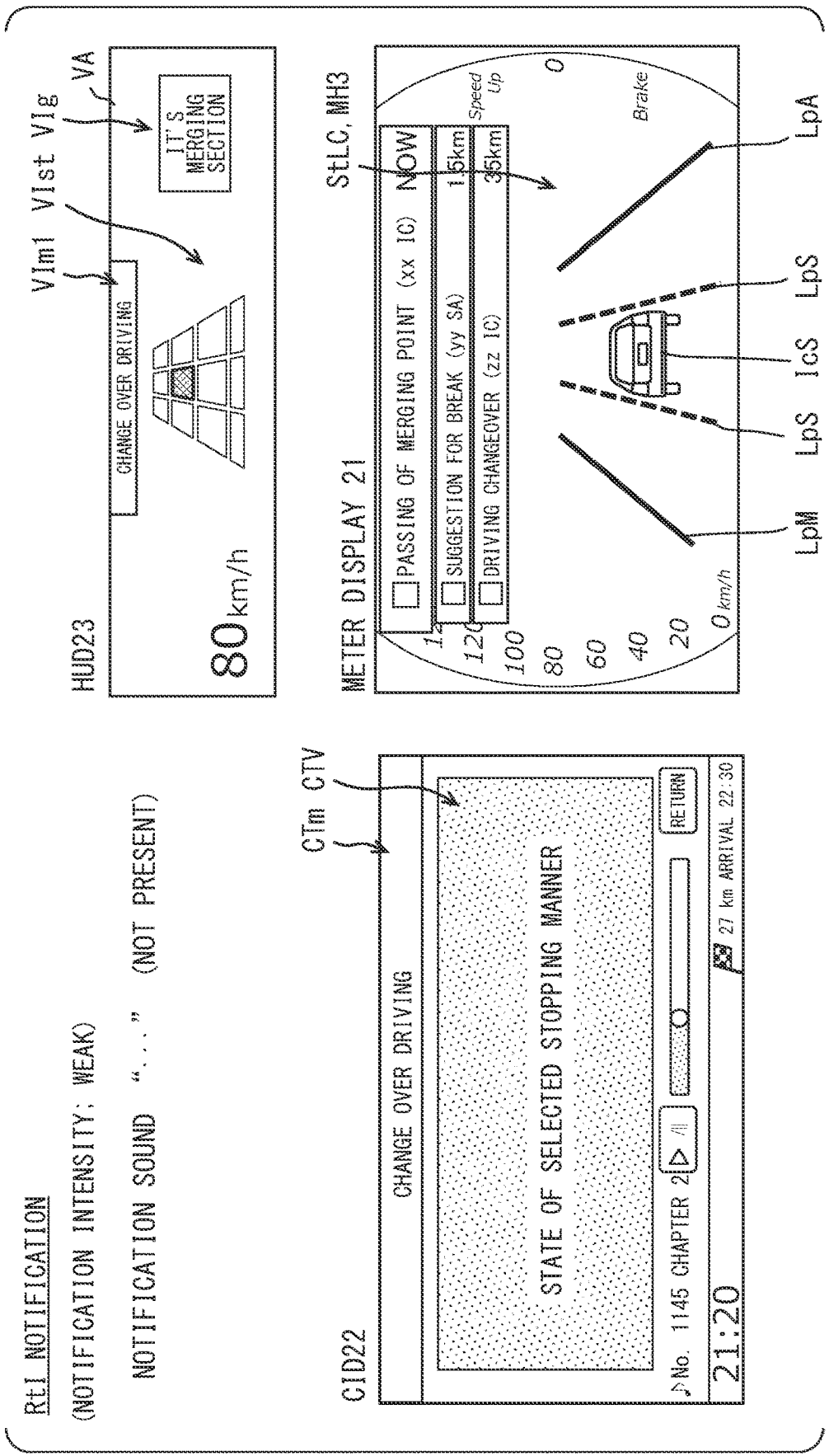
FIG. 23 is a view illustrating an example of an RtI notification in a case where the notification intensity is set to weak.
Figure 24:
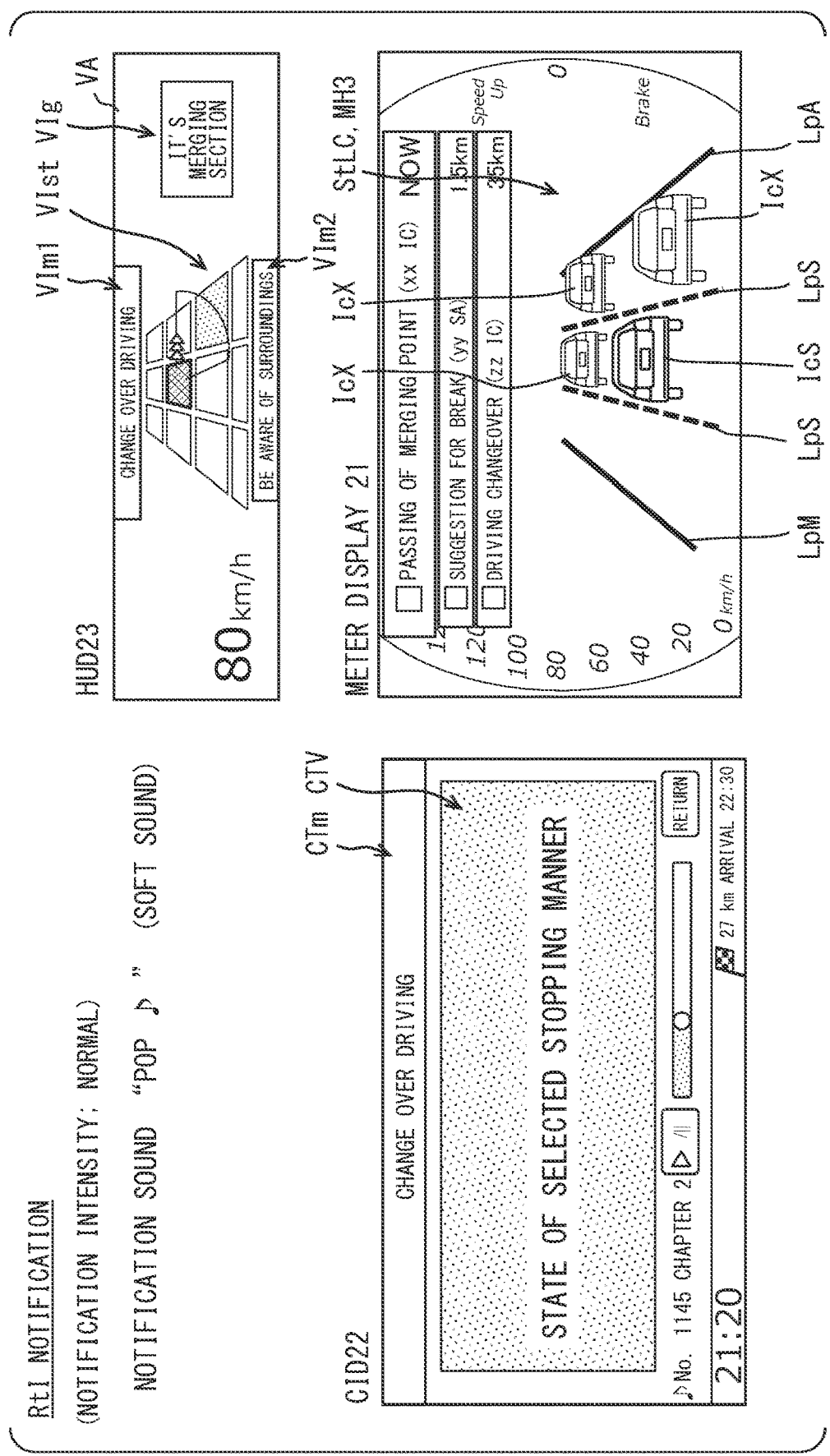
FIG. 24 is a view illustrating an example of an RtI notification in a case where the notification intensity is set to normal.
Figure 25:
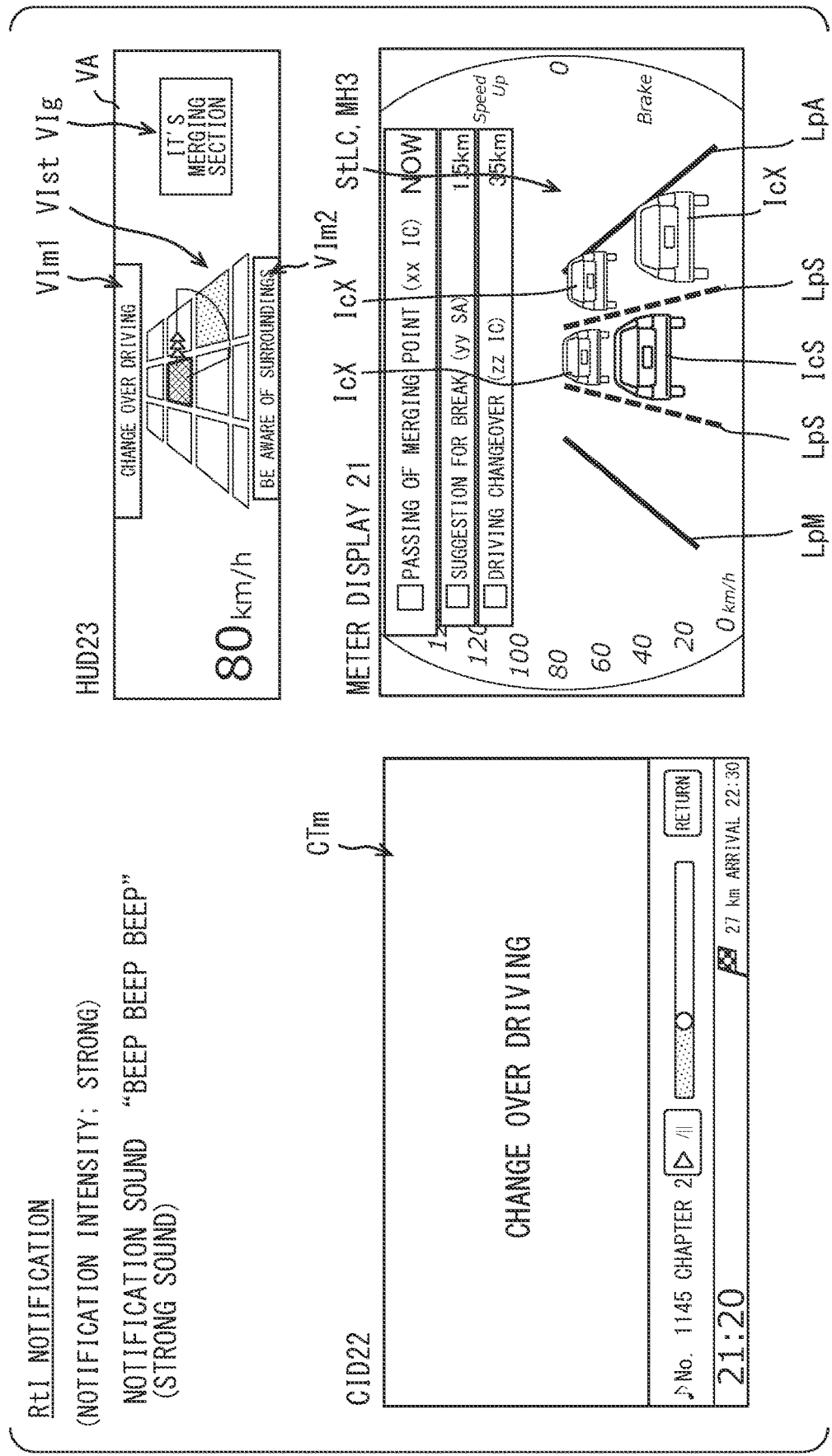
FIG. 25 is a view illustrating an example of an RtI notification in a case where the notification intensity is set to strong.

FIGS. 23 to 25 illustrate specific examples of the RtI notification Nt14. In the RtI notification Nt14, the display content of each of the LC message window CTm and the upper edge message window VIm1 is changed from the LC failure notification Nt13. In addition, the background color of each of the LC message window CTm and the upper edge message window VIm1 is changed to red or the like. Specifically, messages such as "change over driving" are displayed in the LC message window CTm and the upper edge message window VIm1, respectively.

Note that in the RtI notification Nt14, the content of the route notification window VIg is changed to a description such as "it's merging section". In addition, in the LC status StLC of the meter display 21, one subject vehicle lane icon LpS close to the merging lane icon LpM is changed from a solid line shape to a broken line shape.

The RtI notification Nt14 is performed with content corresponding to the notification intensity. Specifically, in the RtI notification Nt14 in a case where the notification intensity is set to "weak", the provision of the moving image content CTV is interrupted by the stopping manner selected by the driver, as illustrated in FIG. 23. In a case where the notification intensity is "weak", notification by voice using the notification sound is not performed.

Also in the RtI notification Nt14 in a case where the notification intensity illustrated in FIG. 24 is set to "normal", the provision of the moving image content CTV is interrupted by the stopping manner selected by the driver. In the RtI notification Nt14 of which the notification intensity is "normal", the audio device 24 reproduces a notification sound having a relatively soft tone. In addition, the HUD 23 further displays a lower edge message window VIm2. In the lower edge message window VIm2, a message for prompting to watch out for the periphery of the subject vehicle, such as "be aware of surroundings", is described.

In the RtI notification Nt14 in a case where the notification intensity illustrated in FIG. 25 is set to "strong", the LC message window CTm is expanded more than the LC failure possibility notification Nt12 and the LC failure notification Nt13. The moving image content CTV is covered by the LC message window CTm and is hidden. In the RtI notification Nt14 of which the notification intensity is "strong", the audio device 24 reproduces a strong notification sound (warning sound). Similarly to the case where the notification intensity is "normal", the HUD 23 displays a message such as "be aware of surroundings" in the lower edge message window VIm2.

When the notification intensity is "normal" or "strong", another vehicle exists around the subject vehicle. Therefore, the LC status StLC of the meter display 21 and the periphery status VIst by the HUD 23 notify the other vehicle traveling around the subject vehicle, and, in cooperation with the lower edge message window VIm2, prompt the driver to watch out for the periphery of the subject vehicle.

Figure 26:
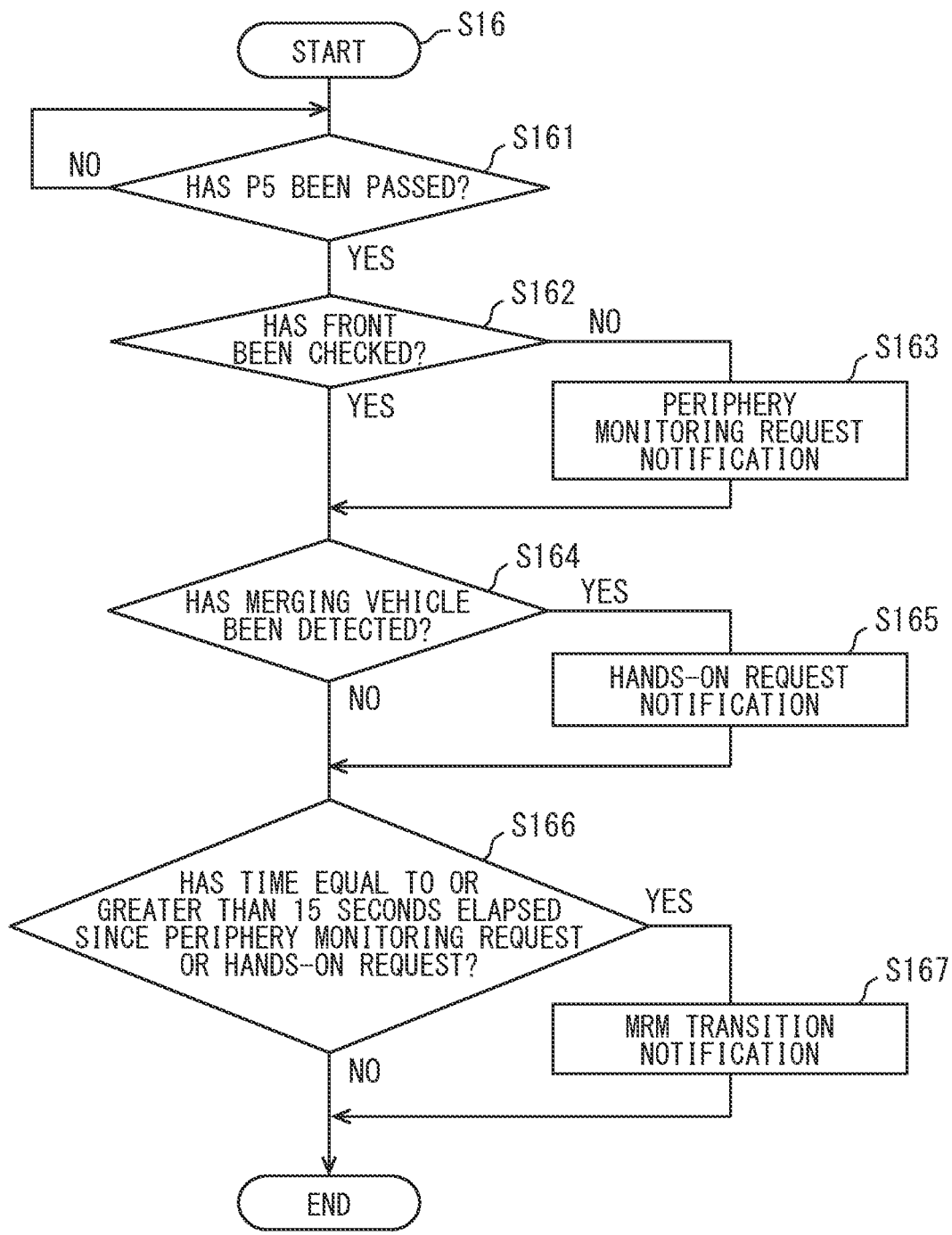
FIG. 26 is a flowchart illustrating sub-processing of controlling a notification in a merging section.

In the sub-processing (S16) of performing the notification in merging section illustrated in FIG. 26, it is determined in S161 whether the vehicle A has passed through the merging start point P5. In S161, arrival of the vehicle A at the merging start point P5 is waited. When it is determined in S161 that the vehicle A has passed through the merging start point P5, the process proceeds to S162.

In S162, it is determined whether the driver has checked the front. When it is determined in S162 that the driver has checked the front, the process proceeds to S164. On the other hand, when it is determined in S162 that the driver has not checked the front, the process proceeds to S163. In S163, the periphery monitoring request notification Nt21 is performed to the driver, and the process proceeds to S164. The periphery monitoring request notification Nt21 notifies that the presence or absence of the periphery monitoring responsibility has changed, more specifically, that the state has changed from a state without periphery monitoring responsibility to a state with periphery monitoring responsibility.

In S164, it is determined whether the merging vehicle Ac has been detected. When it is determined that the merging vehicle Ac has not been detected in S164, the process proceeds to S166. On the other hand, when it is determined that the merging vehicle Ac has been detected in S164, the process proceeds to S165. In S165, the driver is notified of a hands-on request for requesting the driver to hold the steering wheel, and the process proceeds to S166.

In S166, transition determination to MRM is performed. Specifically, it is determined in S166 whether a predetermined time (for example, about 15 seconds) has elapsed from the periphery monitoring request notification Nt21 in S163 or the hands-on request notification Nt22 in S165. When neither the periphery monitoring request nor the hands-on request is notified, or when the driver appropriately responds to the periphery monitoring request and the hands-on request, the process returns from S166 to S17 of the main process.

On the other hand, when the predetermined time has elapsed from the periphery monitoring request notification Nt21 in S163 with the front check by the driver being not performed, the process proceeds from S166 to S167. Similarly, when the predetermined time has elapsed from the hands-on request notification Nt22 in S165 with the steering wheel being not held by the driver, the process proceeds from S166 to S167. In S167, the MRM transition notification Nt23 is started in synchronization with the transition to the MRM by the autonomous driving system 50, and the process returns to S17 of the main process.

The autonomous driving level temporarily changes to Level 2 in the merging section CfS, but changes to Level 3 again after passing through the merging section CfS. Therefore, there is a possibility that transition to the MRM just because the driver does not meet a transition avoidance condition to the MRM due to a temporary change in the level of autonomous driving gives the driver cumbersomeness. Therefore, in a case where the driving transitions to Level 3 autonomous driving after the holding of the steering wheel by the driver remains not performed for a time shorter than 15 seconds (for example, 5 seconds) in S166, only a predetermined attention calling notification is given to the driver so as not to transition to the MRM. In this case, as an attention calling notification, a notification for instructing the driver to perform a correct operation in the next and subsequent times is made.

Figure 27:
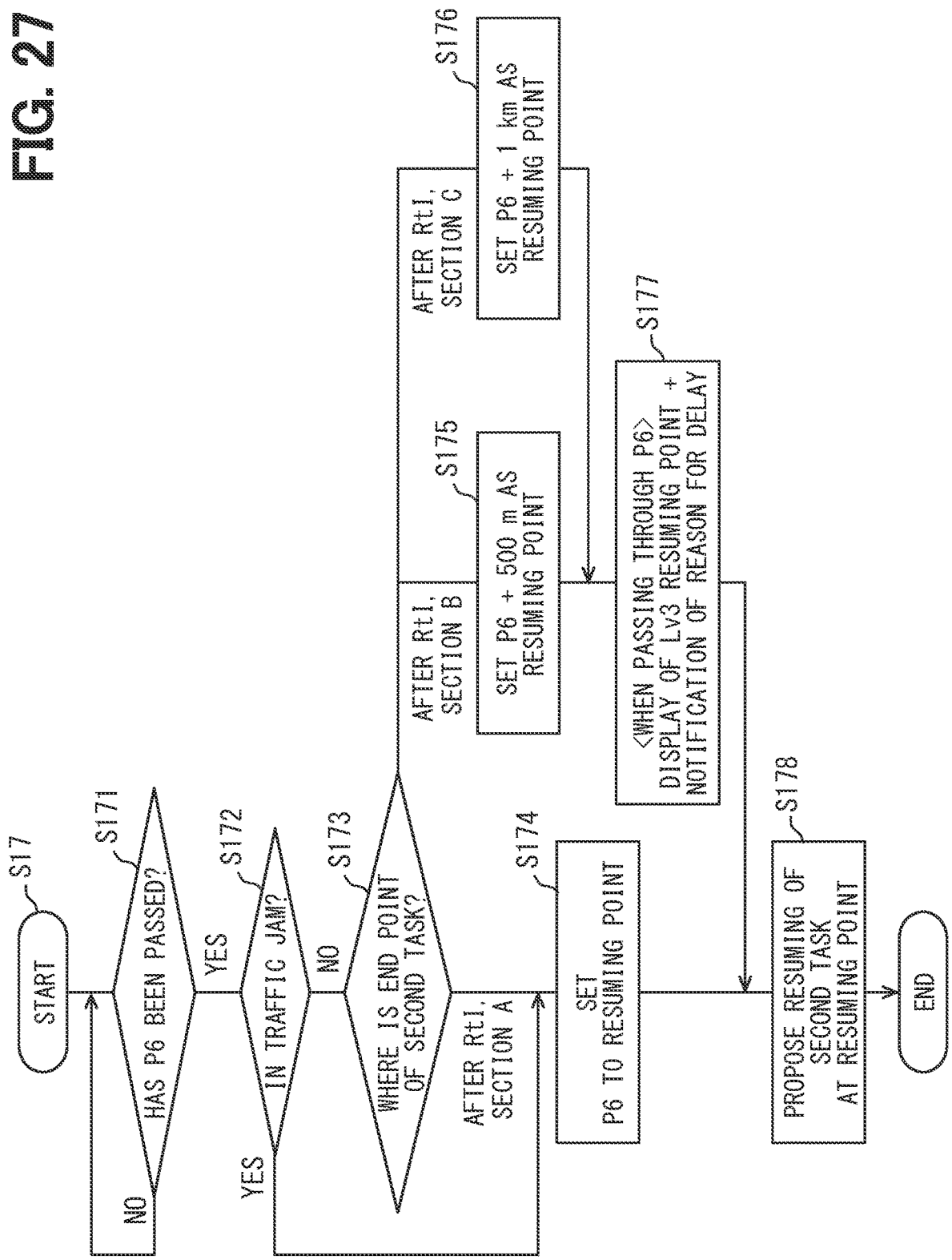
FIG. 27 is a flowchart illustrating sub-processing of controlling content resume timing.

In the sub-processing (S17) of controlling resumption of the content provision illustrated in FIG. 27, it is determined in S171 whether the vehicle A has passed through the merging end point P6. In S171, arrival of the vehicle A at the merging end point P6 is waited. When it is determined in S171 that the vehicle A has passed through the merging start point P5, the process proceeds to S172.

In S172, it is determined whether the road on which the vehicle is traveling is in a traffic jam. The determination whether to be a traffic jam is performed based on, for example, the vehicle speed information and the detection result of another vehicle by the environment recognition unit 61. When it is determined in S172 that the vehicle is in a traffic jam, the process proceeds to S174. As described above, when the vehicle travels in a traffic jam section, the timing control for resuming the content provision is stopped.

On the other hand, when it is determined in S172 that the vehicle is not in a traffic jam, the process proceeds to S173. In S173, a point at which the driver has ended the second task, that is, an interruption timing is determined. In S174 to S176, a resuming point at which resumption of provision of the moving image content CTV or the like is permitted according to an interruption timing, that is, a permission timing is changed.

Specifically, when the driver has ended the second task in the first half of the section from the TOR point P4 to the merging start point P5 (see TA in FIG. 4), in other words, immediately after the RtI notification Nt14, the process proceeds from S173 to S174. In S174, the merging end point P6 is set as a resuming point, and the process proceeds to S178.

On the other hand, when it is determined in S173 that the driver has ended the second task in the second half of the section from the TOR point P4 to the merging start point P5 (see TB in FIG. 4), the process proceeds to S175. In S175, a point 500 m from the merging end point P6 is set as a resuming point, and the process proceeds to S177. Furthermore, when it is determined in S173 that the driver has ended the second task after passing through the merging start point P5 (see TC in FIG. 4), the process proceeds to S176. In S176, a point 1 km from the merging end point P6 is set as a resuming point, and the process proceeds to S177. As described above, the interruption time of the second task is kept substantially constant. Hence, the earlier the driver interrupts the second task, the earlier he/she can resume the second task. Note that the distance from the merging end point P6 of each resuming point may be appropriately changed.

In S177, the resuming point of the Level 3 autonomous driving is displayed as the vehicle passes through the merging end point P6. In addition, in S177, a reason for delay of resumption of the second task is further notified, and the process proceeds to S178. In S178, a resume proposal notification Nt31 for proposing resumption of the second task is performed at the resuming point set in S174 to S176, and a series of presentation control processing ends.

Figure 28:
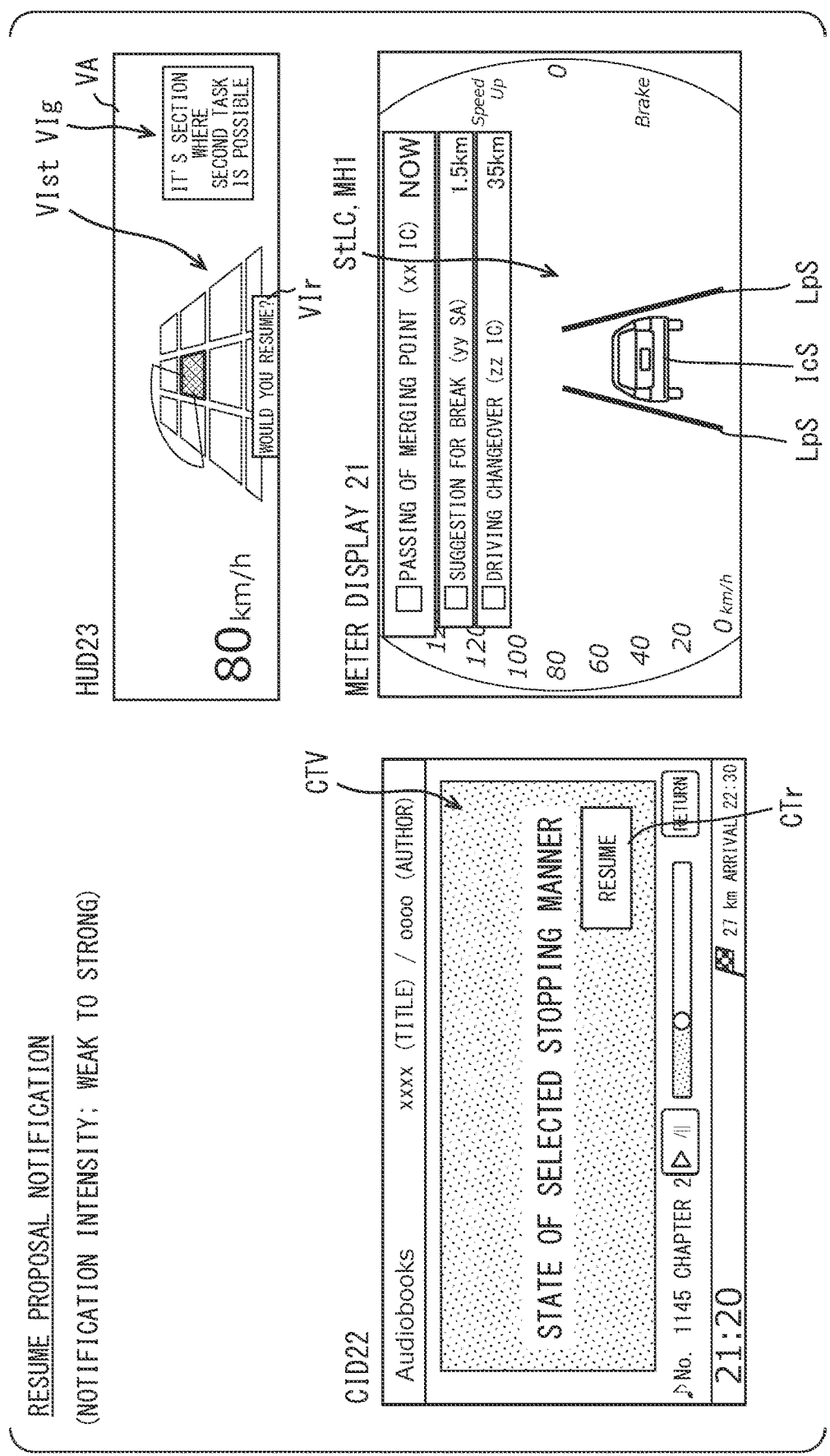
FIG. 28 is a view illustrating an example of a resume proposal notification.

In the resume proposal notification Nt31 illustrated in FIG. 28, the display of the LC message window CTm and the upper edge message window VIm1 ends. In addition, in the resume proposal notification Nt31, a resumption button CTr and a resumption icon VIr for instructing to resume the provision of content are displayed on the CID 22 and the HUD 23, respectively. The resumption button CTr is displayed on the display screen of the CID 22 to be superimposed on the moving image content CTV or the like whose provision has been interrupted. Characters such as "resume", for example, are described in the resumption button CTr. The resumption icon VIr is displayed at a lower edge center of the angle of view VA of the HUD 23. Characters such as "resume?", for example, are described in the resumption icon VIr. The driver resumes the reproduction of the moving image content CTV or the like whose provision has been interrupted by a touch operation on the resumption button CTr or an operation on the operation device 26 that selects the resumption icon VIr.

Figure 4:
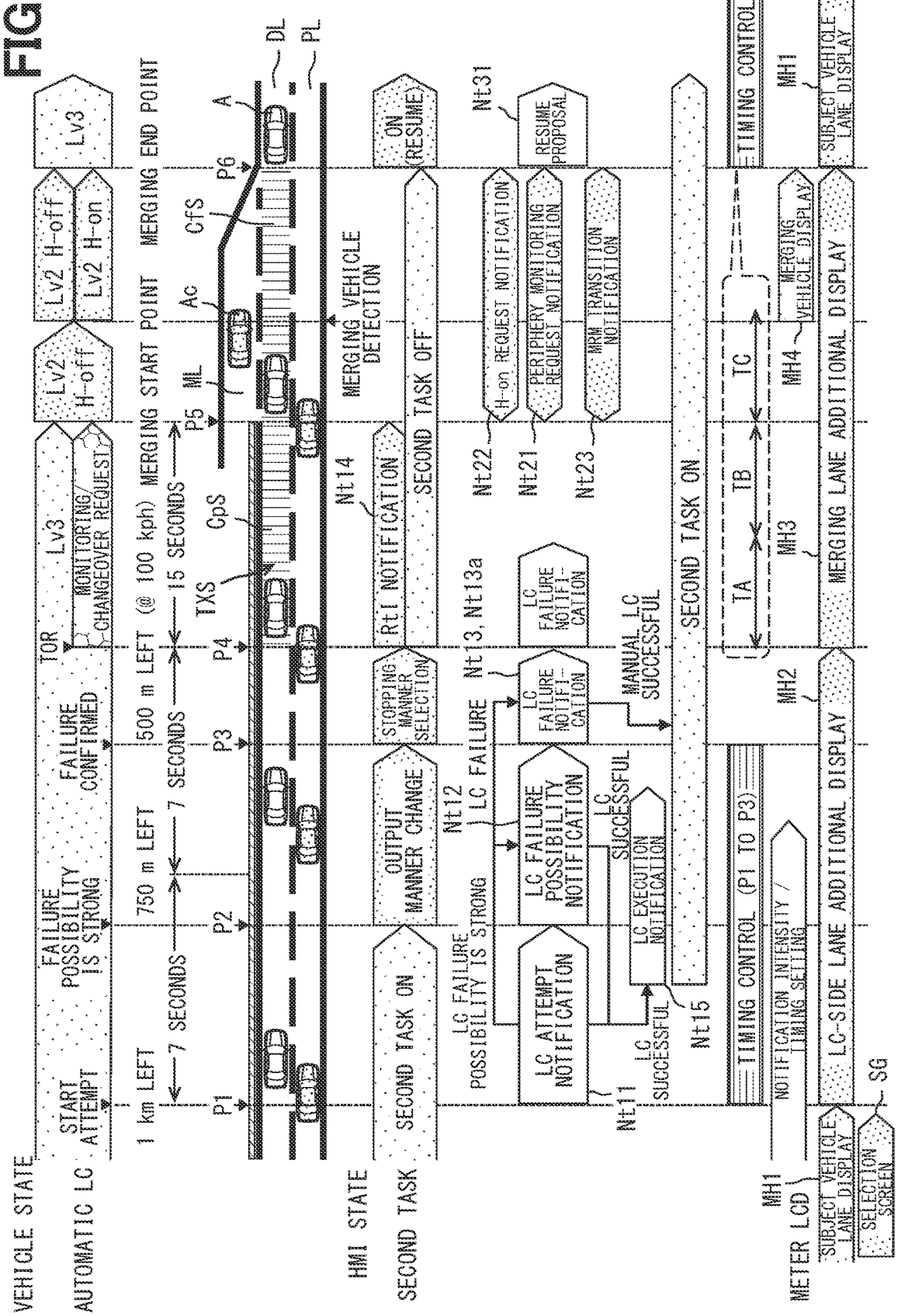
FIG. 4 is a view illustrating each state transition of a vehicle and HMI in a scene where a second task is interrupted.

Details of the display transition of the LC status StLC displayed in the interruption process of the second task described above will be further organized and described with reference to FIG. 4 based on FIGS. 29 and 30.

FIG. 29 illustrates the display transition when the autonomous LC fails. In a subject vehicle lane display MH1 before the vehicle A arrives at the LC start point P1, the subject vehicle icon IcS and the subject vehicle lane icon LpS (only) are displayed in the LC status StLC. When the autonomous LC is not activated, the adjacent lane icon LpA is not displayed even if an adjacent lane exists.

When the vehicle A is traveling from the LC start point P1 to the TOR point P4, the LC status StLC transitions from the subject vehicle lane display MH1 to an LC side lane additional display MH2 along with the activation of the autonomous LC. In the LC side lane additional display MH2, the adjacent lane icon LpA is further displayed. In addition, the subject vehicle lane icon LpS close to the adjacent lane icon LpA is changed from a solid line shape to a broken line shape. Note that some actual dividing lines in the merging lane ML side have a broken line shape. However, in the LC side lane additional display MH2, the subject vehicle lane icon LpS on the left side is displayed in a solid line.

When the vehicle A is traveling from the TOR point P4 to the merging end point P6, the LC status StLC transitions from the LC side lane additional display MH2 to a merging lane additional display MH3. In the merging lane additional display MH3, the merging lane icon LpM is further displayed. In addition, the subject vehicle lane icon LpS close to the merging lane icon LpM is changed from a solid line shape to a broken line shape.

Furthermore, when the merging vehicle Ac is detected by the environment recognition unit 61, the merging lane additional display MH3 becomes a merging vehicle display MH4. In the merging vehicle display MH4, the other vehicle icon IcX is displayed between the merging lane icon LpM and the subject vehicle lane icon LpS. The display position of the other vehicle icon IcX changes according to the relative position of the merging vehicle Ac. Then, when the vehicle A passes through the merging end point P6, the LC status StLC returns to the subject vehicle lane display MH1 displaying only the subject vehicle icon IcS and the subject vehicle lane icon LpS.

Figure 30:
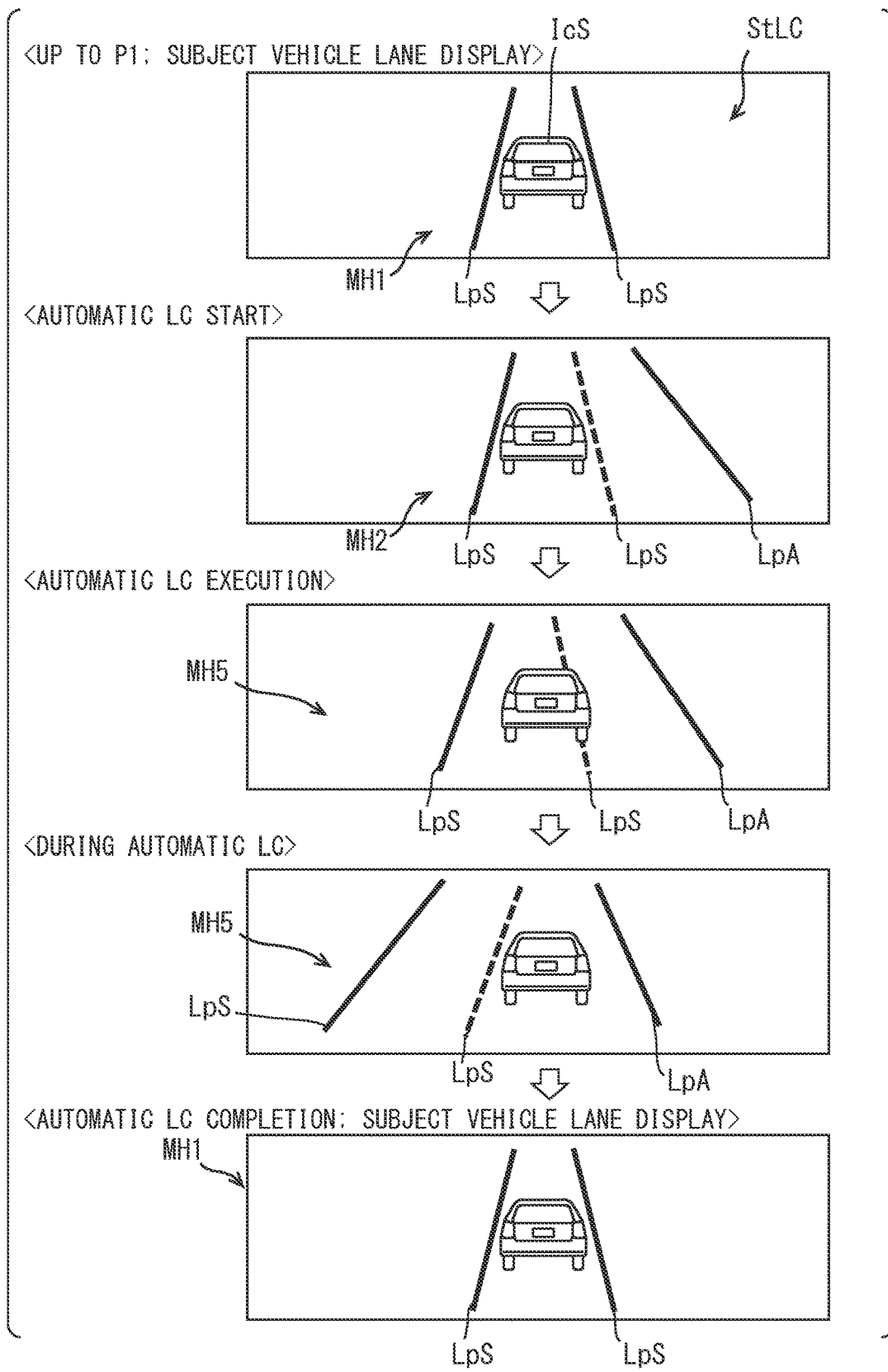
FIG. 30 is a view illustrating an example of LC status display transition in a case of successful autonomous LC.
Figure 31:
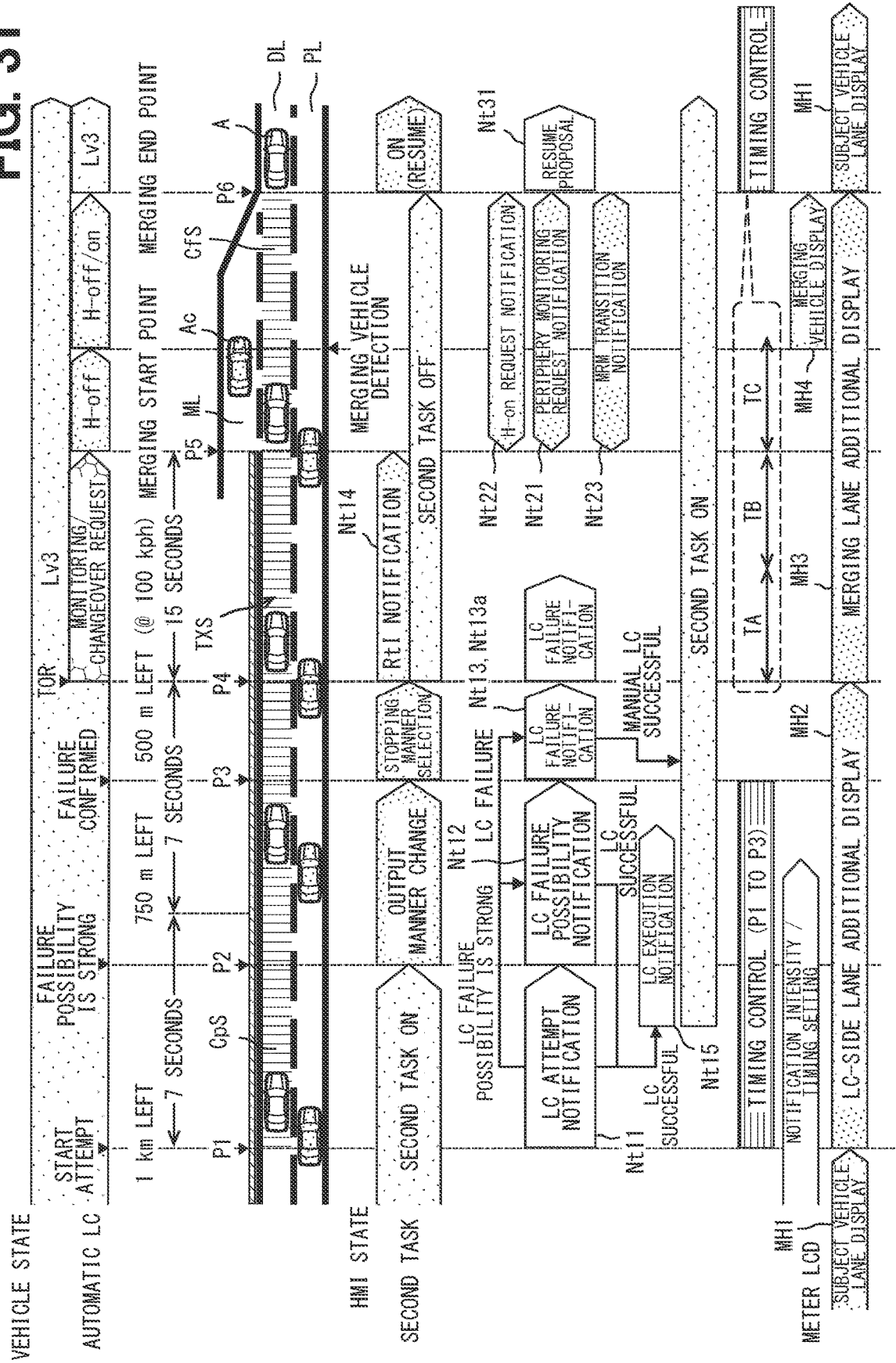
FIG. 31 is a view illustrating each state transition of a vehicle and HMI in an interruption scene of a second task in a second embodiment.
Figure 32:
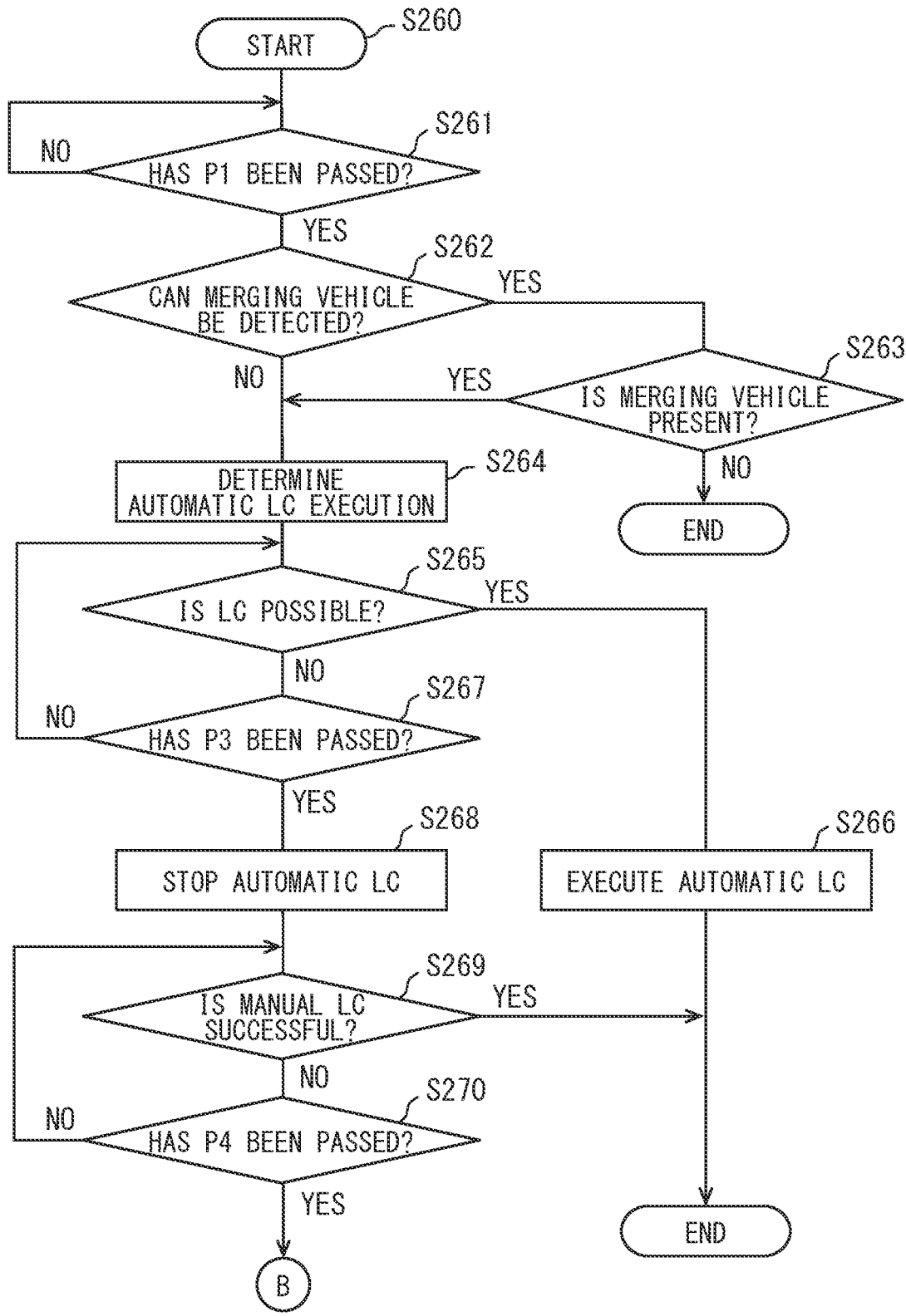
FIG. 32 is a flowchart illustrating a detail of the autonomy level control processing together with FIG. 33.
Figure 33:
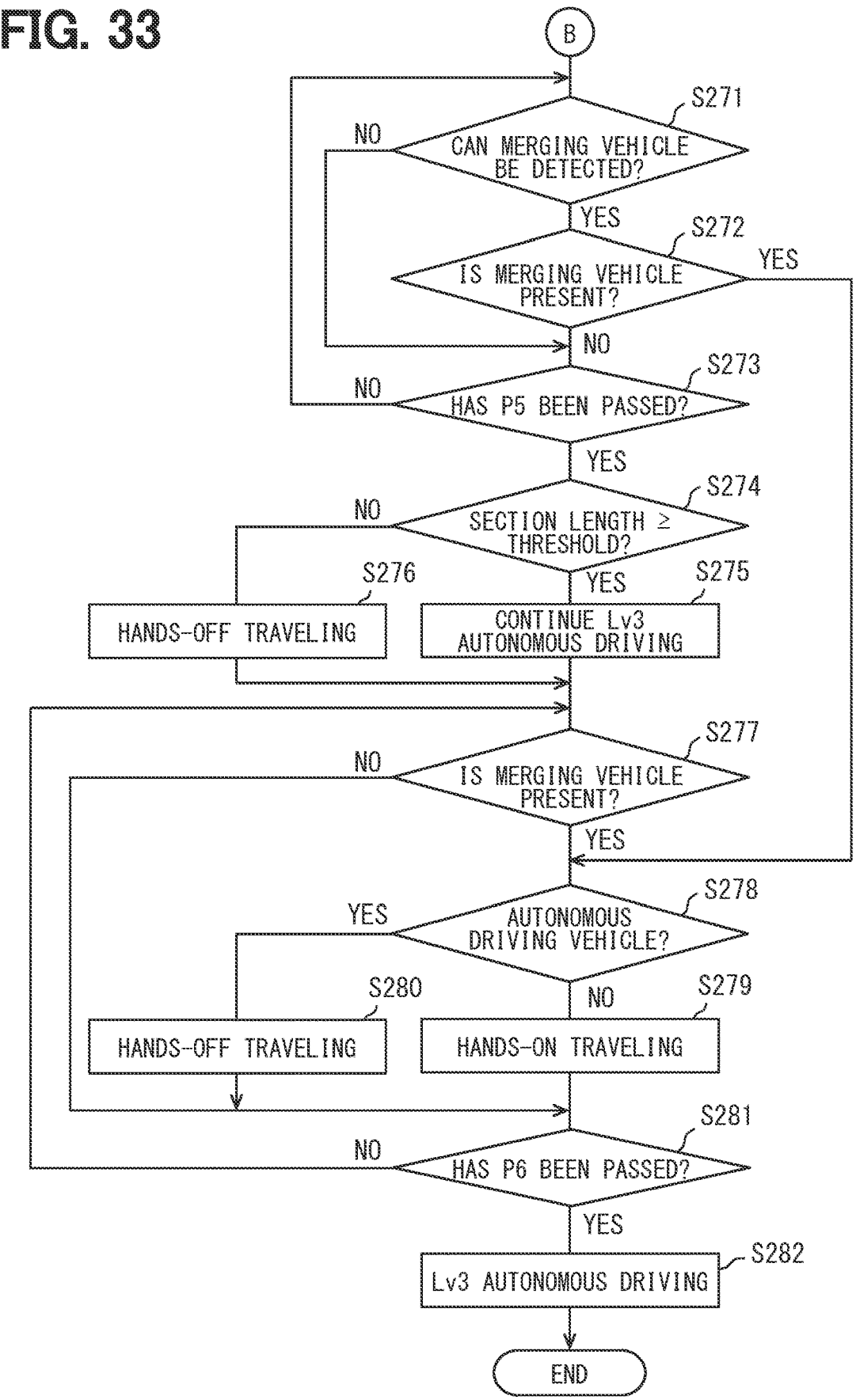
FIG. 33 is a flowchart illustrating a detail of the autonomy level control processing together with FIG. 32.
Figure 34:
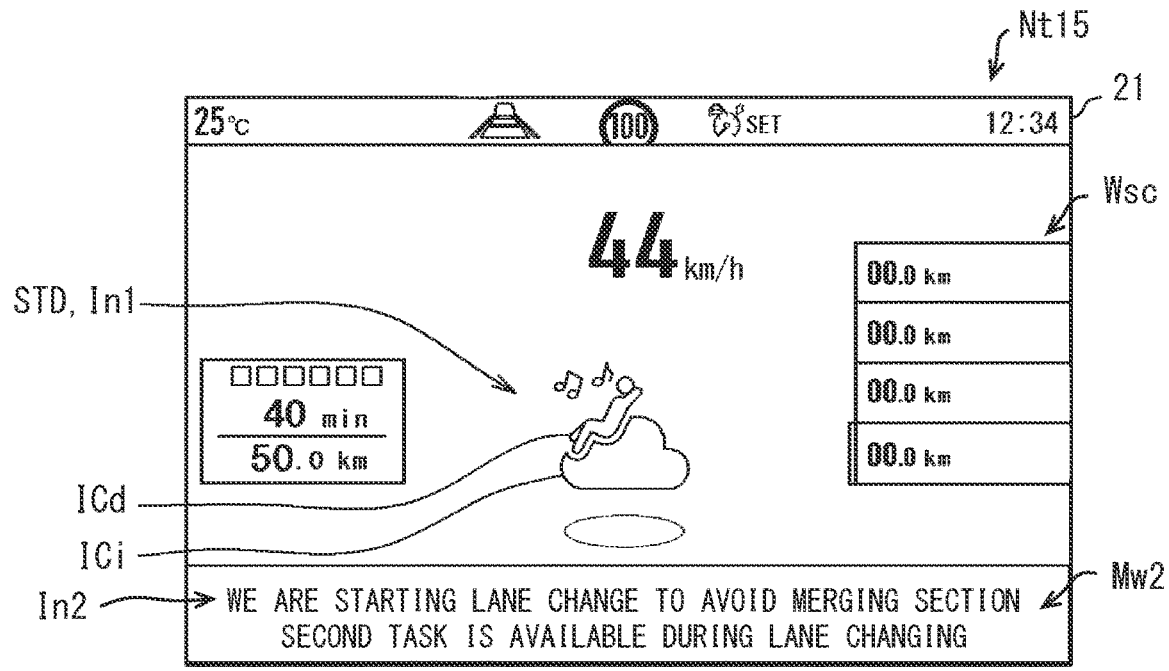
FIG. 34 is a view illustrating an example of display on a meter display in an LC execution notification.
Figure 35:
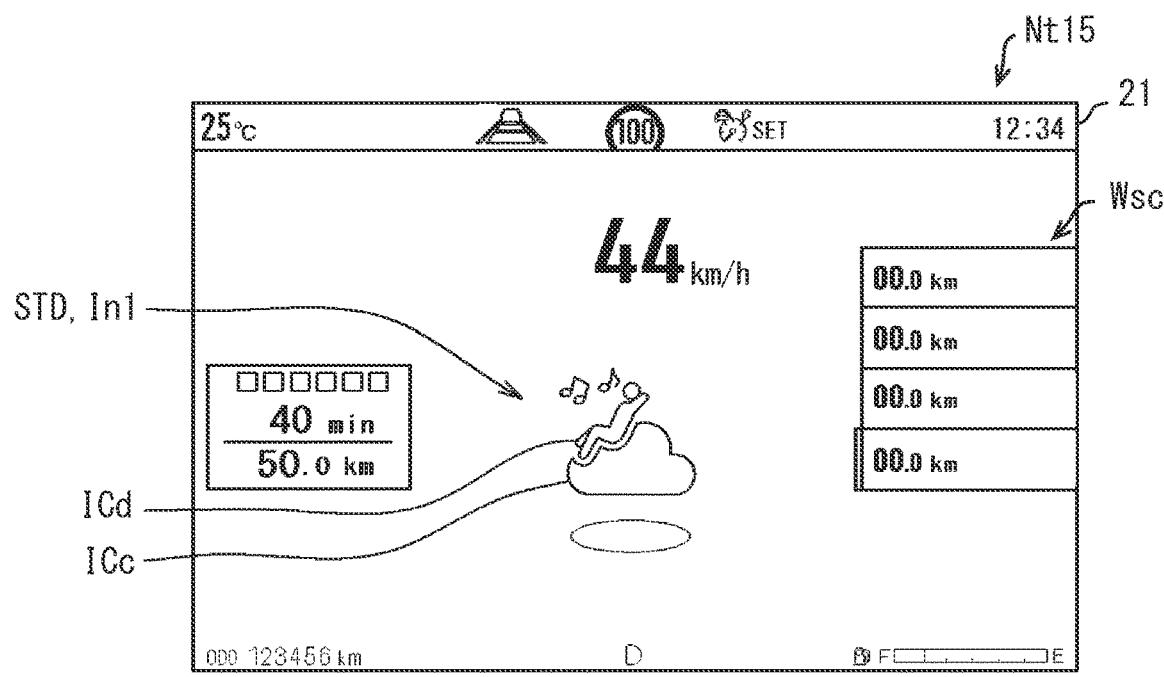
FIG. 35 is a view illustrating an example of display on a meter display notifying completion of the autonomous LC.

FIG. 30 illustrates the display transition when the autonomous LC succeeds. Also in this case, before the vehicle A arrives at the LC start point P1, the LC status StLC is the subject vehicle lane display MH1 displaying the subject vehicle icon IcS and the subject vehicle lane icon LpS (only). Then, along with the activation of the autonomous LC, the LC status StLC transitions to the LC side lane additional display MH2. As a result, the adjacent lane icon LpA is further displayed.

When the autonomous LC transitions from the waiting state to the execution state, the LC status StLC is changed to an LC execution display MH5. In the LC execution display MH5, along with movement of the vehicle A to the lateral direction, the subject vehicle lane icon LpS and the adjacent lane icon LpA move in a direction opposite to the moving direction of the vehicle A with respect to the subject vehicle icon IcS. At this time, the display position of the subject vehicle icon IcS is kept substantially at the center of the LC status StLC. By the movement of the subject vehicle lane icon LpS and the adjacent lane icon LpA, the subject vehicle icon IcS moves between the subject vehicle lane icon LpS and the adjacent lane icon LpA. Then, when the autonomous LC is completed, the display of the farther one of the subject vehicle lane icons LpS from the subject vehicle icon IcS is ended. Furthermore, the other subject vehicle lane icon LpS whose display is continued is changed from a broken line shape to a solid line shape. As described above, the LC status StLC returns to the subject vehicle lane display MH1.

In the first embodiment described above, when interruption of the second task is determined in the autonomous traveling period, the provision method of the content provided in association with the second task is changed. Hence, from the change in the content provision method, the driver can recognize the current state in which the driving changeover from the autonomous driving operation is required. According to the above, it becomes easy to convince the driver that the second task is interrupted by the determination on the system side. Therefore, it becomes possible to reduce the driver's discomfort when the second task is interrupted, and it becomes possible to enhance the driver convenience related to driving changeover.

In addition, in the first embodiment, when interruption of the second task is determined in the autonomous traveling period, an option of selecting an interruption method of the content provided in association with the second task is presented. Hence, the driver can recognize the current state in which the driving changeover from the autonomous driving operation is required through the work of selecting the interruption method based on the option. According to the above, it becomes easy to convince the driver that the second task is interrupted by the determination on the system side. Therefore, it becomes possible to reduce the driver's discomfort when the second task is interrupted, and it becomes possible to enhance the driver convenience related to driving changeover.

In the first embodiment, the provision method of the moving image content CTV is changed before the stopping manner selection notification Nt13a for presenting the option is performed. As described above, if the process of changing the output manner of the moving image content CTV and the process of presenting the option are sequentially performed, the driver becomes able to easily transition the direction of awareness from the second task to driving. As a result, it is possible to further reduce the possibility that the interruption of the second task is felt uncomfortable.

Furthermore, in the first embodiment, an option corresponding to the type of the second task performed by the driver is presented in the stopping manner selection notification Nt13a. According to the above, the driver can select his/her preferred interruption method from among the interruption method options appropriately set according to the second task being performed. Thus, reduction in discomfort for options makes it easier to convince the driver of interruption of the second task.

In addition, in the first embodiment, the driver is notified of the state of the autonomous LC for avoiding interruption of the second task. Therefore, the driver learns that the autonomous driving system 50 does not request the driver to change over the driving without any reason, but has no choice but to request the changeover the driving because the autonomous LC as an avoidance behavior has failed, and then selects the content interruption method. As a result, the driver's discomfort against interruption of the second task becomes more easily reduced.

Furthermore, according to the state notification of the autonomous LC by the LC status StLC, the LC message window CTm, or the like, the driver recognizes the change in the content provision method after learning that the driving changeover is inevitably requested due to failure of the autonomous LC. Thus, by additionally obtaining information on the autonomous driving system 50 side, the driver's discomfort against interruption of the second task becomes more easily reduced.

In the first embodiment, the selection screen SG for selecting whether to perform the autonomous LC as an avoidance behavior is presented to the driver by the provision control unit 84. Thus, when the driver selects necessity of performance of the autonomous LC, traveling desired by the driver is achieved. As a result, it becomes possible to encourage the driver to be convinced.

Furthermore, in the first embodiment, on the selection screen SG, the driver is notified of a change in whether to continue the second task depending on whether to perform the autonomous LC. Hence, the driver becomes possible to easily grasp how the content of the travel control by the autonomous driving operation, that is, the autonomous driving level changes between the case where performance of the autonomous LC is selected and the case where performance of the autonomous LC is not selected. Thus, provision of information serving as an index when selecting the driver allows the driver to smoothly determine selection of whether to perform the autonomous LC. As a result, convenience improvement is achieved.

In the first embodiment, the strength of the RtI notification Nt14 is changed according to the state of the driver. This makes it possible to perform the RtI notification Nt14 that is less likely to be bothersome to the driver while preventing overlooking by the driver. Hence, the driver's discomfort can be further reduced. Furthermore, in the first embodiment, a changing manner of the provision method of the moving image content CTV is changed according to the state of the driver. According to the above, it is possible to appropriately switch the direction of the driver's awareness from the second task to the driving act.

In addition, in the first embodiment, the strength of the RtI notification Nt14 is changed according to the state of another vehicle traveling around the subject vehicle. Hence, in a case where many other vehicles exist, performance of a strong notification makes it possible to promptly direct the driver's awareness to the driving. According to the above, the driver can comfortably cope with the state of the high driving load after interruption of the second task. As a result, the driver's impatience and discomfort become easily reduced.

In the first embodiment, the timings of the LC attempt notification Nt11, the LC failure possibility notification Nt12, and the LC failure notification Nt13, in other words, the LC start point P1 to the confirmation point P3 are changed according to the state of another vehicle traveling around the subject vehicle. Also from the above, the driver can comfortably perform interruption of the second task and transition to the subsequent driving act. As a result, the driver's impatience and discomfort become more easily reduced.

In the first embodiment, the interruption timing of the second task in the driver is grasped. Then, the permission timing for permitting the resumption of provision of content is changed according to the interruption timing of the second task. Hence, the second task interruption time can be kept substantially constant. As a result, the driver becomes easy to have motivation to interrupt the second task by his/her own will.

Furthermore, in the first embodiment, an interruption method of the second task selected by the driver is learned. Then, in the selection notification of the stopping manner, initial display based on learning is performed. According to the above, it is possible to reduce cumbersomeness of the selection operation performed when the second task is interrupted.

In the first embodiment, by the LC status StLC or the like displayed on the meter display 21, the driver is notified of the operation state of the autonomous LC for attempting to avoid entering the merging section CfS. In this LC status StLC, the number of lanes is increased or decreased by switching between displaying and hiding of the adjacent lane icon LpA and the merging lane icon LpM. As a result, information that should be grasped by the driver is presented at necessary timing. According to the above, when passing through the merging section CfS, the driver becomes easy to appropriately perform determination regarding the driving changeover by referring to the provision information of the LC status StLC.

In addition, according to the first embodiment, in addition to the periphery monitoring request notification Nt21 for notifying that the presence or absence of the periphery monitoring responsibility has changed, the LC failure notification Nt13 for giving an advance notification of a change in the presence or absence of the periphery monitoring responsibility having been scheduled is performed. Hence, even if the driver performs the second task in the autonomous traveling period without the periphery monitoring responsibility, it is possible to cause the driver to recognize early that there is a request for driving changeover from the autonomous driving operation. Therefore, it becomes possible to enhance the driver convenience related to driving changeover.

In the first embodiment, the LC failure possibility notification Nt12 is performed at a timing different from that of the LC failure notification Nt13 in a case where a change from a state without a periphery monitoring responsibility to a state with a periphery monitoring responsibility is scheduled by transition from the eyes-off travel to the hands-off travel. The LC failure possibility notification Nt12 can function to give the driver an advance notification of end (interruption) of the second task. According to the information presentation in which the LC failure possibility notification Nt12 is not performed at one time with the LC failure notification Nt13, it is possible to prevent the driver from being confused. Hence, convenience improvement is achieved.

In the first embodiment, the LC failure possibility notification Nt12 that gives an advance notification of end of the second task is performed before the LC failure notification Nt13 that gives an advance notification of the change in the presence or absence of the periphery monitoring responsibility. As described above, functioning the LC failure possibility notification Nt12 as an end advance notification of the second task makes it possible to prompt early the driver to end the second task. As a result, since the length of time that can be used until the periphery monitoring is resumed becomes long, a smooth driving changeover can be performed.

In addition, in the first embodiment, in a case where the driver is carrying out viewing of the moving image content CTV as a second task, processing of continuing audio output while interrupting display is performed in the LC failure possibility notification Nt12. According to such notification, it becomes possible to smoothly transition driver's awareness from the moving image content CTV to the periphery monitoring. As a result, the driver becomes less likely to feel uncomfortable about the driving changeover.

In the above embodiment, the second task corresponds to the "specific act", and the autonomous LC corresponds to the "avoidance behavior" and the "specific travel control". The LC failure possibility notification Nt12 corresponds to the "end advance notification", the LC failure notification Nt13 and the stopping manner selection notification Nt13a correspond to the "monitoring advance notification", the RtI notification Nt14 corresponds to the "request notification", and the periphery monitoring request notification Nt21 corresponds to the "periphery monitoring notification". Furthermore, the changeover control unit 82 corresponds to the "interruption determination unit" and the "monitoring responsibility grasping unit", the integration state estimation unit 83 corresponds to the "driver state grasping unit", the moving image content CTV corresponds to the "content", and the HCU 100 corresponds to the "presentation control device".

Second Embodiment

The second embodiment of the present disclosure illustrated in FIGS. 31 to 35 is a modification of the first embodiment. In the second embodiment, the presentation of the selection screen SG (see FIG. 4) for inquiring whether to perform the autonomous LC is omitted. The merging preparation section CpS positioned before the merging section CfS is extended to a closer side up to the LC start point P1.

The autonomous driving ECU 50*b* can also grasp the presence or absence of the merging vehicle Ac traveling in the merging lane ML in the merging preparation section CpS from the LC start point P1 to the TOR point P4. When determining that the vehicle A passes through the LC start point P1 in the autonomy level control processing (see FIGS. 32 and 33) (S261: YES), the autonomous driving ECU 50*b* determines whether to be able to detect the merging vehicle Ac traveling in the merging lane ML (S262). When the merging vehicle Ac can be detected (S262: YES), the autonomous driving ECU 50*b* further determines the presence or absence of the merging vehicle Ac traveling in the merging lane ML (S263). When determining that the merging vehicle Ac traveling in the merging lane ML does not exist (S263: NO), the autonomous driving ECU 50*b* ends the autonomy level control processing, continues the Level 3 autonomous driving, and allows the vehicle to pass through the merging section CfS while keeping the eyes-off travel.

On the other hand, when the detection of the merging vehicle Ac is not possible (S262: NO) or when the presence of the merging vehicle Ac is grasped (S263: YES), the autonomous driving ECU 50*b* determines to execute the autonomous LC. Similarly to the first embodiment, the autonomous driving ECU 50*b* continues the attempt of the autonomous LC until the vehicle A passes through the confirmation point P3, and stops the autonomous LC (S268) when the vehicle A passes through the confirmation point P3 while remaining unable to execute the autonomous LC (S267: YES). On the other hand, when start of the autonomous LC becomes possible until passing through the confirmation point P3 (S265: YES), the autonomous driving ECU 50*b* executes the autonomous LC (S266). Note that the processing in S267 to S272 is substantially the identical to the processing in the first embodiment.

Based on the fact that the autonomous driving ECU 50*b* is scheduled to execute the autonomous LC, the HCU 100 performs the LC execution notification Nt15. When the autonomous LC is smoothly started, the LC execution notification Nt15 is started before the notification timing of the LC failure possibility notification Nt12 when the autonomous LC cannot be started. The screen display of the meter display 21 in the LC execution notification Nt15 includes a driver status STD, a schedule window Wsc, and a message window Mw2 (see FIG. 34). The screen display of the meter display 21 including the driver status STD and the message window Mw2 may be performed as the LC attempt notification Nt11.

The driver status STD is displayed at the screen center of the meter display 21 and presents a driving task requested to the driver. When the vehicle A travels in the Level 3 autonomous driving, the driver status STD is in a display aspect in which the driver icon ICd is seated on a chair icon ICi. The driver icon ICd is a human-shaped display object in a posture as reclined backward. The driver status STD functions as continuance possible information Int, and notifies the driver that the second can be continued even if the autonomous LC is executed.

The schedule window Wsc includes a plurality of blocks arranged in the up-down direction of the meter display 21. In each block, a performance schedule of control scheduled by the autonomous driving ECU 50*b* is displayed along time series.

The message window Mw2 is displayed at a position facing the lower edge of the display screen of the meter display 21. In the message window Mw2, at least a first message of "we are starting lane change to avoid merging section" and a second message of "2nd task is available during lane changing" are described. The first message notifies subject vehicle control information In2 related to the travel environment and the control state of the vehicle A. The second message notifies that the second can be continued similarly to the driver status STD.

By a change in the LC execution notification Nt15, the HCU 100 reports to the driver about completion of the autonomous LC. Specifically, when the autonomous LC is completed, the HCU 100 hides the message window Mw2 including the subject vehicle control information In2 (see FIG. 35). On the other hand, the HCU 100 indicates, to the driver, that the second task can be continued by continuing the display of the driver status STD notifying the continuance possible information In1.

The autonomous driving ECU 50*b* further grasps the section length of the merging section CfS, for example, at the timing (S260) when the presence of the merging section CfS is grasped. According to the section length of the merging section CfS, the autonomous driving ECU 50*b* determines in advance whether to continue the eyes-off travel at the autonomous driving level 3 also in the merging section CfS or whether to transition to the hands-off travel at the autonomous driving level 2. When the vehicle A enters the merging section CfS (S273: YES), in a case where the section length of the merging section CfS exceeds a continuation threshold (S274: YES), the autonomous driving ECU 50*b* continues the eyes-off travel (S275). On the other hand, when the section length of the merging section CfS is less than the continuation threshold (S274: NO), the autonomous driving ECU 50*b* transitions from the eyes-off travel to the hands-off travel (S276). In the second embodiment, even when the section length is substantially the same as the continuation threshold, the eyes-off travel is continued. Such continuation threshold may be a predetermined value defined in advance, or may be changed according to the number of lanes, the width of each lane, the speed limit, and the like of the road indicated by the map data.

The autonomous driving ECU 50*b* changes the autonomous driving level according to the presence or absence of the merging vehicle Ac during the period of traveling in the merging section CfS. In addition, when grasping the presence of the merging vehicle Ac, the autonomous driving ECU 50*b* further grasps the control situation of the autonomous driving of the merging vehicle Ac, and changes the autonomous driving level according to the control situation of the autonomous driving. Specifically, when determining that the merging vehicle Ac that is merging does not exist (S277: NO) during performance of the eyes-off travel (S275), the autonomous driving ECU 50*b* determines continuation of the eyes-off travel. When determining that the merging vehicle Ac that is merging is the subject vehicle driving vehicle (S278: YES) during performance of the eyes-off travel (S275), the autonomous driving ECU 50*b* determines transition to the hands-off travel in which the driver is not responsible for the steering operation (S280). Note that in a case where the merging vehicle Ac is the subject vehicle driving vehicle, continuation of the eyes-off travel may be determined. Furthermore, when having failed to determine that the merging vehicle Ac is an autonomous driving vehicle (S278: NO), the autonomous driving ECU 50*b* determines transition to the hands-on travel in which the driver is responsible for the steering operation (S279).

On the other hand, when determining that the merging vehicle Ac that is merging does not exist during performance of the hands-off travel (S276) (S277: NO), the autonomous driving ECU 50*b* determines continuation of the hands-off travel. Also when determining that the merging vehicle Ac that is merging is the subject vehicle driving vehicle during performance of the hands-off travel (S276) (S278: YES), the autonomous driving ECU 50*b* determines continuation of the hands-off travel (S280). Furthermore, when having failed to determine that the merging vehicle Ac is an autonomous driving vehicle (S278: NO), the autonomous driving ECU 50*b* determines transition to the hands-on travel (S279).

When the vehicle A leaves the merging section CfS (S281: YES), the autonomous driving ECU 50*b* resumes the eyes-off travel at the autonomous driving level 3. In this manner, in a case of transitioning from the state with the periphery monitoring responsibility to the state without the periphery monitoring responsibility, the HCU 100 causes the meter display 21 to display the message window Mw2 before leaving the merging section CfS. In the message window Mw2, a first message of "merging section is ending soon" and a second message of "after merging section ends, second task is available" are displayed. The first message in this case also becomes the subject vehicle control information In2. Based on the passage of the vehicle A through the merging end point P6, the HCU 100 notifies the driver that the second task is permitted by the continuation display of the driver status STD while hiding the message window Mw2.

Also in the second embodiment described so far, the same effects as those of the first embodiment can be achieved, and it becomes possible to enhance the driver convenience related to driving changeover.

In addition, in the second embodiment, when the autonomous driving ECU 50*b* is scheduled to execute the autonomous LC, the continuance possible information In1 indicating that the second task can be continued and the subject vehicle control information In2 related to at least one of the travel environment and the control state of the vehicle A are displayed. These pieces of information In1 and In2 are displayed on the display screen of the meter display 21 as the LC execution notification Nt15 before the notification timing of the LC failure possibility notification Nt12 that gives an advance notification of end of the second task.

When the autonomous LC is executed, even in a situation where the driver is not responsible for periphery monitoring, the driver tends to consider the possibility that periphery monitoring is needed. Hence, if it is clearly indicated, as the continuance possible information In1, that the second task can be continued, the driver can continue the second task with security even in the execution scene of the autonomous LC.

Further, when the subject vehicle control information In2 is further notified in addition to the continuance possible information In1, the driver becomes possible to easily grasp the travel environment and the control state related to the autonomous LC. As a result, it is possible to enhance the sense of security of the driver when the travel control such as the autonomous LC is performed.

In the second embodiment, when the autonomous LC is completed, and when the vehicle leaves the merging section CfS and transitions from the state with periphery monitoring responsibility to the state without periphery monitoring responsibility, the subject vehicle control information In2 is hidden, and the display of the continuance possible information Int of the second task is continued. As described above, when the subject vehicle control information In2 is hidden, the types of information presented by the screen display decrease. As a result, the continuance possible information Int is highlighted on the screen display, and it becomes easier for the driver to understand that the second task can be continued.

Third Embodiment

Figure 36:
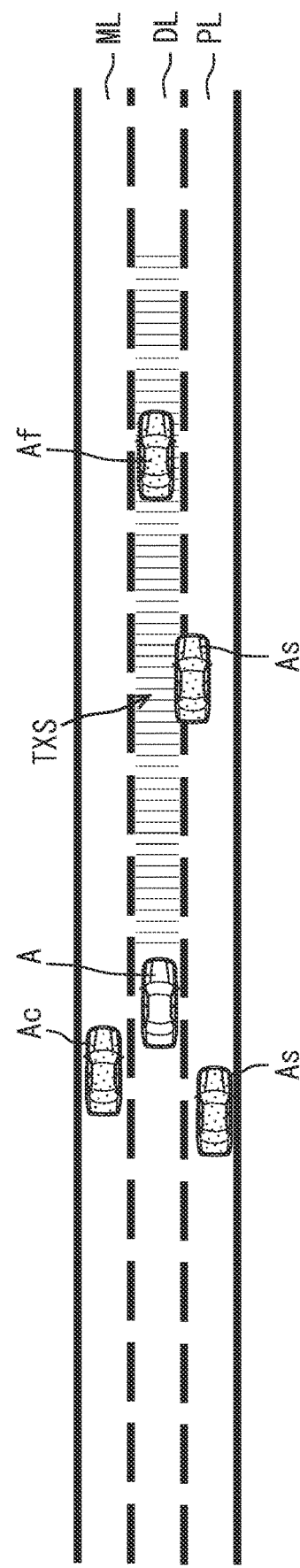
FIG. 36 is a view illustrating an example of an interruption prediction scene of a third embodiment.
Figure 37:
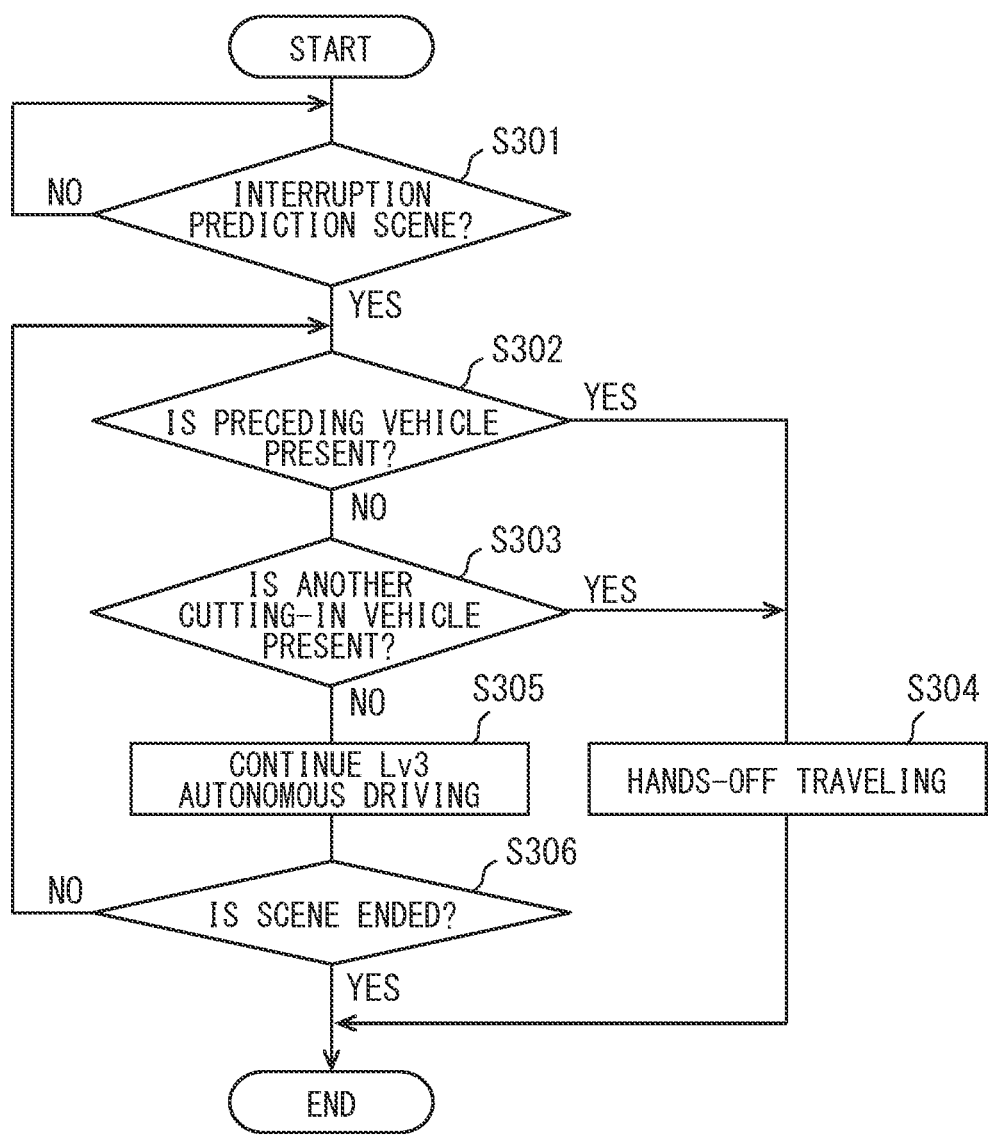
FIG. 37 is a flowchart illustrating a detail of the autonomy level control processing.

The third embodiment illustrated in FIGS. 36 and 37 is another modification of the first embodiment. The autonomous driving ECU 50*b* of the third embodiment switches the autonomous driving level not only when the merging section CfS in the traveling direction is grasped based on the end point of the climbing lane, the lane reduction point, and the like in the map data, but also when another vehicle cuts in from the next lane. Hereinafter, details of a cut in possibility scene that becomes the control target at an autonomous driving level will be described in the third embodiment. The autonomy level control processing (see FIG. 37) described in the third embodiment is continuously performed in the period in which the vehicle travels by the Level 3 autonomous driving.

In the traveling scene illustrated in FIG. 36, the vehicle A autonomously travels in the travel lane DL positioned at the center of the road including three lanes in one direction in a state where the driver has no periphery monitoring responsibility. One adjacent lane of the travel lane DL is the merging lane ML, and a lane positioned on the opposite side of the merging lane ML across the travel lane DL is the passing lane PL. Unlike the first embodiment, the merging lane ML is a lane that does not disappear in the traveling direction, and is a branch lane that branches from the travel lane DL in the traveling direction, for example.

The environment recognition unit 61 performs processing of grasping the situation of another vehicle traveling around the vehicle A in addition to the processing of grasping the merging section CfS in the traveling direction based on the map data. Specifically, the environment recognition unit 61 grasps, as the merging vehicle Ac, another vehicle that cuts in from the merging lane ML to the travel lane DL. The environment recognition unit 61 also grasps, as the merging vehicle Ac, another vehicle assumed to merge into the travel lane DL, in addition to the other vehicle that has started lane change from the merging lane ML to the travel lane DL.

The environment recognition unit 61 grasps a preceding vehicle Af traveling in the traveling direction of the vehicle A and another cutting-in vehicle As traveling in the passing lane PL. The environment recognition unit 61 also grasps, as the other cutting-in vehicle As, another vehicle assumed to cut in to the travel lane DL, in addition to the other vehicle that has started lane change from the passing lane PL to the travel lane DL.

When grasping the presence of the merging section CfS or when detecting the merging vehicle Ac trying to cut in to front of the vehicle A, the environment recognition unit 61 determines that it is an interruption prediction scene (S301). When determining that the current travel environment of the subject vehicle is a cutting-in assumption scene (S301: YES), the environment recognition unit 61 grasps the presence of the preceding vehicle Af and the other cutting-in vehicle As (S302 and S303).

When the environment recognition unit 61 grasps the presence of the preceding vehicle Af (S302: YES), the behavior determination unit 62 sets the interruption section TXS in front of the subject vehicle, and lowers the autonomous driving level from the autonomous driving at Level 3 to the hands-off travel of Level 2 (S304). Similarly, when the environment recognition unit 61 grasps the presence of the other cutting-in vehicle As (S303: YES), the behavior determination unit 62 lowers the autonomous driving level from the autonomous driving at Level 3 to the hands-off travel of Level 2 (S304).

When neither the preceding vehicle Af nor the other cutting-in vehicle As is grasped (S303: NO), the behavior determination unit 62 continues the Level 3 autonomous driving (S305). The behavior determination unit 62 continues to grasp the preceding vehicle Af and the other cutting-in vehicle As until the environment recognition unit 61 determines that the interruption prediction scene has ended. When the environment recognition unit 61 determines that the interruption prediction scene has ended (S306: YES), the behavior determination unit 62 ends the series of autonomy level control processing.

In the third embodiment described so far, when cutting in of the merging vehicle Ac is grasped, the autonomous driving level is determined according to the presence or absence of other vehicles except for the merging vehicle Ac. Hence, even when encountering the merging vehicle Ac during traveling by the autonomous driving operation, it is possible to continue the autonomous driving at an appropriate autonomous driving level. As a result, the opportunity to transfer the driving task from the autonomous driving operation to the driver is reduced, and therefore it becomes possible to enhance the driver convenience related to driving changeover.

In addition, in the third embodiment, the presence or absence of the preceding vehicle Af, the other cutting-in vehicle As, or the like is grasped, and the autonomous driving level of the subject vehicle is determined according to the presence of these presence. According to such control of the autonomy level, it is possible to determine the autonomous driving level appropriately reflecting the presence of the preceding vehicle Af or the other cutting-in vehicle As having an influence on the travel state of the subject vehicle. Therefore, it is possible to achieve reduction of the driving load on the driver while suppressing the risk of other vehicles.

In the third embodiment, when the preceding vehicle Af exists, there is a high possibility that the merging vehicle Ac moves between the subject vehicle and the preceding vehicle Af. In such scene, the merging vehicle Ac having changed the lane to the travel lane DL tends to decelerate in front of the subject vehicle. Hence, according to the control of lowering the autonomous driving level when the preceding vehicle Af exists, even if the merging vehicle Ac that has cut in to front of the subject vehicle decelerates, a smooth response by the driver becomes possible.

Furthermore, in the third embodiment, when the other cutting-in vehicle As does not exist in the passing lane PL, it is possible to respond of changing the lane of the subject vehicle to the passing lane PL in order to avoid the merging vehicle Ac that has cut in to the travel lane DL. Hence, according to the control for continuing the Level 3 autonomous driving in a case where the other cutting-in vehicle As does not exist, it is possible to reduce the driving load on the driver while suppressing the risk of other vehicles.

In addition, in the third embodiment, according to the processing of also grasping, as the merging vehicle Ac, another vehicle that is assumed to merge from the merging lane ML to the travel lane DL, it is possible to grasp early other vehicles that become a risk for the subject vehicle. As a result, it becomes possible to secure a long response time of the driver when the autonomous driving level is transitioned low.

Fourth Embodiment

Figure 38:
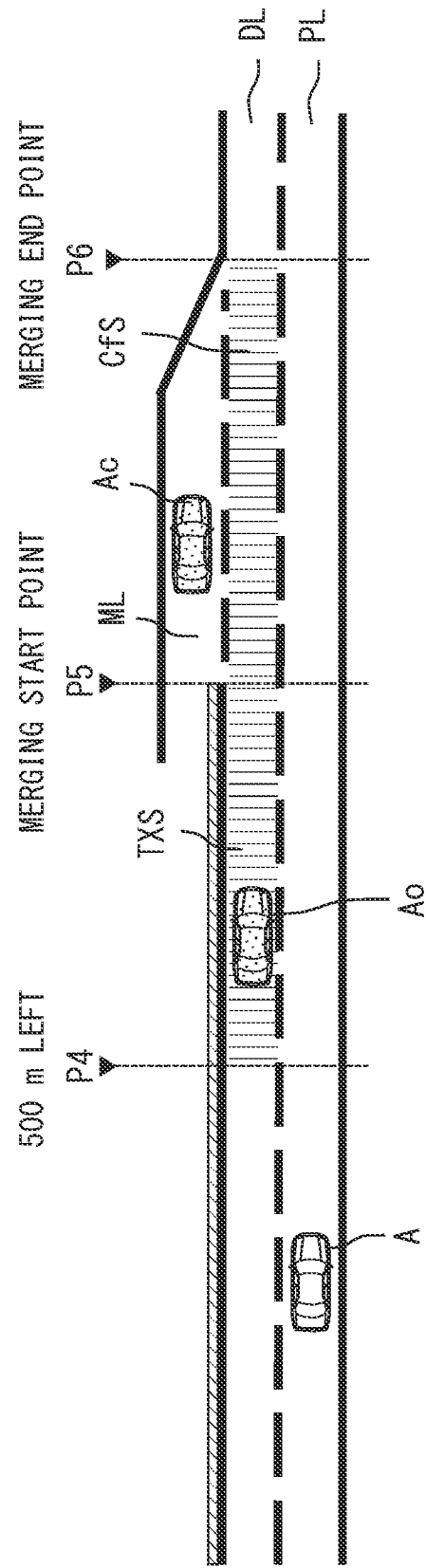
FIG. 38 is a view illustrating an example of an interruption prediction scene of a fourth embodiment.
Figure 39:
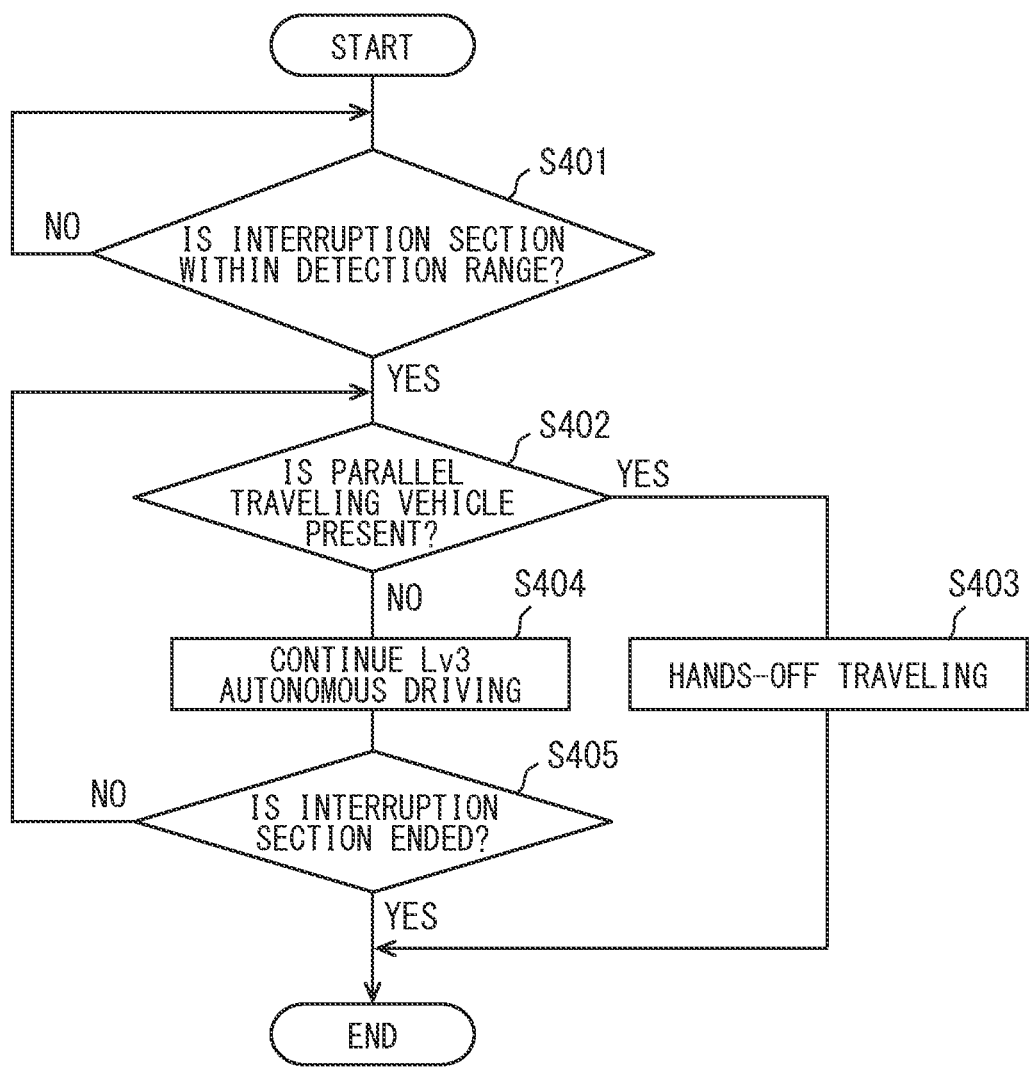
FIG. 39 is a flowchart illustrating a detail of the autonomy level control processing.

The fourth embodiment illustrated in FIGS. 38 and 39 is another modification of the first embodiment. The autonomy level control processing of the fourth embodiment controls the autonomous driving level of the subject vehicle in the traveling scene illustrated in FIG. 38. In this traveling scene, the vehicle A is traveling in the passing lane PL by Level 3 autonomous driving, and does not enter the merging section CfS defined in the travel lane DL in order to continue traveling in the lane.

When the environment recognition unit 61 grasps the merging section CfS existing in the traveling direction, the autonomous driving ECU 50b starts the autonomy level control processing illustrated in FIG. 39. The autonomous driving ECU 50b determines whether the interruption section TXS including the merging section CfS is within the detection range of the periphery monitoring sensor 30 such as the camera unit 31 (S401). When the interruption section TXS enters the detection range of the periphery monitoring sensor 30, the environment recognition unit 61 determines the presence or absence of another vehicle (hereinafter, parallel traveling vehicle Ao) traveling in the interruption section TXS (S402). When the environment recognition unit 61 grasps the presence of the parallel traveling vehicle Ao (S402: YES), the behavior determination unit 62 lowers the autonomous driving level from the Level 3 autonomous driving to the Level 2 hands-off travel (S403). On the other hand, when the presence of the parallel traveling vehicle Ao traveling in the interruption section TXS is not grasped (S402: NO), the behavior determination unit 62 continues the Level 3 autonomous driving (S404).

The environment recognition unit 61 continues grasp of the parallel traveling vehicle Ao until the vehicle A passes through the merging end point P6 of the interruption section TXS (S405). When the environment recognition unit 61 determines that the vehicle has passed through the merging end point P6 and the interruption section TXS has ended (S405: YES), the autonomous driving ECU 50b ends the series of autonomy level control processing.

According to the fourth embodiment described so far, when the subject vehicle travels in the passing lane PL, the presence of the parallel traveling vehicle Ao traveling in the merging section CfS defined in the travel lane DL is grasped, and the autonomous driving level of the subject vehicle is determined according to the presence or absence of the parallel traveling vehicle Ao in the merging section CfS. Hence, even if movement of the parallel traveling vehicle Ao from the merging section CfS to the passing lane PL is caused by movement of the merging vehicle Ac from the merging lane ML to the travel lane DL (merging section CfS), the subject vehicle can continue autonomous driving at a level that can appropriately cope with the parallel traveling vehicle Ao. As a result, the opportunity to transfer the driving task from the autonomous driving operation to the driver is reduced, and therefore it becomes possible to enhance the driver convenience related to driving changeover.

In addition, in the fourth embodiment, when the parallel traveling vehicle Ao exists in the merging section CfS, the autonomous driving level of the subject vehicle transitions to the hands-off travel with periphery monitoring responsibility. Hence, even if the parallel traveling vehicle Ao makes a sudden movement to the passing lane PL, the driver can smoothly respond by the control of lowering the autonomous driving level in advance.

Fifth Embodiment

Figure 40:
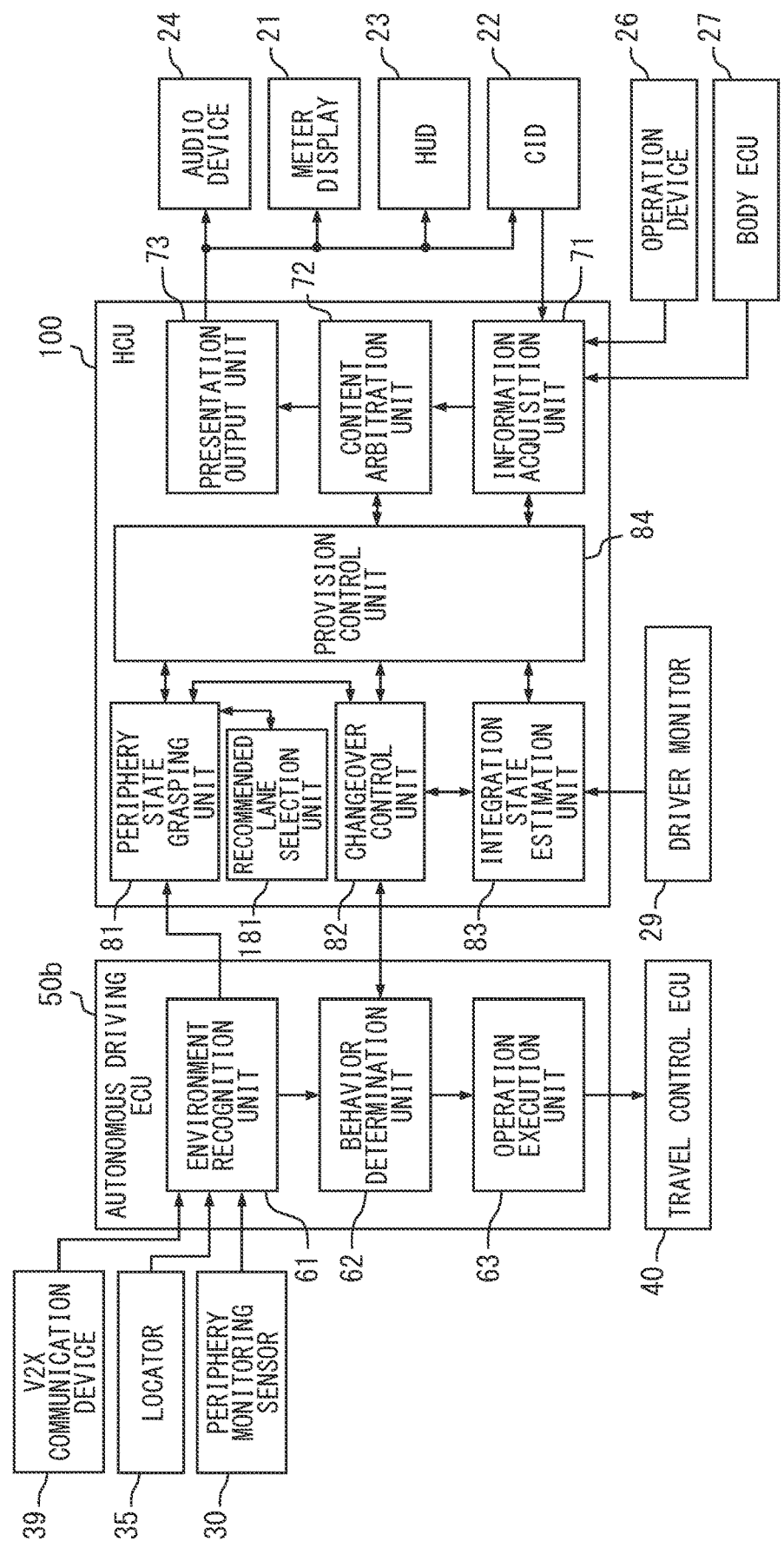
FIG. 40 is a view illustrating an example of a function unit constructed in the HCU in a fifth embodiment together with a related configuration.
Figure 41:
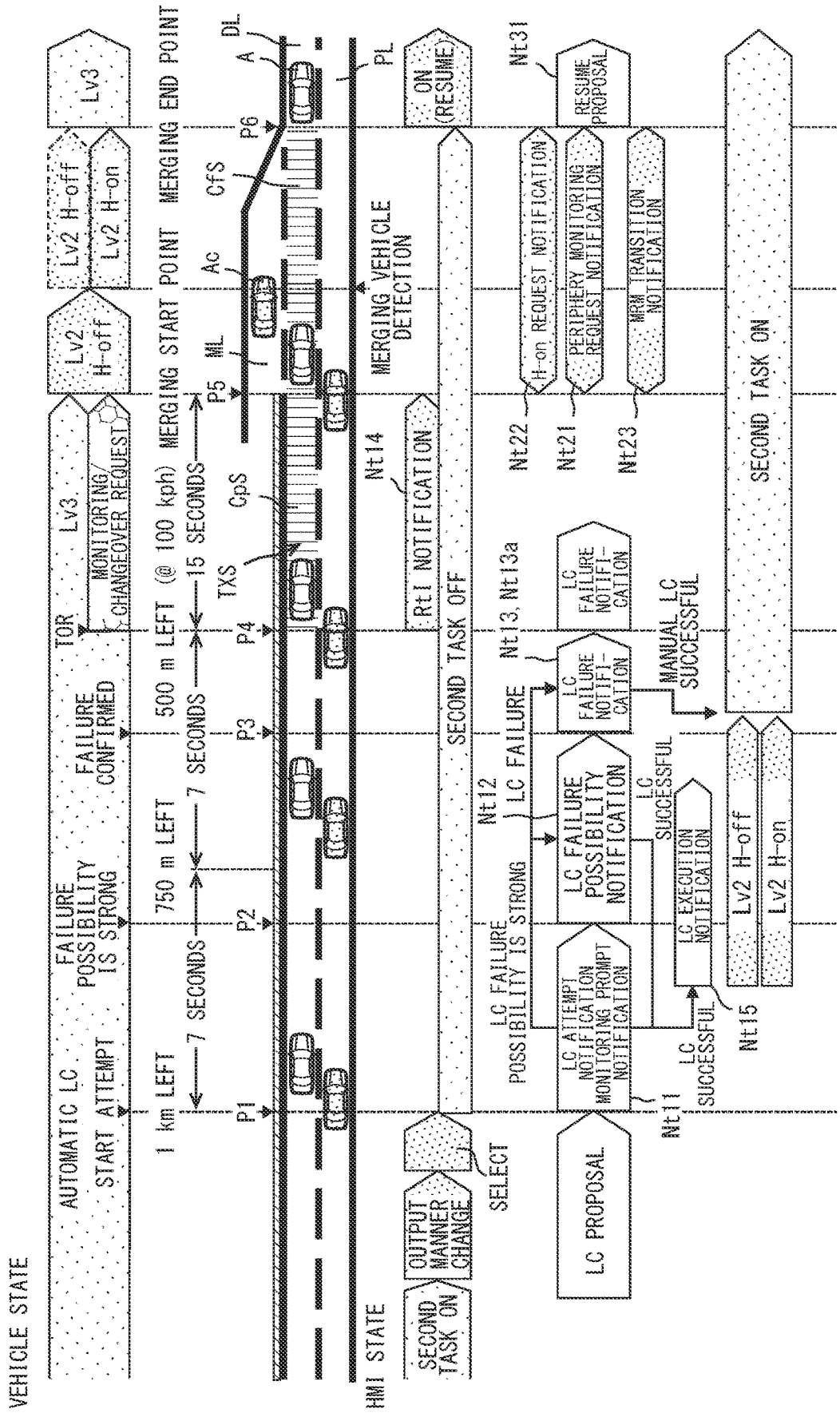
FIG. 41 is a view illustrating each state transition of a vehicle and HMI in a scene where a second task is interrupted.

The fifth embodiment illustrated in FIGS. 40 and 41 is still another modification of the first embodiment. The autonomous driving ECU 50*b* of the fifth embodiment performs autonomous traveling at the autonomous driving level 3 corresponding to the laws and regulations of the country or region where the vehicle A is used.

The autonomous driving ECU 50*b* does not perform lane change in unmonitored autonomous traveling based on the regulation prohibiting the autonomous LC at the autonomous driving level 3. When the autonomous driving ECU 50*b* performs lane change while the eyes-off travel at the autonomous driving level 3 is continued, the behavior determination unit 62 lowers the autonomy level before starting the lane change. Due to this, the vehicle A transitions from the eyes-off travel to the monitored autonomous traveling such as the hands-off travel or the hands-on travel.

The HCU 100 provides information corresponding to the switching of the autonomy level described above. In response to the fact that the autonomous driving ECU 50*b* does not perform the autonomous LC, the provision control unit 84 of the HCU 100 changes the output manner of the moving image content CTV or the like having been provided in association with the second task before arriving at the LC start point P1. After changing the output manner of content, the provision control unit 84 presents an option of selecting a stopping manner of content, and temporarily ends provision of content at the LC start point P1. When the vehicle A continues traveling in the travel lane DL without performing lane change, the provision of content associated to the second task is interrupted until the vehicle A passes through the merging end point P6.

Before arriving at the LC start point P1, the provision control unit 84 proposes, to the driver to, a lane change from the travel lane DL to the passing lane PL in parallel with the processing of changing the output manner of content. When the driver inputs an operation that becomes a trigger for starting a lane change in response to the proposal from the system, the autonomous driving ECU 50*b* starts a lane change by the hands-off travel or the hands-on travel.

When the vehicle A passes through the LC start point P1, the provision control unit 84 performs periphery monitoring prompting notification in parallel with the LC attempt notification. In the periphery monitoring prompting notification, the driver is prompted to monitor the passing lane PL, which is the moving direction in particular, in the periphery of the vehicle A. The periphery monitoring prompting notification is performed by at least one of the meter display 21, the CID 22, and the HUD 23. The periphery monitoring prompting notification is performed by non-superimposing display of the HUD 23, for example. When the lane change at the autonomous driving level 2 or the manual lane change succeeds in the section from the LC start point P1 to the TOR point P4, the autonomous driving ECU 50*b* resumes the unmonitored autonomous traveling at the autonomous driving level 3 in the passing lane PL. The provision control unit 84 resumes the provision of content having been interrupted in line with the resumption of the unmonitored autonomous traveling at the autonomous driving level 3.

In the autonomous driving ECU 50*b* of the fifth embodiment, various settings for restricting the autonomous traveling at the autonomous driving level 3 are made in addition to the setting for prohibiting the autonomous LC. Specifically, similarly to the above embodiments, the autonomous driving ECU 50*b* disables unmonitored autonomous traveling in the interruption section TXS including the merging section CfS. The autonomous driving ECU 50*b* enables unmonitored autonomous traveling in the passing lane PL, but does not permit continuous traveling in the passing lane PL for a predetermined distance (for example, 2 km) or more. However, when the subject vehicle travels in a traffic jam, the autonomous driving ECU 50*b* permits continuation of the unmonitored autonomous traveling in the passing lane PL. The autonomous driving ECU 50*b* does not permit the unmonitored autonomous traveling in the merging section CfS even when the subject vehicle travels in a traffic jam.

In order to cope with the above-described autonomy level control, the HCU 100 includes, together with the provision control unit 84 and the like, a recommended lane selection unit 181 as a function unit based on a presentation control program.

When the autonomous driving ECU 50*b* causes the vehicle A to autonomously travel at the autonomous driving level 3, the recommended lane selection unit 181 selects a recommended lane RL for traveling from among a plurality of lanes included in the road on which the vehicle A is traveling. The recommended lane RL for traveling is a lane in which the unmonitored autonomous traveling by the autonomous driving ECU 50*b* is estimated to be continued for the longest time or for the longest distance among the plurality of lanes. The recommended lane selection unit 181 grasps a restriction rule of the Level 3 autonomous traveling set in the autonomous driving ECU 50*b*. In cooperation with the periphery state grasping unit 81, the recommended lane selection unit 181 grasps the travel environment around the subject vehicle and in the traveling direction. By combining various pieces of grasped information, the recommended lane selection unit 181 selects the recommended lane RL for traveling.

When the autonomous driving ECU 50*b* performs the unmonitored autonomous traveling at the autonomous driving level 3, the provision control unit 84 proposes, to the driver, traveling in the recommended lane RL for traveling selected by the recommended lane selection unit 181. The recommended lane notification for notifying the recommended lane RL for traveling is performed by at least one of the meter display 21, the CID 22, and the HUD 23, and is performed, for example, by non-superimposing display of the HUD 23. Hereinafter, a plurality of traveling scenes in which the recommended lane notification is performed in cooperation with the recommended lane selection unit 181 and the provision control unit 84 will be described with reference to FIG. 40 based on FIGS. 42 to 47.

Figure 42:
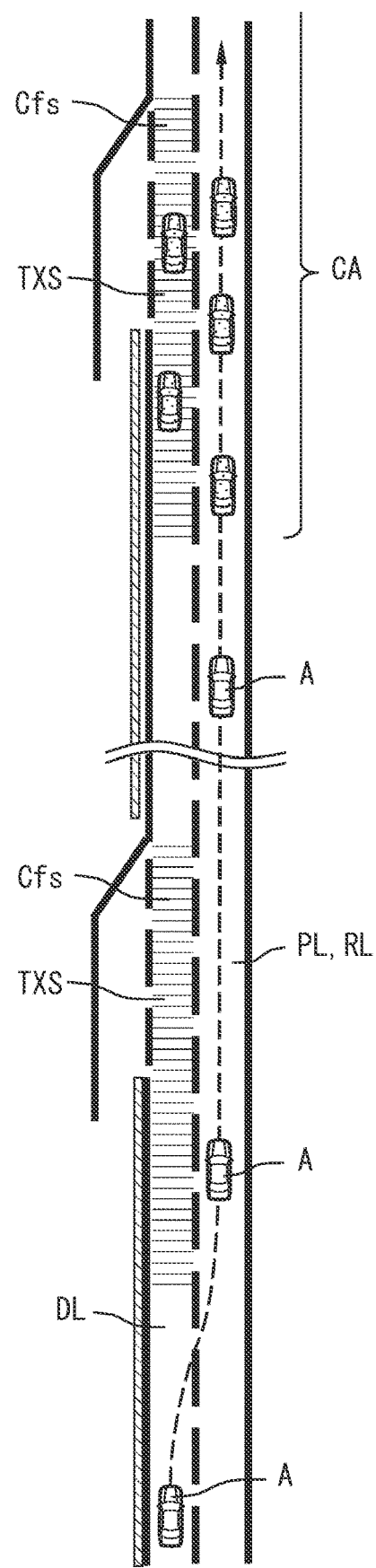
FIG. 42 is a view for explaining a scene in which a recommended lane notification for prompting a lane change to a passing lane is performed based on a prediction of running into a traffic jam.

In the traveling scene illustrated in FIG. 42, running into a traffic jam is predicted during autonomous travel at the autonomous driving level 3. The recommended lane selection unit 181 predicts occurrence of a traffic jam in the traveling direction based on the travel environment grasped in cooperation with the periphery state grasping unit 81. As an example, the recommended lane selection unit 181 acquires traffic jam information in the traveling direction by extra-vehicular communication. As another example, the recommended lane selection unit 181 determines whether the subject vehicle is in a state of being predicted to run into a traffic jam and whether the subject vehicle is in a state of traveling in a traffic jam, based on vehicle speed information, map data, a scheduled travel route, recognition information around the vehicle, and the like. When predicting running into a traffic jam area CA, the recommended lane selection unit 181 sets the passing lane PL as the recommended lane RL for traveling before the subject vehicle arrives at the traffic jam area CA.

The provision control unit 84 proposes, to the driver, traveling in the passing lane PL based on the fact that the passing lane PL is selected as the recommended lane RL for traveling by the recommended lane selection unit 181. When the passing lane PL is selected as the recommended lane RL for traveling during traveling in the travel lane DL, the provision control unit 84 proposes, to the driver, performance of a lane change to the passing lane PL side in the state of the monitored autonomous traveling of the autonomous driving level 2 before the subject vehicle runs into the traffic jam area CA. Such lane change avoids traveling in the interruption section TXS including the merging section CfS existing in the travel lane DL. In the traffic jam area CA, continuous traveling in the passing lane PL at the autonomous driving level 3 is permitted. As a result, the unmonitored autonomous traveling at the autonomous driving level 3 resumed in the passing lane PL can be continued for a long time or a long distance.

On the other hand, when the passing lane PL on which the subject vehicle is traveling is selected as the recommended lane RL for traveling, the provision control unit 84 proposes, to the driver, travel continuation in the passing lane PL before the subject vehicle runs into the traffic jam area CA. Even in this case, since traveling in the merging section CfS outside the limited domain is avoided, the unmonitored autonomous traveling at the autonomous driving level 3 can be continued for a long time or a long distance in the passing lane PL.

Figure 43:
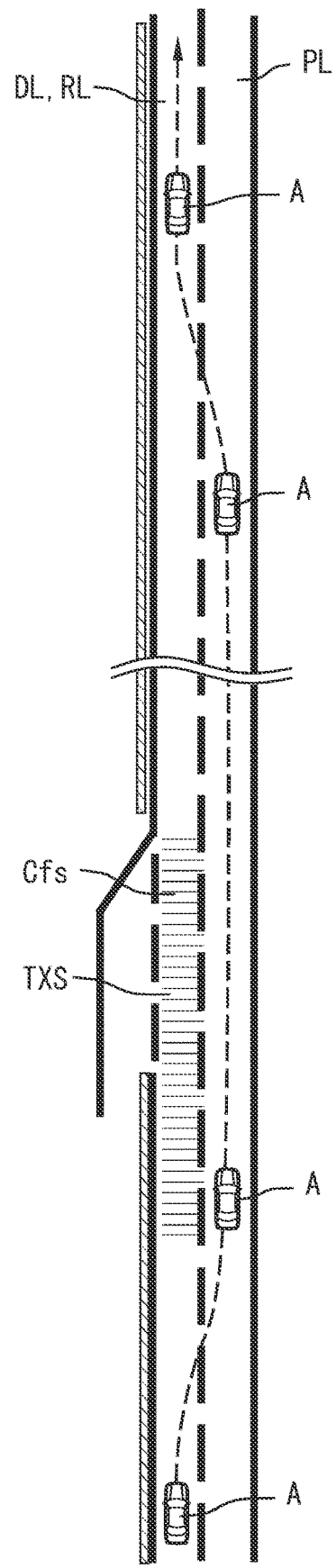
FIG. 43 is a view for explaining a scene in which a recommended lane notification for prompting a lane change to a travel lane is performed based on travel continuation in a passing lane.

In the traveling scene illustrated in FIG. 43, no traffic jam occurs. In order to avoid traveling in the merging section CfS, the autonomous driving ECU 50b performs a lane change at the autonomous driving level 2 from the travel lane DL to the passing lane PL, and then starts autonomous traveling at the autonomous driving level 3 in the passing lane PL. In this case, the recommended lane selection unit 181 sets the travel lane DL as the recommended lane RL for traveling. Hence, when the autonomous traveling at the autonomous driving level 3 is continued for a predetermined distance, the provision control unit 84 prompts a lane change to the travel lane DL. In this case, the lane change from the passing lane PL to the travel lane DL is performed in a state where the driving level is lowered to the autonomous driving level 2. The autonomous driving ECU 50b resumes the unmonitored autonomous traveling of the autonomous driving level 3 in the travel lane DL.

Figure 44:
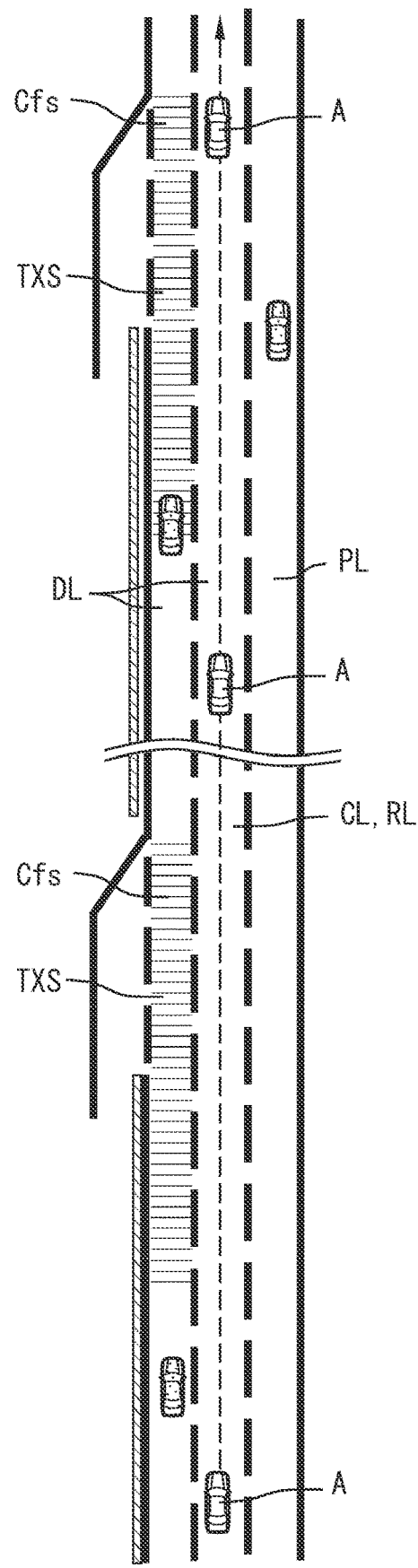
FIG. 44 is a view for explaining a scene in which a recommended lane notification for prompting travel continuation in a center lane is performed on a multi-lane road.
Figure 45:
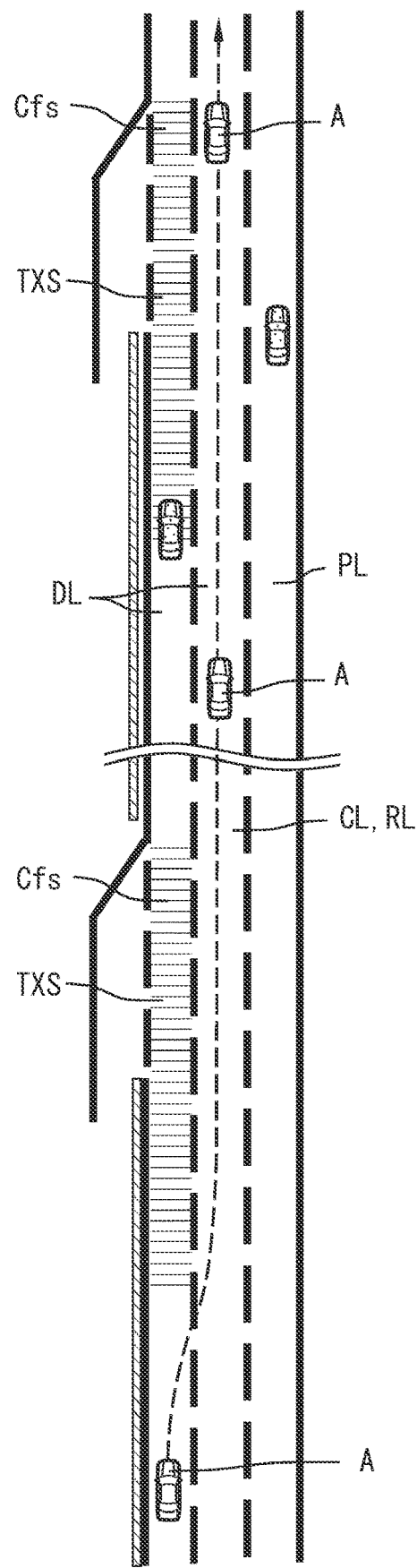
FIG. 45 is a view for explaining a scene in which a recommended lane notification for prompting a lane change to a center lane is performed on a multi-lane road.

In the traveling scenes illustrated in FIGS. 44 and 45, the vehicle A is traveling on a multi-lane road. In a multi-lane road having three or more lanes in one direction, the recommended lane selection unit 181 selects the center lane CL excluding the right and left lanes as the recommended lane RL for traveling. As an example, the recommended lane selection unit 181 grasps the number of lanes of the road on which the vehicle is traveling based on the three-dimensional map data, and determines whether the road is a multi-lane road. When the vehicle A is traveling in the center lane CL in the unmonitored autonomous traveling at the autonomous driving level 3 (see FIG. 44), the provision control unit 84 proposes, to the driver, travel continuation in the center lane CL based on the fact that the center lane CL is set to the recommended lane RL for traveling.

On the other hand, when the vehicle A is traveling in the leftmost travel lane DL in the unmonitored autonomous traveling, the provision control unit 84 performs a recommended lane notification for prompting a lane change to the center lane CL based on the fact that the center lane CL is set as the recommended lane RL for traveling (see FIG. 45). As a result, the unmonitored autonomous traveling is temporarily interrupted due to the lane change, but the traveling in the interruption section TXS including the merging section CfS is avoided, and therefore the unmonitored autonomous traveling can be continued in the center lane CL that is the movement destination. Even when the vehicle A is traveling in the rightmost passing lane PL in the unmonitored autonomous traveling, the provision control unit 84 performs the recommended lane notification for prompting a lane change to the center lane CL. As a result, proposal performance of a lane change that restricts continuous traveling in the passing lane PL is avoided.

Here, the recommended lane selection unit 181 determines whether the vehicle may travel in the center lane CL in accordance with the speed limit defined for the multi-lane road. As an example, in the autonomous driving ECU 50b, an upper limit speed at which the unmonitored autonomous traveling of the autonomous driving level 3 can be executed is set. The recommended lane selection unit 181 grasps the maximum speed set for the multi-lane road on which the vehicle is traveling, for example, based on map data or a result of sign recognition. When the maximum speed is higher than a predetermined threshold speed, the recommended lane selection unit 181 does not set the center lane CL as the recommended lane RL for traveling. As a result, the recommended lane notification for recommending traveling in the center lane CL is also stopped on the multi-lane road whose maximum speed is higher than the predetermined threshold speed. Such threshold speed is set based on the upper limit speed at which the unmonitored autonomous traveling can be executed. For example, the threshold speed is set to the identical speed to the upper limit speed or a speed lower or higher than the upper limit speed.

Figure 46:
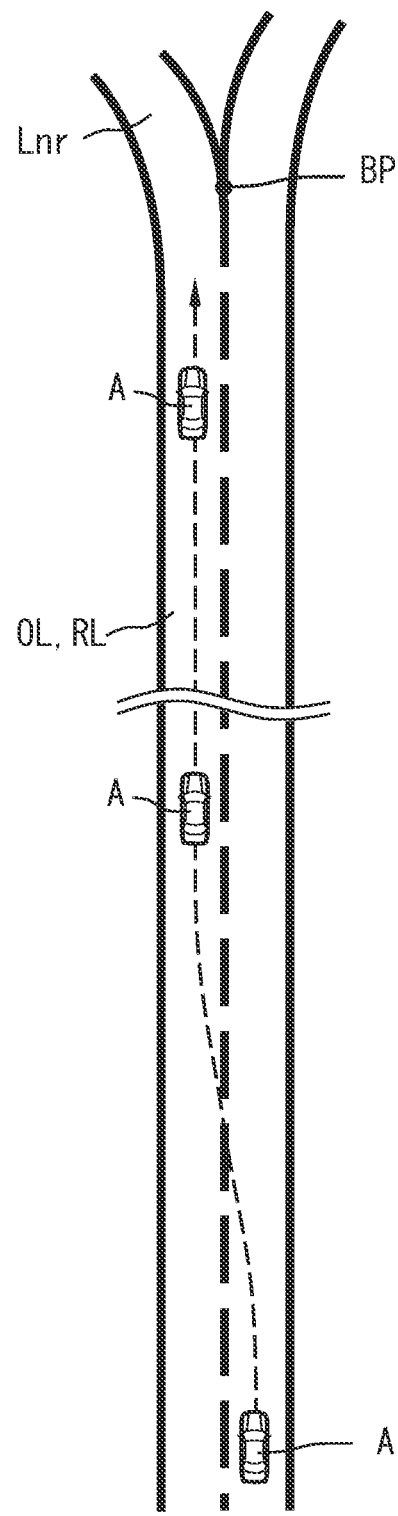
FIG. 46 is a view for explaining a scene in which a recommended lane notification for prompting a lane change to an on-route lane leading to a branch destination is performed.

In the traveling scene illustrated in FIG. 46, there is a branch BP in the traveling direction of the vehicle A. The recommended lane selection unit 181 changes the lane to be selected as the recommended lane RL for traveling according to the distance or time to the branch BP. The recommended lane selection unit 181 determines whether the branch BP exists in the traveling direction of the vehicle A based on the three-dimensional map data. The recommended lane selection unit 181 determines that the branch BP exists in the traveling direction, for example, at a timing when the remaining distance to the branch BP becomes a predetermined distance (for example, about 3 km).

When determining that the branch BP exists, the recommended lane selection unit 181 selects a branch destination Lnr matching the scheduled route of the subject vehicle from among a plurality of branch destinations based on the scheduled travel route set in the navigation device or the like. The recommended lane selection unit 181 sets a lane (hereinafter, on-route lane OL) leading to the branch destination Lnr as the recommended lane RL for traveling. When the subject vehicle is not traveling in the on-route lane OL, the provision control unit 84 performs the recommended lane notification for prompting a lane change to the on-route lane OL. As a result, the unmonitored autonomous traveling is temporarily interrupted due to the lane change, but the vehicle can pass through the branch BP while continuing the unmonitored autonomous traveling.

In the traveling scene illustrated in FIG. 47, the vehicle A is traveling on a road including an autonomous driving vehicle dedicated lane (hereinafter, dedicated lane AL). The dedicated lane AL is a lane in which only traveling by autonomous traveling at the autonomous driving level 3 or higher is permitted. A manually driven vehicle MDC of the autonomous driving level 2 or lower is not permitted to travel in the dedicated lane AL. As an example, the dedicated lane AL is set to the outermost lane among the plurality of lanes. In place of the dedicated lane AL, an autonomous driving vehicle priority lane (hereinafter, priority lane) that prioritizes traveling of the autonomous driving vehicle may be set.

The recommended lane selection unit 181 selects the dedicated lane AL or the priority lane as the recommended lane RL for traveling on the road including the dedicated lane AL or the priority lane. The recommended lane selection unit 181 grasps the presence of the dedicated lane AL and the priority lane based on, for example, map data. When the vehicle A is traveling in the dedicated lane AL or the priority lane in the unmonitored autonomous traveling at the autonomous driving level 3, the provision control unit 84 proposes, to the driver, travel continuation in the dedicated lane AL or the priority lane in which the vehicle A is traveling. On the other hand, when the vehicle A autonomously travels in a lane different from the dedicated lane AL or the like, the provision control unit 84 performs a recommended lane notification for prompting a lane change to the dedicated lane AL or the like. As described above, the unmonitored autonomous traveling at the autonomous driving level 3 can be continued for a long time or a long distance in the dedicated lane AL or the priority lane.

Next, in order to achieve the recommended lane notification described above, details of the recommended lane selection processing (see FIG. 48), the proposal execution processing (see FIG. 49), and the restriction notification processing (see FIG. 50) performed by the HCU 100 will be described with reference to FIGS. 40 to 47.

Figure 48:
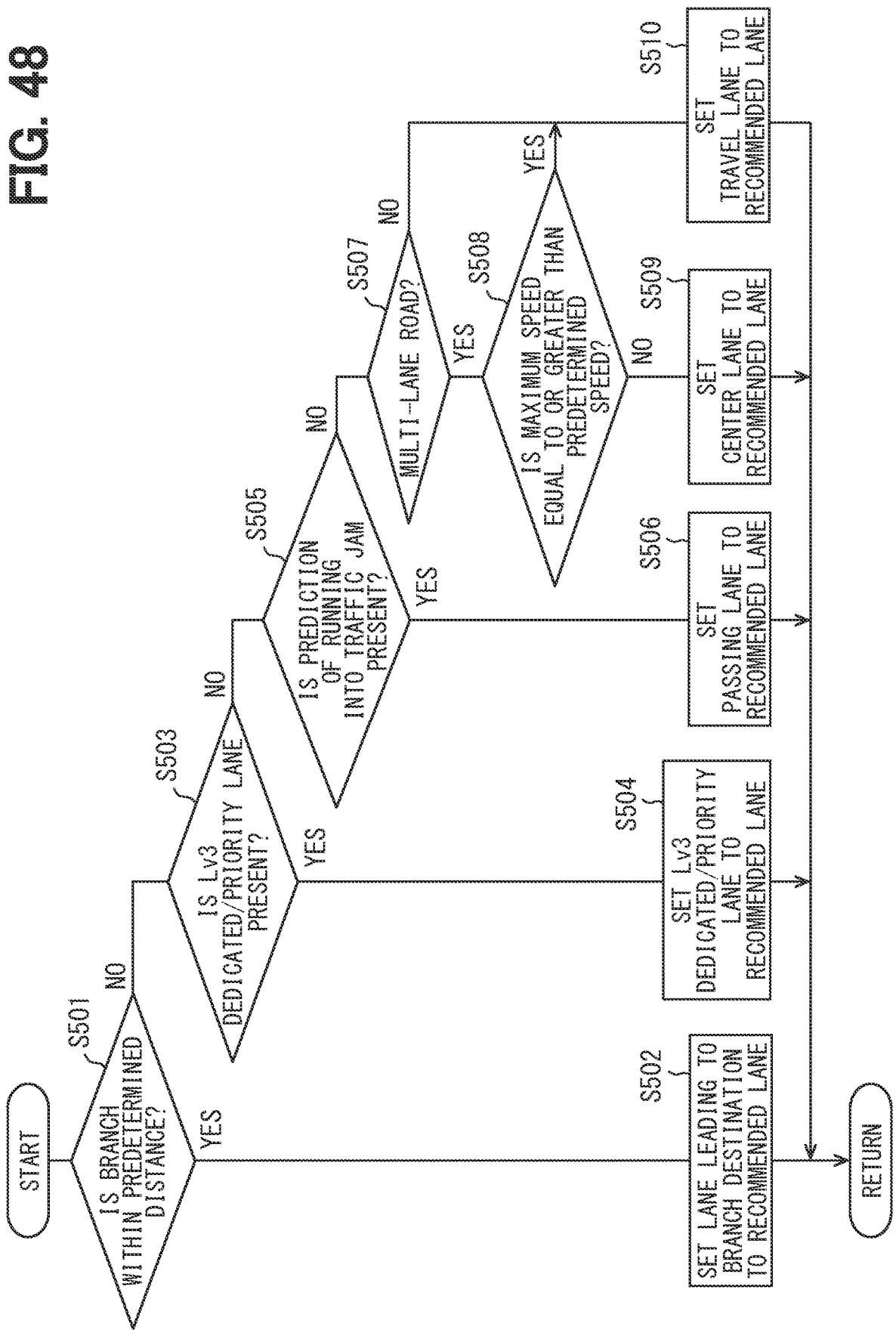
FIG. 48 is a flowchart illustrating a detail of recommended lane selection processing.

The recommended lane selection processing illustrated in FIG. 48 is started based on the activation of the Level 3 autonomous driving in the autonomous driving ECU 50b, and is repeatedly performed by the recommended lane selection unit 181 until the Level 3 autonomous driving is ended.

In S501 of the recommended lane selection processing, whether the branch BP exists within a predetermined distance in the traveling direction of the vehicle A is determined based on the three-dimensional map data (see FIG. 46). When it is determined that the branch BP does not exist within the predetermined distance, the process proceeds to S503. On the other hand, when it is determined in S501 that the branch BP exists within the predetermined distance, the process proceeds to S502. In S502, the branch destination Lnr matching the scheduled route of the subject vehicle is selected in the branch BP. Then, the on-route lane OL leading to the branch destination Lnr is set as the recommended lane RL for traveling.

Figure 47:
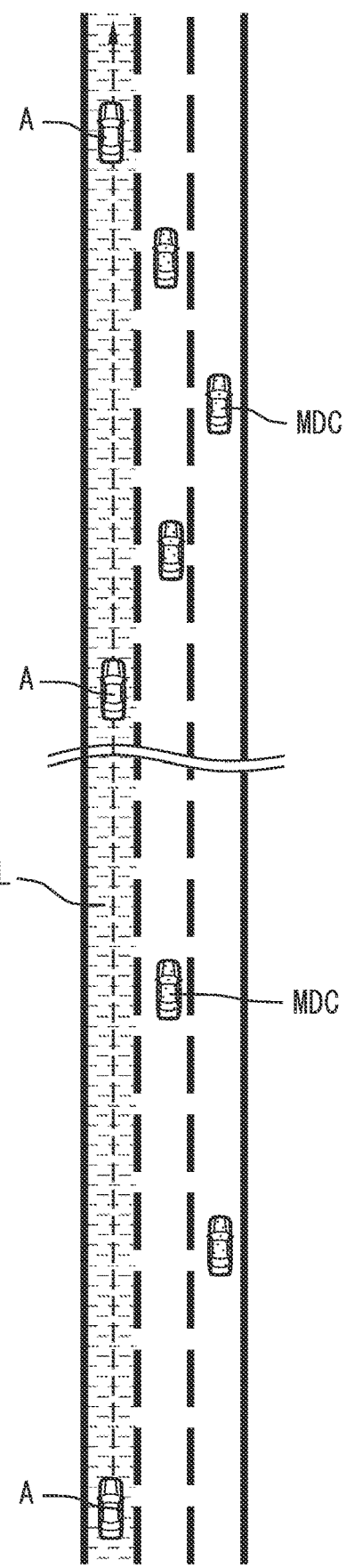
FIG. 47 is a view for explaining a scene in which a recommended lane notification for prompting travel continuation in an autonomous driving vehicle dedicated lane is performed.

In S503, the presence or absence of the dedicated lane AL or the priority lane is determined based on the three-dimensional map data or the two-dimensional map data (see FIG. 47). When it is determined in S503 that there is neither the dedicated lane AL nor the priority lane, the process proceeds to S505. On the other hand, when it is determined in S503 that there is the dedicated lane AL or the priority lane, the process proceeds to S504. In S504, the dedicated lane AL or the priority lane is set as the recommended lane RL for traveling.

In S505, the presence or absence of the prediction of running into a traffic jam is determined based on information grasped in cooperation with the periphery state grasping unit 81 (see FIG. 42). When it is determined in S505 that there is no prediction of running into the traffic jam, the process proceeds to S507. On the other hand, when it is determined in S505 that there is a prediction of running into a traffic jam, the process proceeds to S506. In S506, the passing lane PL is set as the recommended lane RL for traveling.

In S507, it is determined whether the road on which the vehicle is traveling is a multi-lane road based on the three-dimensional map data or the two-dimensional map data. When it is determined in S507 that the road on which the vehicle is traveling is not a multi-lane road, the process proceeds to S510. In S510, the travel lane DL is set as the recommended lane RL for traveling.

On the other hand, when it is determined in S507 that the road on which the vehicle is traveling is a multi-lane road, the process proceeds to S508. In S508, it is determined whether the maximum speed of the road on which the vehicle is traveling is equal to or higher than a predetermined speed. When it is determined in S508 that the maximum speed is equal to or higher than the predetermined speed, the travel lane DL is set as the recommended lane RL for traveling in S510. On the other hand, when it is determined in S508 that the maximum speed is less than the predetermined speed, the process proceeds to S509. In S509, the center lane CL is set as the recommended lane RL for traveling.

Figure 49:
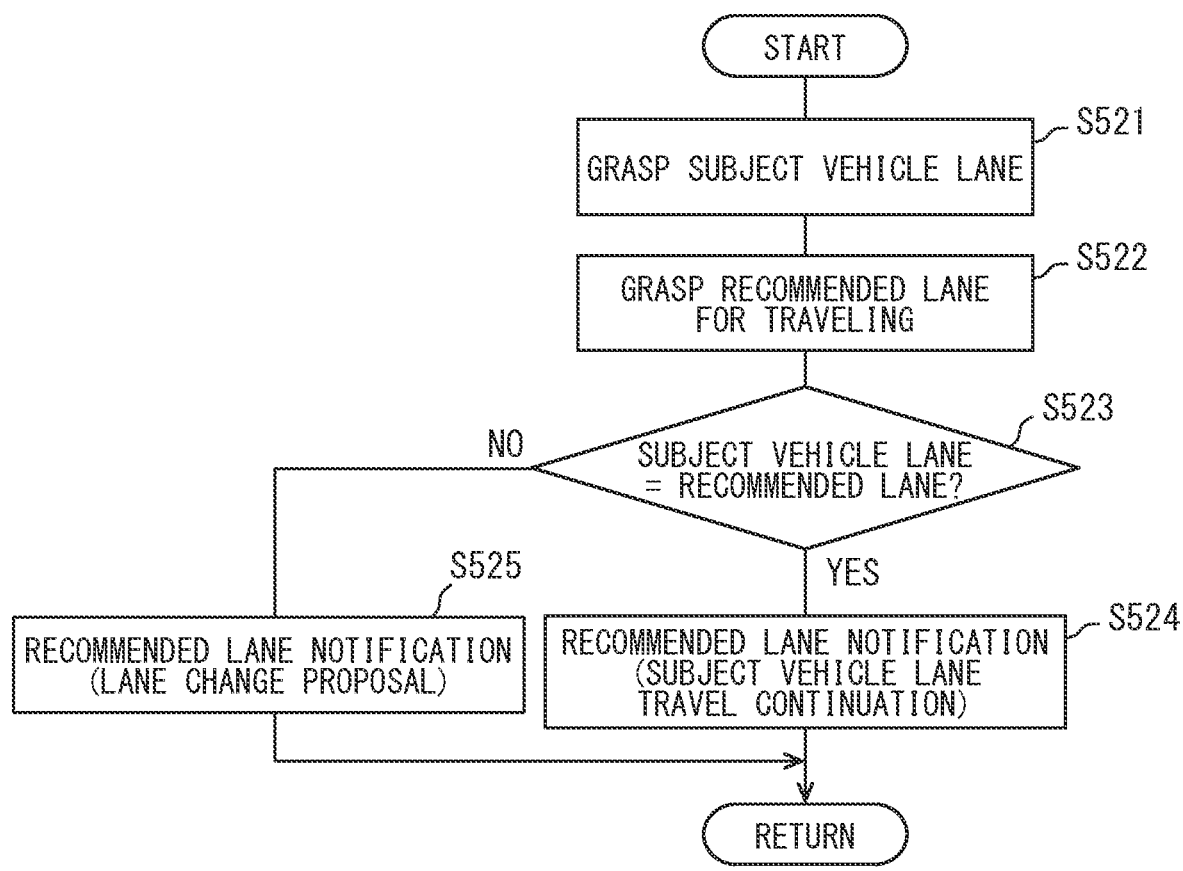
FIG. 49 is a flowchart illustrating a detail of proposal execution processing.

The proposal execution processing illustrated in FIG. 49 is started based on the activation of the Level 3 autonomous driving in the autonomous driving ECU 50b, similarly to the recommended lane selection processing. The proposal execution processing is repeatedly performed by the provision control unit 84 until the Level 3 autonomous driving is ended.

In S521 of the proposal execution processing, the provision control unit 84 acquires the position information of the subject vehicle lane grasped by the periphery state grasping unit 81, and the process proceeds to S522. In S522, the recommended lane RL for traveling selected in the recommended lane selection processing (see FIG. 48) is grasped, and the process proceeds to S523. In S523, the subject vehicle lane and the recommended lane RL for traveling are compared. When it is determined in S523 that the recommended lane RL for traveling matches the subject vehicle lane, the process proceeds to S524. In S524, a recommended lane notification for proposing to continue traveling in the current subject vehicle lane is performed. On the other hand, when it is determined in S523 that the recommended lane RL for traveling is different from the subject vehicle lane, the process proceeds to S525. In S525, the recommended lane notification for prompting a lane change to the recommended lane RL for traveling is performed.

Figure 50:
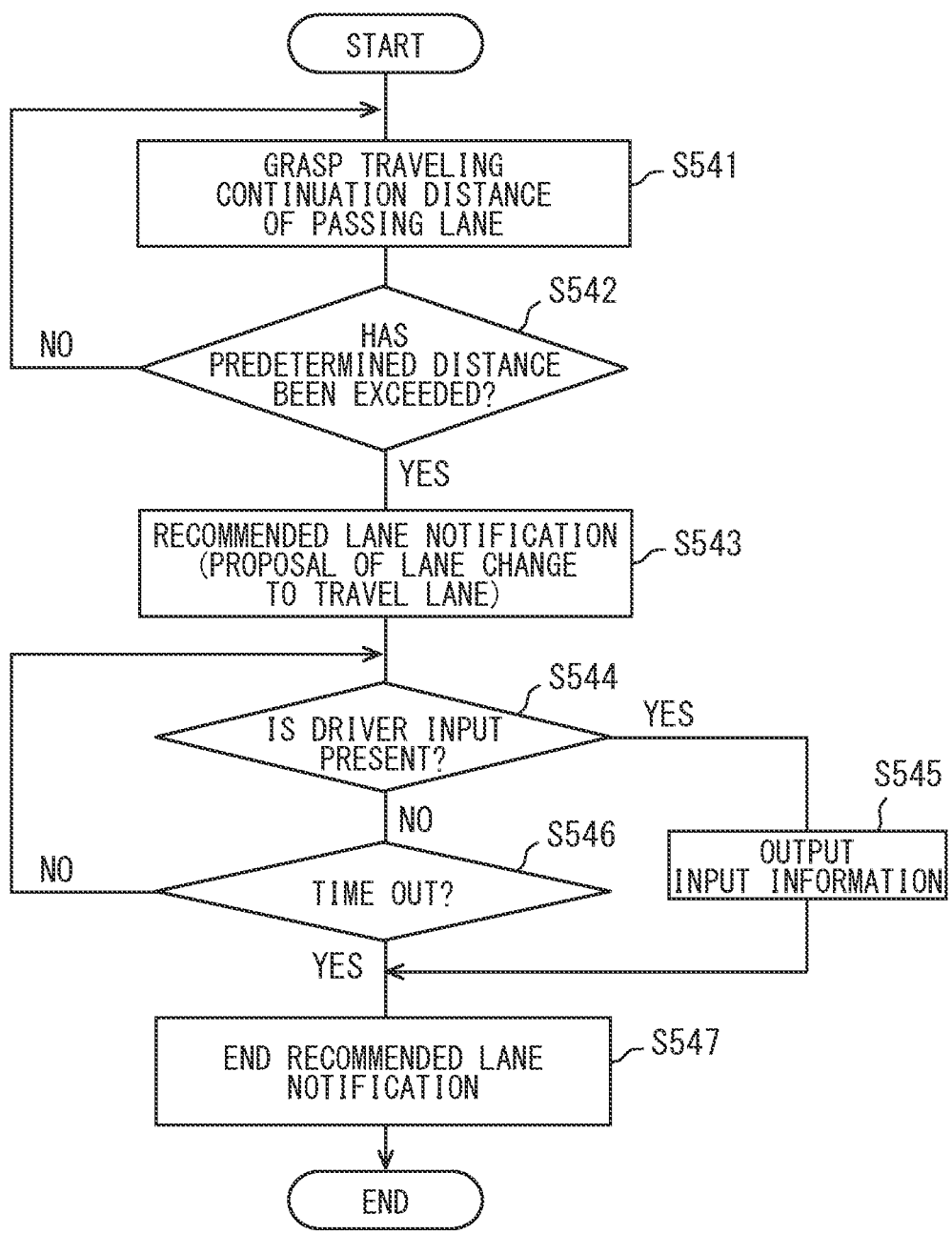
FIG. 50 is a flowchart illustrating a detail of restriction notification processing.

The restriction notification processing illustrated in FIG. 50 is started by the provision control unit 84 based on the start of autonomous traveling at the autonomous driving level 3 in the passing lane PL. In S541 of the recommended lane selection processing, the provision control unit 84 grasps the traveling continuation distance in the passing lane PL, and the process proceeds to S542. In S542, it is determined whether the traveling continuation distance grasped in S541 exceeds a predetermined distance. When it is determined in S542 that the traveling continuation distance does not exceed the predetermined distance, the process returns to S541. On the other hand, when it is determined in S542 that the traveling continuation distance exceeds the predetermined distance, the process proceeds to S543.

In S543, the provision control unit 84 performs a recommended lane notification for proposing a lane change to the travel lane DL, and the process proceeds to S544. In S544, it is determined the presence or absence of input of the driver instructing a lane change to the travel lane DL. When it is determined in S544 that there is input for instructing a lane change, the process proceeds to S545. In S545, input information by the driver is output to the autonomous driving ECU 50*b*, and the process proceeds to S547. Based on a signal output in S545, the autonomous driving ECU 50*b* performs the lane change in the state of the autonomous driving level 2 (see FIG. 43).

On the other hand, when there is no input of the driver instructing a lane change, the input of the driver is waited by repetition of S544 and S546. Then, when timeout occurs due to elapse of a predetermined time from the start of presentation of the recommended lane notification, the provision control unit 84 transitions the process from S546 to S547. In S547, the provision control unit 84 ends the recommended lane notification.

In the fifth embodiment described so far, the driver is proposed to travel in the recommended lane RL for traveling in which unmonitored autonomous traveling at Level 3 without periphery monitoring responsibility is estimated to continue for a long time or a long distance. By following such proposal, the driver can reduce the frequency of driving changeover. Therefore, it becomes possible to enhance the driver convenience related to driving changeover.

In addition, in the autonomous driving ECU 50*b* of the fifth embodiment, the unmonitored autonomous traveling is disabled in the merging section CfS, and the unmonitored autonomous traveling is enabled in the passing lane PL. Assuming such control of the autonomous driving level, when it is predicted that the subject vehicle runs into a traffic jam, the passing lane PL is selected as the recommended lane RL for traveling. When the vehicle A is predicted to run into a traffic jam while traveling in the travel lane DL leading to the merging section CfS, the provision control unit 84 proposes a lane change to the passing lane PL in a state with the periphery monitoring responsibility. According to such recommended lane notification, traveling in the interruption section TXS including the merging section CfS is avoided. Then, the vehicle A moves to the passing lane PL of the traffic jam area CA where continuous traveling in the unmonitored autonomous traveling is permitted. As a result, the unmonitored autonomous traveling at the autonomous driving level 3 resumed in the passing lane PL can be continued for a long time or a long distance.

In the fifth embodiment, in a multi-lane road having three or more lanes, the center lane CL is selected as the recommended lane RL for traveling. Then, the provision control unit 84 proposes traveling in the center lane CL to the driver. According to the above, the unmonitored autonomous traveling is temporarily interrupted due to the lane change, but the traveling in the merging section CfS can be avoided. As a result, the autonomous driving ECU 50*b* can continue the unmonitored autonomous traveling in the center lane CL.

Furthermore, in the fifth embodiment, when the maximum speed set for the multi-lane road is higher than a predetermined threshold speed, the recommendation of traveling in the center lane CL is stopped. A situation in which the vehicle A autonomously traveling in the center lane CL interferes travel of another vehicle due to the low upper limit speed of the autonomous traveling at the autonomous driving level 3 is less likely to occur.

In addition, in the fifth embodiment, when the branch BP exists in the traveling direction of the vehicle A, the lane selected as the recommended lane RL for traveling is changed according to the distance or time to the branch BP based on the scheduled traveling route set in the vehicle A. As a result, the on-route lane OL leading to the branch destination Lnr matching the scheduled route is set as the recommended lane RL for traveling, and the provision control unit 84 can start, based on approach to the branch BP, the recommended lane notification for prompting a lane change to the on-route lane OL. According to the above, smooth movement to the on-route lane OL becomes possible. Then, the vehicle A can pass through the branch BP while continuing the unmonitored autonomous traveling.

In the fifth embodiment, when the dedicated lane AL or the priority lane for autonomous driving vehicles, the dedicated lane AL or the priority lane is selected as the recommended lane RL for traveling. Then, the provision control unit 84 proposes traveling in the dedicated lane AL or the priority lane to the driver. According to such recommended lane notification, the vehicle A moves to a lane optimized for unmonitored autonomous traveling at the autonomous driving level 3. As a result, the unmonitored autonomous traveling can be continued for a long time or a long distance. In the fifth embodiment, the provision control unit 84 corresponds to a "lane proposal unit".

Sixth Embodiment

Figure 51:
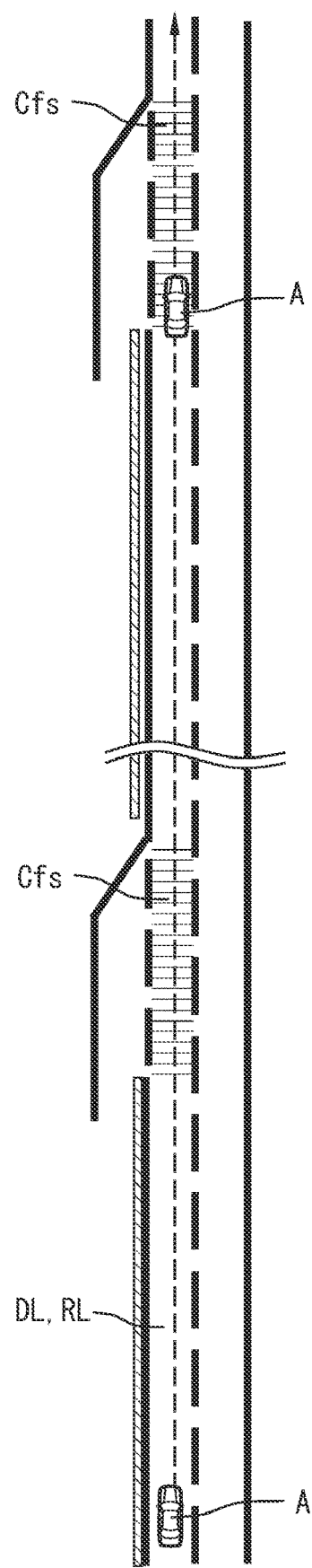
FIG. 51 is a view for explaining a scene in which a recommended lane notification for prompting travel continuation in a travel lane is performed in a sixth embodiment.

The sixth embodiment illustrated in FIGS. 40 and 51 is a modification of the fifth embodiment. Similarly to the fifth embodiment, the autonomous driving ECU 50*b* of the sixth embodiment performs autonomous traveling at the autonomous driving level 3 corresponding to the laws and regulations of the country or region. In the autonomous driving ECU 50*b*, an area-limited level 3 at which Level 3 autonomous traveling is permitted in the autonomous driving possible area (operational design domain) and a traffic jam level 3 at which Level 3 autonomous traveling is permitted when traveling in a traffic jam are set.

In the autonomous driving ECU 50*b*, the environment recognition unit 61 grasps whether the subject vehicle is traveling in a preset autonomous driving possible area based on locator information, map data, map data, and the like. In addition, the environment recognition unit 61 recognizes the travel environment around the subject vehicle based on the vehicle speed information, the detection information of the periphery monitoring sensor 30, and the like, and grasps whether the subject vehicle is traveling in a traffic jam.

When the environment recognition unit 61 determines that the subject vehicle is traveling in an autonomous driving possible area, the behavior determination unit 62 enables performance of the unmonitored autonomous traveling at the autonomous driving level 3. In addition, when the environment recognition unit 61 determines that the subject vehicle is traveling in a traffic jam, the behavior determination unit 62 enables performance of the unmonitored autonomous traveling at the autonomous driving level 3.

Unlike the fifth embodiment, the behavior determination unit 62 permits unmonitored autonomous traveling in the merging section CfS in the autonomous driving possible area. On the other hand, with the passing lane PL being outside the limited domain, the behavior determination unit 62 disables the unmonitored autonomous traveling in the passing lane PL even in the autonomous driving possible area. On the other hand, when the subject vehicle is traveling in a traffic jam, the behavior determination unit 62 permits unmonitored autonomous traveling in the passing lane PL.

According to the switching control of the autonomous driving level of the sixth embodiment described above, even when the merging section CfS exists in the travel lane DL as in the traveling scene illustrated in FIG. 51, the autonomous driving ECU 50*b* continues traveling in the travel lane DL selected as the recommended lane RL for traveling. By such control, proposal of a lane change for avoiding the merging section CfS is omitted. As a result, since the frequency of driving changeover can be reduced, it becomes possible to enhance the driver convenience related to driving changeover.

In addition, in the sixth embodiment, when the vehicle A travels in an autonomous driving possible area, the unmonitored autonomous traveling in the passing lane PL is disabled. However, when the vehicle A travels in a traffic jam, the unmonitored autonomous traveling in the passing lane PL is permitted. Therefore, if in a traffic jam, in addition to the travel lane DL including the merging section CfS, also in the passing lane PL, autonomous traveling in a state without periphery monitoring responsibility can be continued. Therefore, reduction in frequency of driving changeover makes it possible to improve the driver convenience related to driving changeover.

Seventh Embodiment

Figure 52:
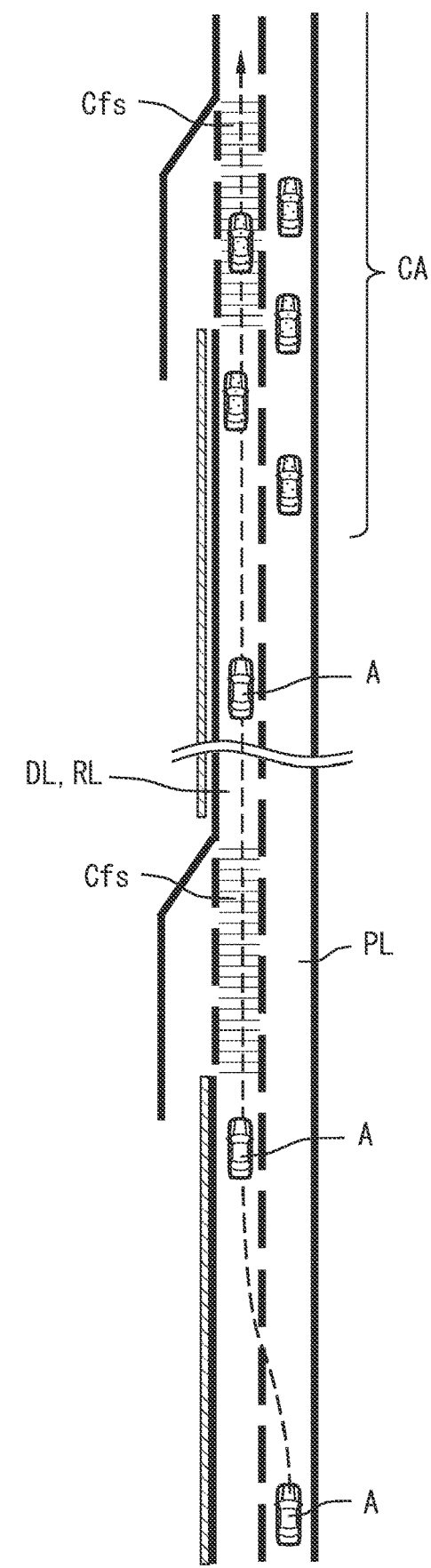
FIG. 52 is a view for explaining a scene in which a recommended lane notification for prompting a lane change to a travel lane is performed in a seventh embodiment.

The seventh embodiment illustrated in FIGS. 40 and 52 is a modification of the sixth embodiment. In the HCU 100 of the seventh embodiment, a recommended lane notification based on selection of the recommended lane RL for traveling is performed even in a period in which the vehicle A performs the monitored autonomous traveling. In addition, the behavior determination unit 62 of the autonomous driving ECU 50b does not permit the unmonitored autonomous traveling in the passing lane PL even in a traffic jam. On the other hand, similarly to the sixth embodiment, the behavior determination unit 62 permits unmonitored autonomous traveling in the merging section CfS in the autonomous driving possible area regardless of whether to be in a traffic jam.

In response to setting control of such autonomous driving level, the recommended lane selection unit 181 selects the travel lane DL leading to the merging section CfS as the recommended lane RL for traveling when the subject vehicle is predicted to run into the traffic jam area CA. Due to this, as in the traveling scene illustrated in FIG. 52, when it is predicted that the vehicle A (subject vehicle) runs into the traffic jam area CA while traveling in the passing lane PL in a state with the periphery monitoring responsibility, the provision control unit 84 proposes a lane change to the travel lane DL in a state with the periphery monitoring responsibility. If the driver instructs the lane change to the travel lane DL based on such recommended lane notification, the unmonitored autonomous traveling at the autonomous driving level 3 resumed at the travel lane DL can be continued for a long time or a long distance. Therefore, the seventh embodiment can also achieve the same effects as those of the above embodiments. In the seventh embodiment, the environment recognition unit 61 corresponds to the "travel environment determination unit".

Other Embodiments

Although one embodiment of the present disclosure has been described above, the present disclosure is not to be construed as being limited to the above embodiment, and can be applied to various embodiments and combinations without departing from the gist of the present disclosure.

In the above embodiment, a process of changing a content provision method and a process of presenting an option for selecting a content interruption method are both performed. On the other hand, in a first modification of the above embodiment, while the process of changing the content provision method is performed, the process of presenting the option for selecting the content interruption method is omitted. In a second modification of the above embodiment, while the process of presenting the option for selecting the content interruption method is performed, the process of changing the content provision method is omitted.

In the stopping manner selection notification Nt13a in a third modification of the above embodiment, substantially the same options are presented regardless of the type of the second task performed by the driver. In a fourth modification of the above embodiment, the state notification of the autonomous LC by the LC status StLC, the periphery status VIst, and the like is omitted.

In the above embodiment, the output manner of content changes in line with the LC failure possibility notification Nt12. The stopping manner selection notification Nt13a is performed in line with the LC failure notification Nt13. However, in a modification 5 of the above embodiment, the LC failure possibility notification Nt12 and the LC failure notification Nt13 are not synchronized with the process of changing the content provision method and the process of presenting the options. For example, the stopping manner selection notification Nt13a may be performed in line with the LC failure possibility notification Nt12.

In a sixth modification of the above embodiment, not only the strength of the RtI notification Nt14 but also the request timing (see TOR point P4 in FIG. 4) is changed in accordance with the state of the driver and the state of other vehicles around the subject vehicle. In a seventh modification of the above embodiment, the request timing of the RtI notification Nt14 is changed in accordance with the state of the driver and the state of another vehicle around the subject vehicle. In the seventh modification, the notification intensity of the RtI notification Nt14 is constant.

In an eighth modification of the above embodiment, the timing control of the resuming point (permission timing) at which resumption of the second task is permitted is omitted. In a ninth modification of the above embodiment, even when the vehicle A is traveling in a traffic jam section, timing control for adjusting the resuming point is performed.

In the above embodiment, the LC failure notification Nt13 and the stopping manner selection notification Nt13a correspond to the monitoring advance notification, and an advance notification on the change in the presence or absence of the scheduled periphery monitoring responsibility is given. On the other hand, in a tenth modification of the above embodiment, the end advance notification of the second task is omitted, and at least one of the LC attempt notification Nt11 and the LC failure possibility notification Nt12 functions as a monitoring advance notification for giving an advance notification of a change in the presence or absence of the scheduled periphery monitoring responsibility. In an eleventh modification of the embodiment, the LC attempt notification Nt11 corresponds to the end advance notification of the second task. As in the tenth and eleventh modifications, at least one of the LC attempt notification Nt11, the LC failure possibility notification Nt12, the LC failure notification Nt13, and the stopping manner selection notification Nt13a is only required to have a function as a monitoring advance notification. In addition, at least one of the notifications performed before the monitoring advance notification is only required to have a function as an end advance notification. At least one of the LC attempt notification Nt11, the LC failure possibility notification Nt12, the LC failure notification Nt13, and the stopping manner selection notification Nt13a may have functions of both the monitoring advance notification and the end advance notification.

In a twelfth modification of the above embodiment, in a case where a change from a state with a periphery monitoring responsibility to a state without a periphery monitoring responsibility is scheduled, a monitoring advance notification that gives an advance notification of such change is performed. In addition, the periphery monitoring notification of the twelfth modification notifies the driver of the change from the state with the periphery monitoring responsibility to the state without the periphery monitoring responsibility.

In the above embodiment, continuation of the second task is allowed in the execution period of the autonomous LC for avoiding the merging section CfS. This is because the risk around the subject vehicle is sufficiently grasped in the determination of whether to execute the autonomous LC. On the other hand, the reason for interrupting the second task in response to cutting in of another vehicle is that it is difficult to predict the behavior of another vehicle and it is impossible to sufficiently grasp the risk.

In a thirteenth modification of the fifth embodiment, in addition to the passing lane PL, continuous traveling in the climbing lane is restricted. In the thirteenth modification, as the restriction notification processing, the provision control unit 84 grasps the traveling continuation distance of the climbing lane, and performs the recommended lane notification for proposing the lane change to the travel lane DL when it is determined that the grasped traveling continuation distance exceeds a predetermined distance.

In a fourteenth modification of the fifth embodiment, the unmonitored autonomous traveling at 60 km/h or more is prohibited. When the maximum speed in the travel lane DL is, for example, 60 km/h or more, the recommended lane selection unit 181 selects the climbing lane as the recommended lane RL for traveling. The provision control unit 84 performs the recommended lane notification for prompting a lane change to the climbing lane that is the recommended lane RL for traveling.

The autonomous driving system 50 of the above embodiment is provided with the two in-vehicle ECUs of the driving assistance ECU 50a and the autonomous driving ECU 50b. However, one in-vehicle ECU having the respective functions of the driving assistance ECU 50a and the autonomous driving ECU 50b may constitute the autonomous driving system 50.

The display device that displays content related to the second task is not limited to the CID 22. For example, the meter display 21 and the HUD 23 may be used to provide content. The display device that displays content may be selectable by the driver. Furthermore, the shape, emission color, display position, and the like of each image displayed on each display device may be appropriately changed. In addition, the type of language of the messages displayed on each display device may be appropriately changed based on the user setting of the driver or the like, and the setting of the country, the area, and the like in which the vehicle A is used. Similarly, the type of language of the voice message reproduced by the audio device 24 may also be changed as appropriate.

The second task permitted to the driver may be appropriately changed according to regulations such as a road traffic law of the country and the area where the vehicle A is used. Furthermore, the avoidance behavior for avoiding interruption of the second task is not limited to the autonomous LC, and may be appropriately changed according to the traveling scene.

In the thirteenth modification of the above embodiment, the HCU 100 is integrally configured with any one of the meter display 21, the CID 22, and the HUD 23. That is, in the thirteenth modification, the processing function of the HCU 100 is implemented in the control circuit of any one of the display devices. As a result, in the thirteenth modification, the display device becomes the "presentation control device".

In the above embodiment, each function provided by the HCU 100 can also be provided by software and hardware for executing the software, only software, only hardware, or a multiple combination of them. Furthermore, in a case where such function is provided by an electronic circuit as hardware, each function can also be provided by a digital circuit including a large number of logic circuits or an analog circuit.

The form of the storage medium that stores a program and the like capable of implementing the presentation control method and the driving control method may be appropriately changed. For example, the storage medium is not limited to the configuration provided on the circuit board, and may be provided in the form of a memory card or the like, inserted into a slot portion, and electrically connected to the control circuit of the HCU. Furthermore, the storage medium may be an optical disk, a hard disk drive, or the like serving as a copy base of a program to the HCU.

The control unit and the method thereof described in the present disclosure may be implemented by a dedicated computer constituting a processor programmed to execute one or a plurality of functions embodied by a computer program. Alternatively, the device and the method thereof described in the present disclosure may be implemented by a dedicated hardware logic circuit. Alternatively, the device and the method thereof described in the present disclosure may be implemented by one or more dedicated computers configured by a combination of a processor that executes a computer program and one or more hardware logic circuits. The computer program may be stored in a computer-readable non-transitional tangible recording medium as an instruction executed by the computer.

The technical features described above and disclosed by the embodiments and the modifications will be collectively described below.

In each of the above embodiments, the environment recognition unit 61 corresponds to the "other vehicle situation grasping unit", the "travel environment grasping unit", and the "travel environment determination unit", the behavior determination unit 62 corresponds to the "autonomy level determination unit" and the "behavior determination unit", and the autonomous driving ECU 50b corresponds to the "driving control device". The merging vehicle Ac corresponds to the "other vehicle", the "cutting-in vehicle", and the "merging vehicle", and the parallel traveling vehicle Ao corresponds to the "other vehicle (traveling in a merging assumption section)". The merging section CfS corresponds to the "merging assumption section", the travel lane DL corresponds to the "subject vehicle lane" and the "merged lane", the passing lane PL corresponds to the "different travel lane" and the "opposite adjacent lane", and the merging lane ML corresponds to the "adjacent lane" and the "merging lane".

[Technical Feature 1-1]

A driving control device that is to be used in a vehicle (A) and implements an autonomous driving operation configured to replace at least a part of a driving task of a driver, the driving control device including:

an other vehicle situation grasping unit (61) configured to grasp presence or absence of an other vehicle (Ac) traveling in an adjacent lane (ML) in a merging assumption section (CfS) in which the other vehicle is assumed to merge from the adjacent lane to a subject vehicle lane (DL); and an autonomy level determination unit (62) configured to determine, according to presence or absence of the other vehicle traveling in the adjacent lane, an autonomous driving level defining a range of the driving task replaced by the autonomous driving operation in the merging assumption section.

[Technical Feature 1-2]

The driving control device according to [Technical Feature 1-1], in which when determining that the other vehicle that is merging does not exist during performance of eyes-off travel in which the driver is not responsible for periphery monitoring, which is one of the driving tasks, the autonomy level determination unit determines continuation (S277: NO) of the eyes-off travel or transition (S74: NO, S75) to hands-off travel in which the driver is not responsible for steering operation, which is another one of the driving tasks.

[Technical Feature 1-3]

The driving control device according to [Technical Feature 1-1], in which the other vehicle situation grasping unit further grasps a control situation of autonomous driving of the other vehicle when the other vehicle exists in the adjacent lane, and the autonomy level determination unit determines the autonomous driving level according to a control situation of autonomous driving in the other vehicle.

[Technical Feature 1-4]

A driving control device that is to be used in a vehicle (A) and implements an autonomous driving operation configured to replace at least a part of a driving task of a driver, the driving control device including:

an other vehicle situation grasping unit (61) configured to grasp a control situation of autonomous driving of an other vehicle (Ac) traveling in an adjacent lane (ML) in a merging assumption section (CfS) in which the other vehicle is assumed to merge from the adjacent lane to a subject vehicle lane (DL); and an autonomy level determination unit (62) configured to determine, according to a control situation of autonomous driving of the other vehicle, an autonomous driving level defining a range of the driving task replaced by the autonomous driving operation in the merging assumption section.

[Technical Feature 1-5]

The driving control device according to [Technical Feature 1-3] or [Technical Feature 1-4], in which when determining that the other vehicle that is merging is a subject vehicle driving vehicle during performance of eyes-off travel in which the driver is not responsible for periphery monitoring, which is one of the driving tasks, the autonomy level determination unit determines continuation of the eyes-off travel or transition to hands-off travel in which the driver is not responsible for steering operation, which is another one of the driving tasks.

[Technical Feature 1-6]

The driving control device according to [Technical Feature 1-2] or [Technical Feature 1-5], in which the other vehicle situation grasping unit further grasps a section length of the merging assumption section, and the autonomy level determination unit determines whether to continue the eyes-off travel or whether to transition to the hands-off travel according to a section length of the merging assumption section.

[Technical Feature 1-7]

The driving control device according to [Technical Feature 1-6], in which the autonomy level determination unit continues the eyes-off travel when a section length of the merging assumption section exceeds a continuation threshold, and transitions to the hands-off travel when a section length of the merging assumption section is less than the continuation threshold.

[Technical Feature 1-8]

The driving control device according to any one of [Technical Feature 1-1] to [Technical Feature 1-7], in which the other vehicle situation grasping unit is configured to grasp presence or absence of the other vehicle traveling in the adjacent lane also in a merging preparation section (CpS) positioned before the merging assumption section, and when determining that the other vehicle does not exist in the merging preparation section under a situation where it is possible to grasp presence of the other vehicle traveling in the adjacent lane in the merging preparation section, the autonomy level determination unit determines not to perform avoidance travel control of avoiding entry into the merging assumption section.

[Technical Feature 1-9]

The driving control device according to any one of [Technical Feature 1-1] to [Technical Feature 1-1], in which the other vehicle situation grasping unit is configured to grasp presence or absence of the other vehicle traveling in the adjacent lane also in a merging preparation section (CpS) positioned before the merging assumption section, and even when determining that the other vehicle exists in the merging preparation section under a situation where it is possible to grasp presence of the other vehicle traveling in the adjacent lane in the merging preparation section, the autonomy level determination unit determines performance of avoidance travel control of avoiding entry into the merging assumption section.

[Technical Feature 1-10]

A driving control program that is to be used in a vehicle (A) and implements an autonomous driving operation configured to replace at least a part of a driving task of a driver, the driving control program configured to cause at least one processing unit (51) to execute processing including grasping (S74, S277) presence or absence of an other vehicle (Ac) traveling in an adjacent lane (ML) in a merging assumption section (CfS) in which the other vehicle is assumed to merge from the adjacent lane to a subject vehicle lane (DL), and determining (S77, S279, S280), according to presence or absence of the other vehicle traveling in the adjacent lane, an autonomous driving level defining a range of the driving task replaced by the autonomous driving operation in the merging assumption section.

[Technical Feature 1-11]

A driving control program that is to be used in a vehicle (A) and implements an autonomous driving operation configured to replace at least a part of a driving task of a driver, the driving control program configured to cause at least one processing unit (51) to
execute processing including
grasping (S76, S278) a control situation of autonomous driving of an other vehicle (Ac) traveling in an adjacent lane (ML) in a merging assumption section (CfS) in which the other vehicle is assumed to merge from the adjacent lane to a subject vehicle lane (DL), and
determining (S77, S279, S280), according to a control situation of autonomous driving of the other vehicle, an autonomous driving level defining a range of the driving task replaced by the autonomous driving operation in the merging assumption section.

According to [Technical Features 1-1, 4, 10, and 11] described above, in the merging assumption section in which another vehicle is assumed to merge from the adjacent lane to the subject vehicle lane, the autonomous driving level according to the presence or absence of the other vehicle or the situation of the autonomous driving in the other vehicle is determined. Hence, even when encountering a merging assumption section during traveling by the autonomous driving operation, it is possible to continue the autonomous driving at an appropriate autonomous driving level. As a result, the opportunity to transfer the driving task from the autonomous driving operation to the driver is reduced, and therefore it becomes possible to enhance the driver convenience related to driving changeover.

According to [Technical Feature 1-2] described above, when the other vehicle does not exist in the adjacent lane, steering operation at least by the driver becomes unnecessary even in the merging assumption section. Hence, it is possible to reduce the driving load on the driver associated with driving changeover and traveling in the merging assumption section.

According to [Technical Feature 1-3] described above, when another vehicle exists in the adjacent lane, the autonomous driving level is determined according to whether this other vehicle is an autonomous driving vehicle. Hence, even when grasping the other vehicle in the adjacent lane during traveling by the autonomous driving operation, it is possible to continue the autonomous driving at an appropriate autonomous driving level. According to the above, it is possible to reduce the opportunity to transfer the driving task to the driver, and it becomes possible to enhance the driver convenience related to driving changeover.

According to [Technical Feature 1-5] described above, when the other vehicle in the adjacent lane is an autonomous driving vehicle, steering operation at least by the driver becomes unnecessary even if the other vehicle exists in the adjacent lane. This, if the control situation of the autonomous driving of the other vehicle is grasped in addition to the presence or absence of the other vehicle, it becomes possible to appropriately determine the autonomous driving level of the subject vehicle in relation to the other vehicle. According to the above, it is possible to appropriately achieve both risk reduction of another vehicle with respect to the subject vehicle and reduction of the driving load of the driver.

When the section length of the merging assumption section is sufficiently secured, merging of another vehicle is performed comfortably. Therefore, in [Technical Feature 1-6] described above, the autonomous driving level is determined according to the section length of the merging assumption section. Hence, it is possible to appropriately achieve both risk reduction of another vehicle with respect to the subject vehicle and reduction of the driving load of the driver.

In [Technical Feature 1-7] described above, switching between the eyes-off travel and the hands-off travel is performed according to whether the section length of the merging assumption section exceeds the continuation threshold. According to the above, it is possible to reduce the risk of other vehicles while reducing the driving load of the driver by appropriately switching the autonomous driving level in the merging assumption section.

According to [Technical Feature 1-8] described above, when it is determined that another vehicle does not exist in the adjacent lane in the merging preparation section, it is determined that avoidance travel control for avoiding entry into the merging assumption section is not performed. Thus, if the absence of the other vehicle can be grasped in advance, the risk of the other vehicle that is merging does not increase even if traveling in the merging assumption section while keeping the autonomous driving level high. As a result, it becomes possible to reduce the performance period of the avoidance travel control, and it is possible to achieve improvement in convenience for the driver.

On the other hand, according to [Technical Feature 1-9] described above, even when it is determined that another vehicle does not exist in the adjacent lane in the merging preparation section, avoidance travel control of avoiding entry into the merging assumption section is performed. When another vehicle in the adjacent lane is detected in the merging assumption section, it becomes difficult to continue the hands-off travel or the eyes-off travel. Hence, even if the presence of another vehicle is not grasped in the merging preparation section, according to the control method for performing the avoidance travel control, it is possible to continue high-level autonomous traveling with high reliability. According to the above, provision of highly convenient autonomous driving capable of continuing a low driving load state is achieved.

[Technical Feature 2-1]

A driving control device that is to be used in a vehicle (A) and implements an autonomous driving operation configured to replace at least a part of a driving task of a driver, the driving control device including:
a travel environment grasping unit (61) configured to grasp presence of a merging assumption section (CfS) in which traveling by the autonomous driving operation is restricted on an assumption that another vehicle (Ac) merges into a subject vehicle lane (DL) from an adjacent lane (ML); and
a behavior determination unit (62) configured to determine execution of avoidance travel control for avoiding entry into the merging assumption section when the autonomous driving operation determines that the assumed merging section exists in a traveling direction during traveling.

[Technical Feature 2-2]

The driving control device according to [Technical Feature 2-1], in which when the merging assumption section existing in a traveling direction is grasped, the behavior determination unit is configured to perform the avoidance travel control at a timing when a driving changeover time necessary for driving changeover from the autonomous driving operation to the driver can be secured before entry into the merging section.

[Technical Feature 2-3]

The driving control device according to [Technical Feature 2-1] or [Technical Feature 2-2], in which when restriction on travel by the autonomous driving operation is relaxed by the avoidance travel control for moving from the subject vehicle lane to a different travel lane (PL), the behavior determination unit determines whether to perform the avoidance travel control based on selection information of the driver.
[Technical Feature 2-4]
The driving control device according to [Technical Feature 2-3], in which before the selection information is acquired, the behavior determination unit is configured to notify the driver of a difference between travel control by the autonomous driving operation in a case of continuing travel in the subject vehicle lane and travel control by the autonomous driving operation in a case of changing a lane to the different travel lane.
[Technical Feature 2-5]
A driving control program that is to be used in a vehicle (A) and implements an autonomous driving operation configured to replace at least a part of a driving task of a driver, the driving control program configured to cause
at least one processing unit (51) to
execute processing including
grasping (S60, S260) presence of a merging assumption section (CfS) in which traveling by the autonomous driving operation is restricted on an assumption that another vehicle (Ac) merges into a subject vehicle lane (DL) from an adjacent lane (ML), and
determining (S64, S264) execution of avoidance travel control for avoiding entry into the merging assumption section when the autonomous driving operation determines that the assumed merging section exists in a traveling direction during traveling.

According to [Technical Features 2-1, 5] described above, when the merging assumption section is grasped in the traveling direction, execution of the avoidance travel control for avoiding entry into the merging assumption section is determined. Hence, a situation in which traveling by the autonomous driving operation is restricted due to entry into the merging assumption section is avoided. As a result, the driver can continue the second task as much as possible. In addition, if entry into the merging assumption section is avoided, it is also possible to reduce the risk of another vehicle merging into the subject vehicle lane from the adjacent lane. Therefore, it becomes possible to enhance the driver convenience related to driving changeover.

According to [Technical Feature 2-2] described above, even if the avoidance travel control for avoiding entry into the merging assumption section cannot be performed, the driving changeover time necessary for driving changeover to the driver is secured. As a result, even if a sudden driving changeover occurs, the driving changeover can be smoothly performed, and therefore it becomes possible to enhance the driver convenience related to driving changeover. Note that the driving changeover time is a time (15 seconds) from the TOR point P4 to the merging start point P5 in the above embodiment, for example.

According to [Technical Feature 2-3] described above, whether to perform the avoidance travel control of moving to a different travel lane is determined based on selection information of the driver. According to the above, it becomes possible to continue the autonomous traveling in an aspect desired by the driver.

According to [Technical Feature 2-4] described above, the driver is notified of how content (autonomous driving level) of travel control by the autonomous driving operation changes between a case of selecting execution of the avoidance travel control and a case of not selecting it. Thus, if information serving as an index when the driver is selected is provided, it becomes easy for the driver to select whether to carry out the avoidance travel control.

[Technical Feature 3-1]
A driving control device that is to be used in a vehicle (A) and implements an autonomous driving operation configured to replace at least a part of a driving task of a driver, the driving control device including:
an other vehicle situation grasping unit (61) configured to grasp a status of another vehicle traveling around the vehicle, and grasps, as a cutting-in vehicle (Ac), the other vehicle carrying out cut-in from an adjacent lane (ML) to a subject vehicle lane (DL); and
an autonomy level determination unit (62) configured to determine an autonomous driving level defining a range of the driving task replaced by the autonomous driving operation according to whether the other vehicle except the cutting-in vehicle exists when cutting-in of the cutting-in vehicle is grasped.
[Technical Feature 3-2]
The driving control device according to [Technical Feature 3-1], in which the autonomy level determination unit determines the autonomous driving level according to whether at least one of a preceding vehicle (Af) traveling in a traveling direction of the vehicle and another cutting-in vehicle (As) traveling in an opposite adjacent lane positioned on an opposite side of an adjacent lane in which the cutting-in vehicle travels across the subject vehicle lane exists.
[Technical Feature 3-3]
The driving control device according to [Technical Feature 3-2], in which
the autonomy level determination unit
when cutting-in of the cutting-in vehicle is grasped in a period in which the autonomous driving operation performs autonomous traveling in which the driver is not responsible for periphery monitoring,
causes the autonomous driving operation to continue autonomous traveling with no periphery monitoring responsibility on condition that the preceding vehicle does not exist, and
transitions the autonomous driving level to autonomous traveling with periphery monitoring responsibility on condition that the preceding vehicle exists.
[Technical Feature 3-4]
The driving control device according to [Technical Feature 3-2] or [Technical Feature 3-3], in which
the autonomy level determination unit
when cutting-in of the cutting-in vehicle is grasped in a period in which the autonomous driving operation performs autonomous traveling in which the driver is not responsible for periphery monitoring,
causes the autonomous driving operation to continue autonomous traveling with no periphery monitoring responsibility on condition that the other cutting-in vehicle does not exist, and
transitions the autonomous driving level to autonomous traveling with periphery monitoring responsibility on condition that the other cutting-in vehicle exists.
[Technical Feature 3-5]
The driving control device according to any one of [Technical Feature 3-1] to [Technical Feature 3-4], in which the other vehicle situation grasping unit is configured to grasp, as the cutting-in vehicle, the other vehicle assumed to merge into the subject vehicle lane in addition to the other vehicle that has started a lane change from the adjacent lane to the subject vehicle lane.
[Technical Feature 3-6]
A driving control program that is to be used in a vehicle (A) and implements an autonomous driving operation configured to replace at least a part of a driving task of a driver, the driving control program configured to cause
at least one processing unit (51) to
execute processing including
grasping a situation of another vehicle traveling around the vehicle,
further grasping (S301), as a cutting-in vehicle (Ac), the other vehicle carrying out cut-in from an adjacent lane (ML) to a subject vehicle lane (DL), and
determining (S302 to S305) an autonomous driving level defining a range of the driving task replaced by the autonomous driving operation according to whether the other vehicle except the cutting-in vehicle exists when cutting-in of the cutting-in vehicle is grasped.

According to [Technical Features 3-1, 6] described above, when cutting in of the cutting-in vehicle from the adjacent lane to the subject vehicle lane is grasped, the autonomous driving level is determined according to the presence or absence of another vehicle except the cutting-in vehicle. Hence, even when encountering a cutting-in vehicle during traveling by the autonomous driving operation, it is possible to continue the autonomous driving at an appropriate autonomous driving level. As a result, the opportunity to transfer the driving task from the autonomous driving operation to the driver is reduced, and therefore it becomes possible to enhance the driver convenience related to driving changeover.

According to [Technical Feature 3-2] described above, the presence or absence of a preceding vehicle, another cutting-in vehicle, or the like is grasped as another vehicle except a cutting-in vehicle, and the autonomous driving level of the subject vehicle is determined according to the presence of them. According to such control of the autonomy level, it is possible to determine the autonomous driving level appropriately reflecting the presence of other vehicles having influence on the travel state of the subject vehicle. Therefore, it is possible to achieve reduction of the driving load on the driver while suppressing the risk of other vehicles.

When a preceding vehicle exists as in [Technical Feature 3-3] above, there is a high possibility that the cutting-in vehicle moves between the subject vehicle and the preceding vehicle. In such scene, the cutting-in vehicle that has changed lanes to the subject vehicle lane tends to decelerate in front of the subject vehicle. Hence, according to the control of lowering the autonomous driving level when the preceding vehicle exists, even if the cutting-in vehicle that has cut in to front of the subject vehicle decelerates, a smooth response by the driver becomes possible.

As in [Technical Feature 3-4] described above, when another cutting-in vehicle does not exist in the opposite adjacent lane, it is possible to respond of changing the lane of the subject vehicle to the opposite adjacent lane in order to avoid the cutting-in vehicle that has cut into the subject vehicle lane. Hence, according to the control of continuing the autonomous driving without the periphery monitoring responsibility when another cutting-in vehicle does not exist, it is possible to reduce the driving load on the driver while suppressing the risk of other vehicles.

As in the above [Technical Feature 3-5], according to the processing of also grasping, as a cutting-in vehicle, another vehicle that is assumed to merge into the subject vehicle lane, it is possible to grasp early other vehicles that become a risk for the subject vehicle. As a result, it becomes possible to secure a long response time of the driver when the autonomous driving level is transitioned low.

[Technical Feature 4-1]
A driving control device that is to be used in a vehicle (A) and implements an autonomous driving operation configured to replace at least a part of a driving task of a driver, the driving control device including:
a travel environment grasping unit (61) configured to grasp presence of a merging assumption section (CfS) that is defined in a merged lane (DL) connected to a merging lane (ML) and in which a lane change of a merging vehicle (Ac) from the merging lane to the merged lane is assumed; and
an autonomy level determination unit (62) configured to determine an autonomous driving level defining a range of the driving task replaced by the autonomous driving operation according to presence or absence of another vehicle (Ao) traveling in the merging assumption section when the vehicle is traveling in an opposite adjacent lane (PL) adjacent to an opposite side of the merging lane across the merged lane.

[Technical Feature 4-2]
The driving control device according to [Technical Feature 4-1], in which
the autonomy level determination unit
when presence of the merging assumption section is grasped in a period in which the autonomous driving operation performs autonomous traveling in which the driver is not responsible for periphery monitoring,
causes the autonomous driving operation to continue autonomous traveling with no periphery monitoring responsibility on condition that the other vehicle does not exist in the merging assumption section, and
transitions the autonomous driving level to autonomous traveling with periphery monitoring responsibility on condition that the other vehicle exists in the merging assumption section.

[Technical Feature 4-3]
A driving control program that is to be used in a vehicle (A) and implements an autonomous driving operation configured to replace at least a part of a driving task of a driver, the driving control program configured to cause
at least one processing unit (51) to
execute processing including
grasps (S401) presence of a merging assumption section (CfS) that is defined in a merged lane (DL) connected to a merging lane (ML) and in which a lane change of a merging vehicle (Ac) from the merging lane to the merged lane is assumed, and
determining (402 to S404) an autonomous driving level defining a range of the driving task replaced by the autonomous driving operation according to presence or absence of another vehicle (Ao) traveling in the merging assumption section when the vehicle is traveling in an opposite adjacent lane (PL) adjacent to an opposite side of the merging lane across the merged lane.

According to [Technical Features 4-1, 3] described above, when traveling in the opposite adjacent lane, the presence of another vehicle traveling in the merging assumption section defined in the merged lane is grasped, and the autonomous driving level is determined according to the presence or absence of the other vehicle in the merging assumption section. Hence, even if movement of the other vehicle from the merged lane to the opposite adjacent lane is caused by movement of the merging vehicle from the merging lane to the merged lane, the subject vehicle can continue autonomous driving at a level that can appropriately cope with the other vehicle. As a result, the opportunity to transfer the driving task from the autonomous driving operation to the driver is reduced, and therefore it becomes possible to enhance the driver convenience related to driving changeover.

According to [Technical Feature 4-2] described above, when another vehicle is present in the merging assumption section, the autonomous driving level of the subject vehicle transitions to autonomous traveling with the periphery monitoring responsibility. Hence, even if another vehicle suddenly makes a sudden movement to the opposite adjacent lane, the driver can smoothly respond by the control of lowering the autonomous driving level in advance.

[Technical Feature 5-1]

A driving control device that is to be used in a vehicle (A) and implements an autonomous driving operation configured to replace at least a part of a driving task of a driver, the driving control device including:
  a travel environment determination unit (61) configured to determine whether the vehicle travels in a preset autonomous driving possible area and whether the vehicle travels in a traffic jam; and
  an autonomy level determination unit (62) configured to enable, when the vehicle travels in the autonomous driving possible area or in a traffic jam, performance of unmonitored autonomous traveling without periphery monitoring responsibility by the driver,
  wherein
  the autonomy level determination unit
  permits the unmonitored autonomous traveling in a merging section (CfS), and
  disables the unmonitored autonomous traveling in a passing lane (PL) when the vehicle travels in the autonomous driving possible area, and permits the unmonitored autonomous traveling in a passing lane when the vehicle travels in a traffic jam.

[Technical Feature 5-2]

A driving control program that is to be used in a vehicle (A) and implements an autonomous driving operation configured to replace at least a part of a driving task of a driver, the driving control program configured to cause
  at least one processing unit (51) to
  execute processing including
  determining whether the vehicle travels in a preset autonomous driving possible area and whether the vehicle travels in a traffic jam, and
  enabling, when the vehicle travels in the autonomous driving possible area or in a traffic jam, performance of unmonitored autonomous traveling without periphery monitoring responsibility by the driver, and
  permitting the unmonitored autonomous traveling in a merging section (CfS),
  disabling the unmonitored autonomous traveling in a passing lane (PL) when the vehicle travels in the autonomous driving possible area, and
  permitting the unmonitored autonomous traveling in a passing lane when the vehicle travels in a traffic jam.

In [Technical Features 5-1, 2] described above, when the vehicle travels in the autonomous driving possible area, the unmonitored autonomous traveling in the passing lane is disabled. However, the unmonitored autonomous traveling in a passing lane is permitted when the vehicle travels in a traffic jam. Therefore, when in a traffic jam, autonomous traveling in a state of being free from the periphery monitoring responsibility can be continued even in a passing lane in addition to a merging lane. Therefore, reduction in frequency of driving changeover makes it possible to enhance the driver convenience related to driving changeover.

What is claimed is:

1. A presentation control device for a vehicle including an autonomous driving operation and configured to control presentation of information to a driver of the vehicle, the presentation control device comprising a processor and memory configured to implement:
  an interruption determination unit configured to determine interruption of a specific act other than driving permitted to the driver in an autonomous traveling period in which the vehicle travels by the autonomous driving operation; and
  a provision control unit configured to change, based on an interruption determination of the specific act, a provision method of content provided in association with the specific act in the autonomous traveling period, wherein
  the provision control unit is configured to
  notify the driver of a state of an autonomous lane change by the autonomous driving operation for avoiding interruption of the specific act due to approach of the vehicle to a merging section, and
  then change the provision method of the content.

2. The presentation control device according to claim 1, wherein
  the provision control unit is configured to present the driver with a selection screen for selecting whether to perform the autonomous lane change.

3. The presentation control device according to claim 2, wherein
  the provision control unit is configured to notify, on the selection screen, the driver that whether the specific act can be continued changes depending on whether the autonomous lane change is performed.

4. The presentation control device according to claim 1, wherein
  the provision control unit is configured to
  grasp an interruption timing at which the driver ends the specific act, and
  change a permission timing at which provision resumption of the content is permitted according to the interruption timing.

5. The presentation control device according to claim 1, wherein the processor and memory are further configured to implement:
  a driver state grasping unit configured to grasp a state of the driver in the autonomous traveling period, and wherein
  the provision control unit is configured to change, according to a state of the driver, at least one of strength and request timing of a request notification requesting the driver for driving changeover from the autonomous driving operation.

6. The presentation control device according to claim 1, wherein the processor and memory are further configured to implement:
  a periphery state grasping unit configured to grasp a state of another vehicle traveling around the vehicle, and wherein
  the provision control unit is configured to change, according to a state of the other vehicle, at least one of strength and request timing of a request notification requesting the driver for driving changeover from the autonomous driving operation.

7. The presentation control device according to claim 1, wherein
the provision control unit is configured to change the provision method of the content by interrupting the content.

8. The presentation control device according to claim 1, wherein
the provision control unit is configured to
start acquisition of driver's selection information based on grasping the autonomous vehicle approaching the merging section, and
when determining that the driver has selected to perform autonomous lane change, wait for the vehicle to arrive at a predetermined point before the merging section, and then determine performance of the autonomous lane change.

9. The presentation control device according to claim 8, wherein the merging section is in a limited-access road or a highway.

10. A presentation control device for a vehicle including an autonomous driving operation and configured to control presentation of information to a driver of the vehicle, the presentation control device comprising a processor and memory configured to implement:
an interruption determination unit configured to determine interruption of a specific act other than driving permitted to the driver in an autonomous traveling period in which the vehicle travels by the autonomous driving operation; and
a provision control unit configured to present, based on an interruption determination of the specific act, an option of selecting an interruption method of content provided in association with the specific act in the autonomous traveling period.

11. The presentation control device according to claim 10, wherein
the provision control unit is configured to change, based on the interruption determination, a provision method of the content provided in association with the specific act in the autonomous traveling period before presenting the option.

12. The presentation control device according to claim 11, wherein
the provision control unit is configured to
notify the driver of a state of an avoidance behavior by the autonomous driving operation for avoiding interruption of the specific act, and
then change the provision method of the content.

13. The presentation control device according to claim 10, wherein
the provision control unit is configured to present the option according to a type of the specific act based on a determination result of a type of the specific act performed by the driver.

14. The presentation control device according to claim 10, wherein
the provision control unit is configured to
notify the driver of a state of an avoidance behavior by the autonomous driving operation for avoiding interruption of the specific act, and
then present the option for selecting an interruption method of the content.

15. A presentation control device for a vehicle including an autonomous driving operation and configured to control presentation of information to a driver of the vehicle, the presentation control device comprising a processor and memory configured to implement:
an interruption determination unit configured to determine interruption of a specific act other than driving permitted to the driver in an autonomous traveling period in which the vehicle travels by the autonomous driving operation; and
a provision control unit configured to change, based on an interruption determination of the specific act, a provision method of content provided in association with the specific act in the autonomous traveling period, wherein
the provision control unit is configured to
grasp an interruption timing at which the driver ends the specific act, and
change a permission timing at which provision resumption of the content is permitted according to the interruption timing.

16. A storage medium storing a presentation control program for a vehicle including an autonomous driving operation and configured to control presentation of information to a driver of the vehicle, the presentation control program configured to cause
at least one processing unit to execute processing including
determining interruption of a specific act other than driving permitted to the driver in an autonomous traveling period in which the vehicle travels by the autonomous driving operation, and
changing, based on an interruption determination of the specific act, a provision method of content provided in association with the specific act in the autonomous traveling period, wherein
the changing includes
notifying the driver of a state of an autonomous lane change by the autonomous driving operation for avoiding interruption of the specific act due to approach of the vehicle to a merging section, and
then changing the provision method of the content.

17. A storage medium storing presentation control program for a vehicle including an autonomous driving operation and configured to control presentation of information to a driver of the vehicle, the presentation control program configured to cause
at least one processing unit to execute processing including
determining interruption of a specific act other than driving permitted to the driver in an autonomous traveling period in which the vehicle travels by the autonomous driving operation, and
presenting, based on an interruption determination of the specific act, an option of selecting an interruption method of content provided in association with the specific act in the autonomous traveling period.

18. A storage medium storing presentation control program for a vehicle including an autonomous driving operation and configured to control presentation of information to a driver of the vehicle, the presentation control program configured to cause
at least one processing unit to execute processing including
determining interruption of a specific act other than driving permitted to the driver in an autonomous traveling period in which the vehicle travels by the autonomous driving operation, and
changing, based on an interruption determination of the specific act, a provision method of content provided in association with the specific act in the autonomous traveling period, grasping an interruption timing at which the driver ends the specific act, and changing a permission timing at which provision resumption of the content is permitted according to the interruption timing.

* * * * *